INVENTOR.
ROBERT T. CHIEN
BY
Bernard N. Wiener
ATTORNEY

Dec. 24, 1968 R. T. CHIEN 3,418,629

DECODERS FOR CYCLIC ERROR-CORRECTING CODES

Filed April 10, 1964 21 Sheets-Sheet 3

Dec. 24, 1968 R. T. CHIEN 3,418,629

DECODERS FOR CYCLIC ERROR-CORRECTING CODES

Filed April 10, 1964 21 Sheets-Sheet 8

Dec. 24, 1968 R. T. CHIEN 3,418,629

DECODERS FOR CYCLIC ERROR-CORRECTING CODES

Filed April 10, 1964 21 Sheets-Sheet 12

Dec. 24, 1968 R. T. CHIEN 3,418,629

DECODERS FOR CYCLIC ERROR-CORRECTING CODES

Filed April 10, 1964 21 Sheets-Sheet 14

PULSE GENERATOR 68

FIG. 4 INPUT BUFFER
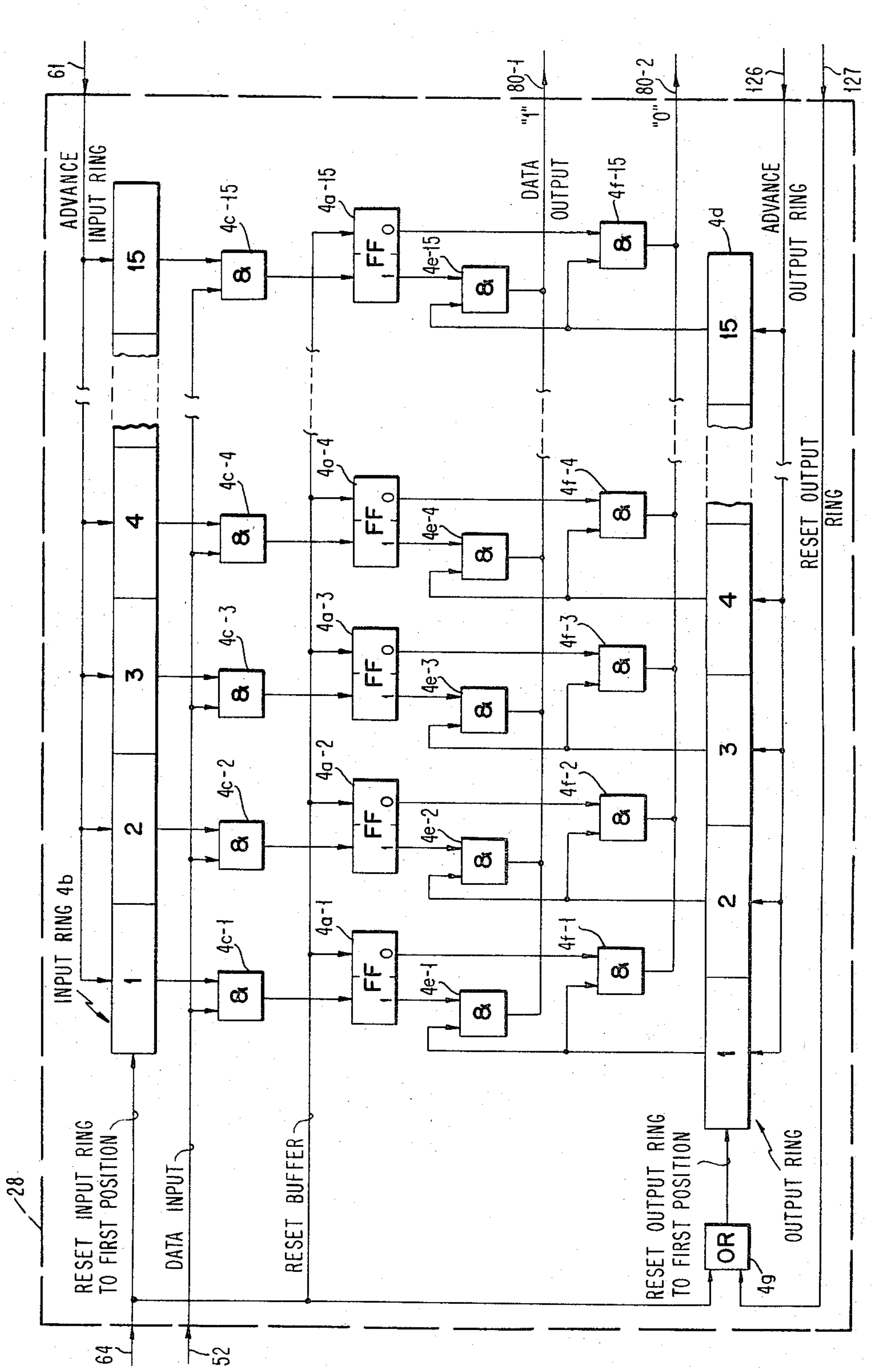

INPUT ADDER

Dec. 24, 1968 R. T. CHIEN 3,418,629

DECODERS FOR CYCLIC ERROR-CORRECTING CODES

Filed April 10, 1964 21 Sheets-Sheet 20

Dec. 24, 1968 R. T. CHIEN 3,418,629

DECODERS FOR CYCLIC ERROR-CORRECTING CODES

Filed April 10, 1964 21 Sheets-Sheet 21

United States Patent Office 3,418,629 Patented Dec. 24, 1968

3,418,629
DECODERS FOR CYCLIC ERROR-CORRECTING CODES

Robert T. Chien, Yorktown Heights, N.Y., assignor to International Business Machines Corporation, New York, N.Y., a corporation of New York Filed Apr. 10, 1964, Ser. No. 358,893
42 Claims. (Cl. 340—146.1)

ABSTRACT OF THE DISCLOSURE

The algebraic structure and cyclic property of a Bose-Chaudhuri-Hocquenghem error-correcting code are utilized to correct a multiple independent error pattern in a received digit sequence which was originally established in the format of a codeword of the code. Generally, the algebraic structure and the cyclic property are utilized to transform cyclically paramount algebraic parameters in the finite field which characterizes the BCH code. After each transformation of these parameters, a function of the parameters is evaluated. When the function is equal to unity, an error position is detected in the high order position of a received sequence corresponding to the equivalent codeword cyclically shifted. More particularly, a plurality of power sums is derived from the received sequence to indicate the presence of an error pattern therein. Finally, the power sums are operated on in the finite field which defines the code to obtain an indication of the error positions in cyclic relation to the received sequence.

This invention relates generally to decoders for linear error-correcting codes. It relates particularly to decoders for Bose-Chaudhuri-Hocquenghem error-correcting cyclic codes.

Bose - Chaudhuri - Hocquenghem codes, hereinafter termed BCH codes, are conveniently constructed with a mathematical structure based on polynomials and finite fields which are utilized advantageously in the decoding procedure provided by this invention. The decoding procedure provided by this invention is applicable to other classes of codes which possess and utilize a comparable mathematical structure.

An error-correcting code provides a mathematically structured format in which information may be established. Through use of the code, if the information is corrupted with errors during transmission or storage, the error pattern may be corrected. In a digital system, information is characterized with a digit sequence. It is important that the information be accurately recovered after its transmission or storage. If certain digits of the information are incorrect and consequently are misinterpreted, significant losses of either commercial or technical nature may result. It is important for any digital system that maximum reliability of transmission or storage of information be obtained through imposition of a minimum amount of redundancy. Redundancy in information implies that the information is duplicated in some manner. By establishing information in the format of a codeword of an error-correcting code, digits which are corrupted may be corrected as a consequence of imposed redundancy.

The text "Error-Correcting Codes" by W. W. Peterson, published by The M.I.T. Press and John Wiley and Sons, Inc., 1961, is illustrative of the background literature concerning error-correcting codes. In the prior art, burst error-correcting codes and independent error-correcting codes have received considerable attention for transmission and storage of information. A burst error-correcting code has the capability of correcting a single burst of errors in a block of digits. Usually, the number of digit positions spanned by the burst is termed a burst of $b$ digits and the number of digits in the overall information bearing digit sequence is termed a block of $n$ digits. An independent error-correcting code has the capability of correcting any error pattern of $t$ or fewer digits as long as the number of digits in error is within the capability of the code. Conveniently, any error pattern of $t$ errors is termed a $t$-tuple error in a block of $n$ digits. The BCH codes are the most efficient and useful known class of codes capable of correcting any error pattern of $t$ digits in a block of $n$ digits. Heretofore, BCH codes have not been used extensively for protecting information during transmission or storage although their potential has been significant. The main reasons that the BCH codes have not been used more are that the decoding procedures available have been either complex or time consuming or both.

The decoding procedure for BCH codes provided by this invention is readily implemented and has practical importance. Its practice permits decoding of received information established in the format of a codeword of a BCH code at much higher speeds than any prior art decoding procedure. Hence, the practice of the invention permits new uses of BCH codes in high speed digital transmission and storage systems. The practice of the invention permits use of low cost and low speed electrical circuits since the decoding procedure is operable at speeds comparable to the transmission rate or storage rate.

DISCUSSION OF TERMS

Several terms which are conventional in algebraic coding theory are used herein in the presentation of this invention. Background literature references are:

(a) "Error-Correcting Codes," W. W. Peterson, The M.I.T. Press and John Wiley and Sons, Inc., 1961.

(b) "Modern Algebra," vol. 1, B. L. Van der Waerden, F. Ungar Publishing Co., 1949.

The following is a brief discussion of certain terms used herein

*Algebraic structure*

Algebraic structure involves the structure of any mathematical system which is based on the use of one or more of the algebraic operations: addition, subtraction, multiplication and division.

*Polynomial*

A polynomial is an algebraic expression which relates one quantity to a sum of powers of another quantity, e.g., $$r(x)=r_0+r_1x+r_1x^2+ \dots r_{n-1}x^{n-1}$$

The degree of a polynomial is the power of the highest order term, i.e., $n-1$.

An irreducible polynomial over a finite field is a polynomial which can not be factored into a product of two polynomials of lower degree with coefficients in the finite field, i.e., $$g(x)=1+x+x^4$$

is irreducible over GF(2).

*Binary digit sequence*

A binary digit sequence is a series of binary digits 1 and 0, e.g., $$\begin{aligned} r&=[r_0r_1r_2 \dots r_{n-1}] \\ &=[1\,0\,0\,0\,0\,0\,0\,1\,1\,1\,1\,0\,0\,0\,0\,0] \end{aligned}$$

each of which may be considered as a coefficient of the respective power of $x$ in a polynomial $r(x)$.

*Error-correcting code*

An error-correcting code consists of a plurality of codewords each of which has an algebraic structure of designators such that: if a codeword is corrupted within the capability of the code, it may be reconstructed through algebraic operations on the designators.

*Cyclic property*

The cyclic property of a cyclic code refers to the property that each codeword may be transformed to another codeword by a shift of designators, e.g., the codeword $$a_1(x)=a_0+a_1x+a_2x^2+ \ldots a_{n-1}x^{n-1}$$

becomes through cyclic shift one position to the right $$a_2(x)=a_{n-1}+a_0x+a_1x^2+ \ldots a_{n-2}x^{n-1}$$

More generally, cyclic property implies that one codeword may be obtained from one or more other codewords of a code through a transformation.

*Error pattern*

An error pattern in a received binary digit sequence refers to the positions in which the binary digit sequence transmitted or stored is different from the binary digit sequence received.

*Decoder*

A decoder for an error-correcting code provides correction of an error pattern in a received digit sequence. Although complete decoding implies that the original information digit sequence is obtained, decoding as used herein identifies the procedure which obtains error-identification or error correction. This does not alter the generality of the invention as the procedure to obtain the original information digit sequence from the corrected received digit sequence is conventional. For the embodiments of the invention described herein decoding and error-identification or error-correction are synonomous and information digits are considered to be encoded so that they are followed by the check digits integrally. The embodiments work properly even if the information digits and check digits are not identifiable as such in the codeword itself.

*Finite field*

A group G is a set of elements, for which an operation is defined and for which axioms G.1 to G.4 hold:

*Axiom G.1* (closure).—The operation can be applied to any two group elements to give a third group element as a result.

*Axiom G.2* (associative law).—For any three elements *a*, *b*, and *c* of the group, $(a+b)+c=a+(b+c)$ if the operation is written as addition, or $a(bc)=(ab)c$ if the operation is written as multiplication.

*Axiom G.3.*—There is an identity element.

*Axiom G.4.*—Every element of the group has an inverse element. A group is called Abelian or commutative if it satisfies the commutative laws.

A ring R is a set of elements for which two operations are defined. One is called addition and is denoted by $a+b$, and the other is called multiplication and is denoted by $ab$. In order for R to be a ring, the following axioms must be satisfied.

*Axiom R.1.*—The set R is an Abelian group under addition.

*Axiom R.2* (closure).—For any two elements *a* and *b* of R, the product *ab* is defined and is an element of R.

*Axiom R.3* (associative law).—For any three elements *a*, *b*, and *c* of R, $a(bc)=(ab)c$.

*Axiom R.4* (distributive law).—For any three elements *a*, *b*, and *c* of R, $a(b+c)=ab+ac$ and $(b+c)a=ba+ca$.

A ring is called commutative if its multiplication operation is commutative, that is, if for any two elements *a* and *b*, $ab=ba$. A field is a commutative ring with a unit element (multiplicative identity) in which every nonzero element has a multiplication inverse. A finite field is a field with a finite number of elements. Let *p* be a prime number, then there is a finite field of *p* elements. These are called prime fields, or Galois Fields of *p* elements GF(*p*). Every finite field GF(*q*) has a unique prime field GF(*p*) as a subfield. The field GF(*q*) is therefore an extention field of the prime field GF(*p*). As every extension field is a vector space over its subfield, the number of elements in GF(*q*) must be a power of *p* and $q=p^m$. One way to represent the elements of $GF(p^m)$ is through the concepts of polynomials. In this manner the elements of GF(*q*) are polynomials over GF(*p*), i.e., polynomials with coefficients in GF(*p*).

A finite field of $GF(p^m)$ as it relates to the theory of coding is a set of polynomials of degree less than *m* with coefficients reduced modulo *p*, a prime number. The addition in $GF(p^m)$ is ordinary polynomial addition with coefficients reduced modulo *p*. The multiplication in $GF(p^m)$ is defined such that the product of two polynomials is reduced modulo an irreducible polynomial of degree *m*. The field here shall always means commutative fields.

The elements of the finite field $GF(2^4)$ as generated by the irreducible polynomial $x^4+x+1$ are:

TABLE I

| Low Order | | | High Order |
|---|---|---|---|
| $0\equiv0$ | 0 | 0 | 0 |
| $1\equiv1$ | 0 | 0 | 0 |
| $\alpha^1\equiv0$ | 1 | 0 | 0 |
| $\alpha^2\equiv0$ | 0 | 1 | 0 |
| $\alpha^3\equiv0$ | 0 | 0 | 1 |
| $\alpha^4\equiv1$ | 1 | 0 | 0 |
| $\alpha^5\equiv0$ | 1 | 1 | 0 |
| $\alpha^6\equiv0$ | 0 | 1 | 1 |
| $\alpha^7\equiv1$ | 1 | 0 | 1 |
| $\alpha^8\equiv1$ | 0 | 1 | 0 |
| $\alpha^9\equiv0$ | 1 | 0 | 1 |
| $\alpha^{10}\equiv1$ | 1 | 1 | 0 |
| $\alpha^{11}\equiv0$ | 1 | 1 | 1 |
| $\alpha^{12}\equiv1$ | 1 | 1 | 1 |
| $\alpha^{13}\equiv1$ | 0 | 1 | 1 |
| $\alpha^{14}\equiv1$ | 0 | 0 | 1 |

Every element except zero of a finite field may be expressed as a power of a primitive element in the field. The primary element of Table I is $\alpha$ itself. If two elements of a finite field $GF(2^4)$ are added, subtracted, multiplied or divided by a non-zero element, the result is also a field element. The relationships $$\alpha^{15}=1$$

and $$\alpha^4=\alpha+1$$

are used for this purpose. Illustratively, in modulo-2 operation with binary digits 1 and 0

$$1\oplus1=0$$
$$1\oplus0=1$$
$$0\oplus1=1$$
$$0\oplus0=0$$

Illustratively, for addition, $$\alpha^8+\alpha^9=1010\oplus0101=1111$$
$$=\alpha^{12}$$

Illustratively, for multiplication, $$\alpha^8\times\alpha^9=\alpha^{17}=\alpha^2$$

Illustratively, for division $$\alpha^7/\alpha^8=\alpha^{14}$$

*Cyclic error-correcting code*

In a cyclic error-correcting code, each codeword may be transformed to another codeword by a cyclic shift of its designators. Illustratively, if $$a_1(x)=a_0+a_1x+ \ldots a_{n-1}x^{n-1}$$

is a codeword, then $$a_2(x)-a_n+a_0x+a_1x^2+ \ldots a_{n-2}x^{n-1}$$

is also a codeword.

*Bose-Chaudhuri-Hocquenghem code*

If $\alpha$ is a primitive element of the finite field $GF(2^m)$ the binary Bose-Chaudhuri-Hocquenghem code which will correct $t$ independent errors consists of the set of polynomials $\{a(x)\}$ over $GF(2)$ of degree $n-1$ or less such that $$a(\alpha^i)=0 \quad i=1, 3, 5, \ldots 2t-1$$

where $$a(x)=a_0+a_1x+a_2x^2+ \ldots a_{n-1}x^{n-1}$$

and $$a_i=0, 1 (i=0, 1, 2, \ldots n-1)$$

and the $\alpha^i$ are elements of $GF(2^m)$.

The polynomials consist of all the multiples of a generator polynomial $g(x)$ termed the generator of the codes. The generator polynomial also satisfies the equations $$g(\alpha^i)=0 \quad i=1, 3, 5, \ldots 2t-1$$

*Power sums*

The power sums $S_1, S_3 \ldots S_{2t-1}$ are obtained from a received binary digit sequence which was originally established in the format of a Bose-Chaudhuri-Hocquenghem error-correcting code through the relations $$S_i=r(a^i)=\sum_{j=1}^{t}\beta_j{}^i \qquad i=1, 3, 5, \ldots 2t-1$$

where $t$ is the number of independent errors which the code has the capability of correcting in the received sequence, and $\beta_j (j=1, 2 \ldots t)$ are the error locators. For example, if $\beta_j=a^1$, then $r_i$ is in error. The $\beta_j$'s are the roots of the error-location polynomial $$\sigma(x)=x^t+\sigma_1x^{t-1}+\sigma_2x^{t-2}+ \ldots \sigma^t$$
$$=(x-\beta_1)(x-\beta_2) \ldots (x-\beta^t)$$

The even power sums $S_2$, $S_4$, etc. are derivable from the odd power sums $S_3$, $S_5$, etc. as $S_{2i}=(S_i)^2$. Thus, it is an unambiguous statement if the even power sums are left out of any listing of the power sums.

*Elementary symmetric functions*

The power sums $S_i (i=1, 3 \ldots 2t-1)$ may be transformed into the elementary symmetric functions $$\sigma_k (k=1, 2 \ldots t)$$

through the solution of a set of $t$ simultaneous linear algebraic equations.

*Error-location polynominal*

The polynomial $$F(x)=x^t+\sigma_1x^{t-2}+ \ldots \sigma_t$$
$$=(x-\beta_1)(x-\beta_2) \ldots (x-\beta_t)$$

is termed the error-location polynomial whose roots $\beta_j$ are the error positions in a received binary digit sequence. The $\sigma_k (k=1, 2 \ldots t)$ are the elmentary symmetric functions and $t$ is the number of independent errors which the Bose-Chaudhuri-Hocquenghem code has the capability of correcting in a received sequence.

*Syndromes*

A syndrome of a received digit sequence which was originally established in the format of a codeword of an error-correcting code is a function of the sequence which indicates the presence and nature of an error. The power sums $S_i (i=1, 3 \ldots 2t-1)$ obtained from the received sequence, $$r(x)=r_0+r_1x+r_1x^2+ \ldots r_{n-1}x^{n-1}$$

which was originally established in the format of a codeword of a $t$ error-correcting Bose-Chaudhuri-Hocquenghem code, are syndromes of the error pattern in the sequence.

SUMMARY OF INVENTION

An error-correcting code consists of a plurality of codewords whose mathematical structure and relationships permit reconstruction within the capability of the code of a codeword when it has been materially changed. For transmission or storage of digital information through use of an error-correcting code, information is established in the format of a codeword of the code. The original digits of the information are incorporated with check digits to form an encoded sequence of digits which is a codeword of the code. Under one encoding procedure, the information digits and the check digits are maintained integral in the encoded sequence; while under another encoding procedure, the original information digits are not directly recognizable. In either circumstance, a decoding procedure is required which utilizes the structure and properties of the code.

Every error-correcting code has a certain capability for error-detection and error-correction. The codewords of a linear code have a relationship such that a codeword is derivable from one or more other codewords. One class of linear codes is the cyclic code in which a codeword is transformed to another by a cyclic shift of its digits.

There are two main categories of error patterns which may occur during transmission or storage of a digital information word. In a burst error pattern, there is a span of digits which may be corrupted. In a multiple independent error pattern, there is a number of errors which may occur anywhere in the codeword.

One prior art technique has provided for correction of an error pattern in a received binary digit sequence which was originally established in the format of a codeword of a cyclic code by obtaining a parameter of the sequence termed its syndrome, and by operating on the syndrome to determine and correct the error pattern in step with cyclic shift of the digits of the sequence. Essentially, this technique utilizes only the cyclic property of the cyclic code to correct the error pattern.

Another prior art technique has provided for correction of a multiple independent error pattern in a received sequence which was originally established in the format of a codeword of a cyclic Bose-Chaudhuri-Hocquenghem (BCH) code by obtaining parameters known as power sums ($S_i$) from the received sequence, by transforming the powers sums to corresponding elementary symmetric functions ($\sigma_k$), and by calculating the locations of the errors through trial and error. Essentially, this technique utilizes only the algebraic structure of the BCH code to correct the multiple independent error pattern.

Patent application S.N. 244,702 by R. T. Chien and assigned to the assignee hereof provides a procedure based on the foregoing technique for correcting multiple burst error patterns in a received sequence.

It has been discovered for this invention that both the algebraic structure and cyclic property of a Bose-Chaudhuri-Hocquenghem code may be utilized to correct a multiple independent error pattern in a received digit sequence which was originally established in the format of a codeword of the code.

The algebraic structure and the cyclic property are utilized to transform cyclically paramount algebraic parameters in the finite field which characterizes the BCH code. After each transformation of these parameters, a simple function of the parameters is evaluated. When the function is equal to unity, an error position is detected in the high order position of a received sequence corresponding to the equivalent codeword cyclically shifted.

Generally, this invention provides a procedure for decoding any error-correcting code for a multiple independent error pattern which has an operational relationship among its codewords such that any codeword may be obtained from other codewords of the code by a transformation. A plurality of parameters are obtained for a received sequence which identify the presence of an error pattern in the sequence. The parameters are operated on by powers of another parameter which defines the code itself, and the resulting functions are evaluated according to a logic circuit to obtain an indication of which positions in a received sequence are in error. An erroneous position is then corrected by interacting the indication through a logic circuit with the corresponding digit of the received sequence.

In greater detail, this invention provides a procedure for decoding a received digit sequence which was originally established in the format of a Bose-Chaudhuri-Hocquenhem code. A plurality of power sums are derived from the received sequence to indicate the presence of an error pattern therein. Finally, the power sums are operated on in the finite field which defines the code to obtain an indication of the error positions in cyclic relation to the received sequence.

The first aspect of the invention provides a procedure for correcting a multiple independent error pattern in a received binary digit sequence, where the number of errors is $t$. The original information binary digit sequence is established in the format of a codeword of a BCH code. The power sums $S_1, S_3, \ldots S_{2t-1}$ are obtained for the received sequence and are transformed to the elementary symmetric functions $\sigma_1, \sigma_2, \ldots \sigma_t$. Each elementary symmetric function $\sigma_k$ is multiplied by the respective $k_{th}$ power of the primitive element $\alpha$ of the finite field $GF(2^m)$ which defines the BCH code, where $n=2^m-1$ is the length of the binary digit sequence and where no more than $m \times t$ check digits are required to correct the $t$ independent errors in the sequence. The sum $$\sum_{k=1}^{t} \sigma_k$$

is formed for each plurality of sequential products, and when the summation equals 1, an error location in the received sequence is determined. In cyclic relation to the formation of the $\alpha^k \times \sigma_k$ products, when an error location has been determined, it is corrected by altering the digit for which $$\sum_{k=1}^{t} \sigma_k = 1$$

The second aspect of the invention provides a procedure for correcting a multiple independent error pattern in a received digit sequence which was originally established in the format of a codeword of a BCH codeword. A plurality of power sums $S_1, S_3, \ldots S_{2t-1}$ are obtained from the received sequence. They are then multiplied by the corresponding element $\alpha^1, \alpha^3, \ldots \alpha^{2t-1}$ from the finite field which defines the code. After each multiplication a logical procedure determines if $$\sum_{k=1}^{t} \sigma_k(S_1, S_3, \ldots S_{2t-1}) = 1$$

When the sum is 1, an error location is ascertained in the received sequence at a position in cyclical relationship to the multiplication operation.

The first preferred embodiment of the invention for the practice of the first aspect thereof uses a (15, 7) BCH code, i.e., a code in which each codeword has a total of fifteen binary digits of which seven are information digits and eight are check digits. The first and third power sums $S_1$ and $S_3$ are obtained for a received sequence. The power sums $S_1$ and $S_3$ are transformed to elementary symmetric functions $\sigma_1$ aund $\sigma_2$. The elementary symmetric functions are operated on by the first and second powers $a^1$ and $a^2$ of the primitive element $\alpha$ which definies the finite field $GF(2^4)$. The finite field $GF(2^4)$ is a table of parameters characteristic of the particular BCH code being employed in the form of four-digit sequences. As each sequential plurality of products of the elementary symmetric functions by the powers of the primitive element are obtained, a summation of the products provides an indication of the correctness or error of sequential positions of the received sequence and each erroneous position is corrected.

In the second preferred embodiment for the practice of the second aspect of the invention with a (15, 7) BCH code, the power sums $S_1$ and $S_3$ are operated on by the respective powers $\alpha^1$ and $\alpha^3$ of the primitive element which defines the finite field characteristic of the Bose-Chaudhuri-Hocquenghem code being employed and each sequential plurality of products is summed, and a logical procedure identifies the error locations of the received codeword through obtaining an indication of $$\sum_{k=1}^{t} \sigma_k(S_1, S_3, \ldots S_{2t-1})$$

i.e., the sum of the elementary symmetric functions expressed in terms of the power sums.

It is an object of this invention to provide a procedure for decoding an independent error-correcting code which takes advantage of its mathematical structure and transformation property.

It is another object of this invention to provide a procedure for decoding an independent error-correcting code which takes advantage of its algebraic structure and transformation property.

It is another object of this invention to provide a procedure for decoding a cyclic independent error-correcting code which takes advantage of its algebraic structure and cyclic property.

It is another object of this invention to provide a procedure for decoding Bose-Chaudhuri-Hocquenghem error-correcting codes which takes advantage of their algebraic structure and cyclic property.

It is another object of this invention to provide apparatus for decoding a Bose-Chaudhuri-Hocquenghem error-correcting code which utilizes one parity check circuit.

It is another object of the invention to provide a parity check circuit for Bose-Chaudhuri-Hocquenghem codes which may be utilized to obtain each of the power sums $S_i(i=1, 3 \ldots 2t-1)$ from the digits of a received binary digit sequence.

It is another object of this invention to provide a circuit for obtaining a multiplicative operation in a finite field.

It is another object of this invention to provide a procedure for solving a polynomial equation for its roots in a finite field.

It is another object of this invention to provide a procedure for locating error positions in a received digit sequence, which was originally established in the format of a codeword of a Bose-Chaudhuri-Hocquenghem error-correcting code. The procedure identifies the error positions in cyclic relationship to the digits of the sequence by transforming a function derived from the received sequence in the finite field which defines the code.

It is another object of this invention to provide a procedure for locating error positions in a received binary digit sequence which was orginally established in the format of a codeword of an error-correcting Bose-Chaudhuri-Hocquenghem code. The procedure obtains power sums $S_i(i=1,3, \ldots 2t-1)$ from the received sequence and transforms them cyclically in the finite field which defines the code. The error positions are identified in the received sequence in accordance with the cyclic property of the code.

It is another object of this invention to provide a procedure for locating error positions in a received binary digit sequence which was originally established in the format of a codeword of a Bose-Chaudhuri-Hocquenghem $t$ error-correcting code. The procedure obtains power sums $S_i(i=1,3, \ldots 2t-1)$ from the received sequence characterized as a polynomial $$r(x) = r_0 + r_1x + \ldots r_{n-1}x^{n-1}$$

Elementary symmetric functions $\sigma_k (k=1, 2 \ldots t)$ are obtained from the power sums. The elementary symmetric functions are cyclically transformed in the finite field which defines the code by multiplying each $\sigma_k$ by the finite field $GF(2^m)$ element $\alpha^k$. The transformed products are summed and the sum provides an indication of which positions of the received sequence are in error.

The foregoing and other objects, features and advantages of the invention will be apparent from the following more particular description of preferred embodiments of the invention, as illustrated in the accompanying drawings of which:

FIGURE 1A is a functional block diagram illustrating a preferred embodiment of the invention for the practice of the first aspect thereof. It shows that power sums $S_1, S_3, \ldots S_{2t-1}$ are obtained from a received binary digit sequence which was originally established in the format of a codeword of a Bose-Chaudhuri-Hocquenghem code.

The elementary symmetric functions $\sigma_1, \sigma_2, \ldots \sigma_t$ derived from the power sums are multiplied by the corresponding powers $\alpha^1, \alpha^2, \ldots \alpha^t$ of the primitive element of the finite field which characterizes the code. As the elementary symmetric functions are sequentially transformed by the finite field elements, the sum of each sequential plurality of products is obtained. If it is unity, the corresponding digit of the received sequence is an error.

FIGURE 1B is a line diagram illustrating the error locations in the received digit sequence in terms of the elements of the finite field which characterizes the Bose-Chaudhuri-Hocquenghem code used for the implementation of the invention. It shows the roots of the derived error location polynomial as the elementary symmetric functions $\sigma_1$ and $\sigma_2$ are obtained, and of the transformed polynomial after six transformations have occurred.

FIGURE 1C is a functional block diagram illustrating the functional relationships among units of the first preferred embodiment shown in FIGURE 2. It shows that alternate received binary digit sequences are established in different buffer registers. The power sums $S_1$ and $S_3$ are obtained from a received sequence. The elementary symmetric functions $\sigma_1$ and $\sigma_2$ are obtained from $S_1$ and $S_3$ via intermediate steps in which $S_1^2$ and $S_3/S_1$ are obtained. After $\sigma_1$ and $\sigma_2$ are multiplied for each sequential transformation by the powers $\alpha$ and $\alpha^2$ of the primitive element which characterizes the Bose-Chauduri-Hocquenghem code, the sum of the transformed products is obtained. When the sum equals unity, the modulo-2 sum with the corresponding digit in the buffer is obtained to correct the located error.

FIGURE 1D is a schematic diagram of the second preferred embodiment of the invention for correcting two independent errors in a (15, 7) Bose Chaudhuri Hocquenghem code. It shows how the summation $$\sum_{k=1}^{t} \sigma_k = 1$$

is obtained in terms of the power sums $S_1$ and $S_3$.

FIGURE 1E is a functional block diagram illustrating the practice of the second aspect of the invention. It shows that the power sums $S_1, S_3, \ldots S_{2t-1}$ are transformed by the respective power of the primitive element $\alpha$ of the finite field which defines the Bose-Chaudhuri code. It shows how the summation $$\sum_{k=1}^{t} \sigma_k = 1$$

is obtained in terms of a determinant $\Delta$ and cofactor (A).

Figure 2A:
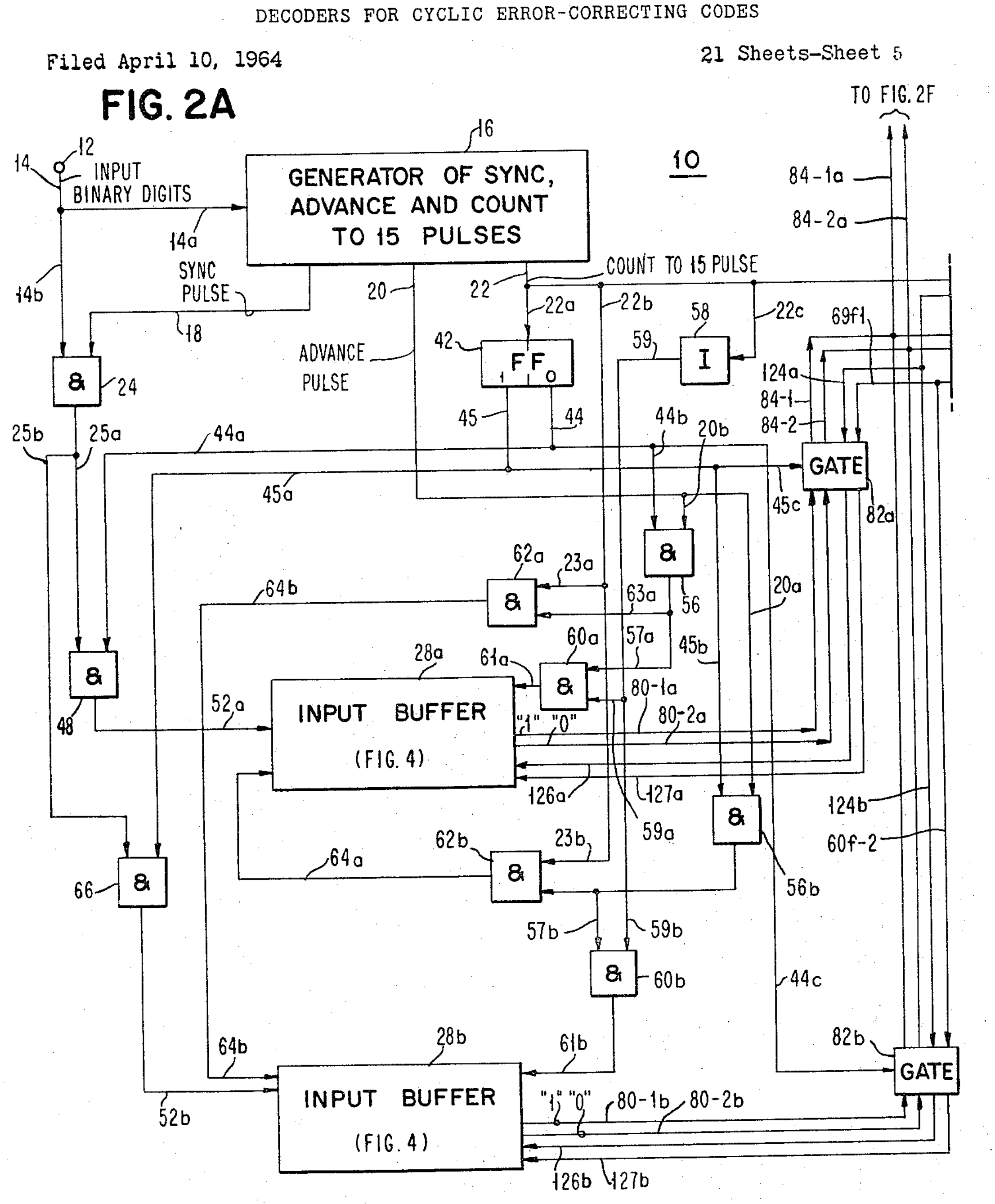
FIGURE 2A is a schematic diagram of the buffer section in which an alternate received sequence is established as the preceding received sequence is being processed.
Figure 2:
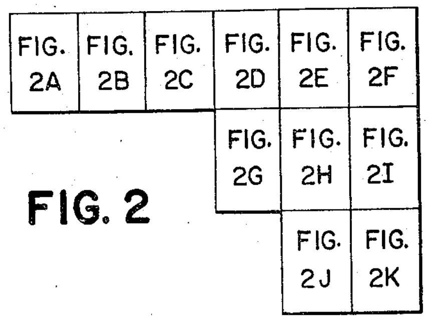
FIGURE 2 is a schematic diagram of the first preferred embodiment of the invention and corresponds to the functional block diagram of FIGURE 1C.
Figure 2B:
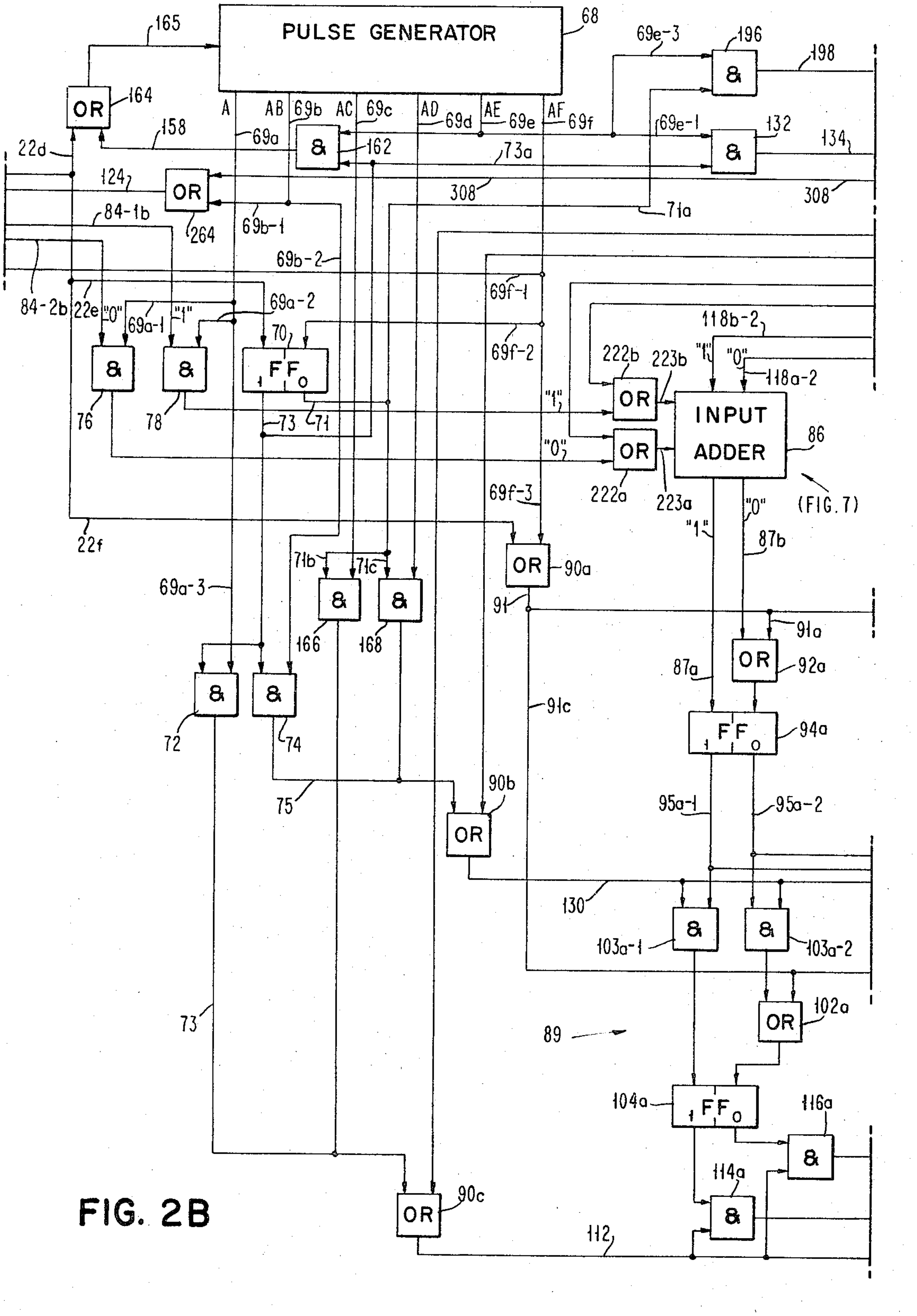
Figure 2C:
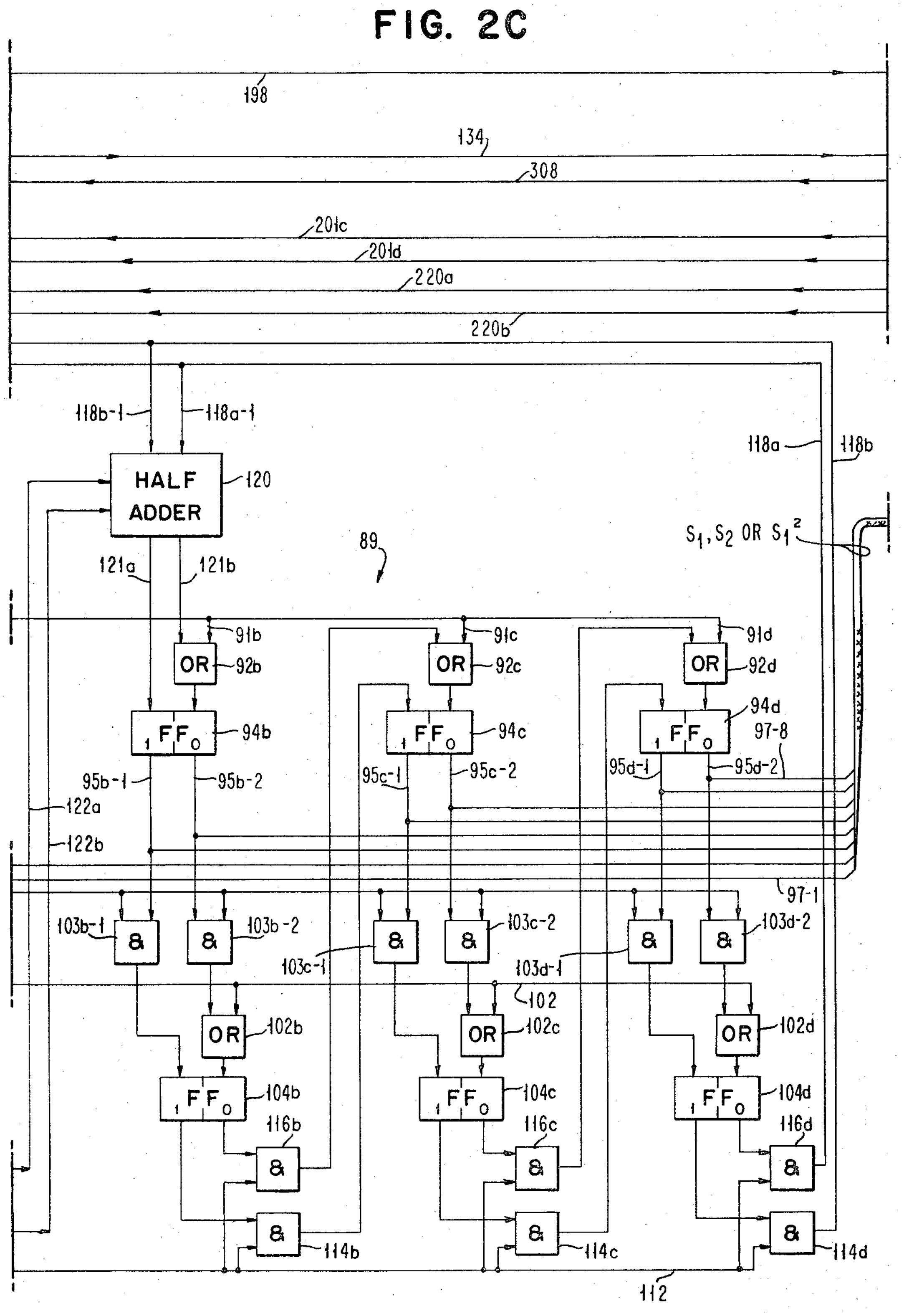
Figure 5:
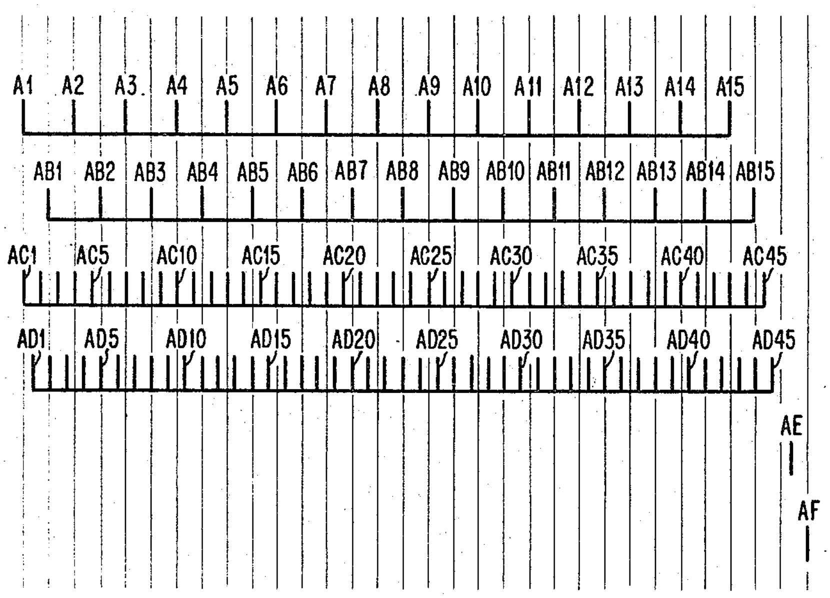

FIGURES 2B and 2C illustrate a parity check circuit provided for the practice of this invention for obtaining the power sums $S_1$ and $S_3$. The operation of the parity check circuit is under control of a pulse generator whose timing diagram is shown in FIGURE 5. The circuit is also used to obtain $S_1^2$.

Figure 2D:
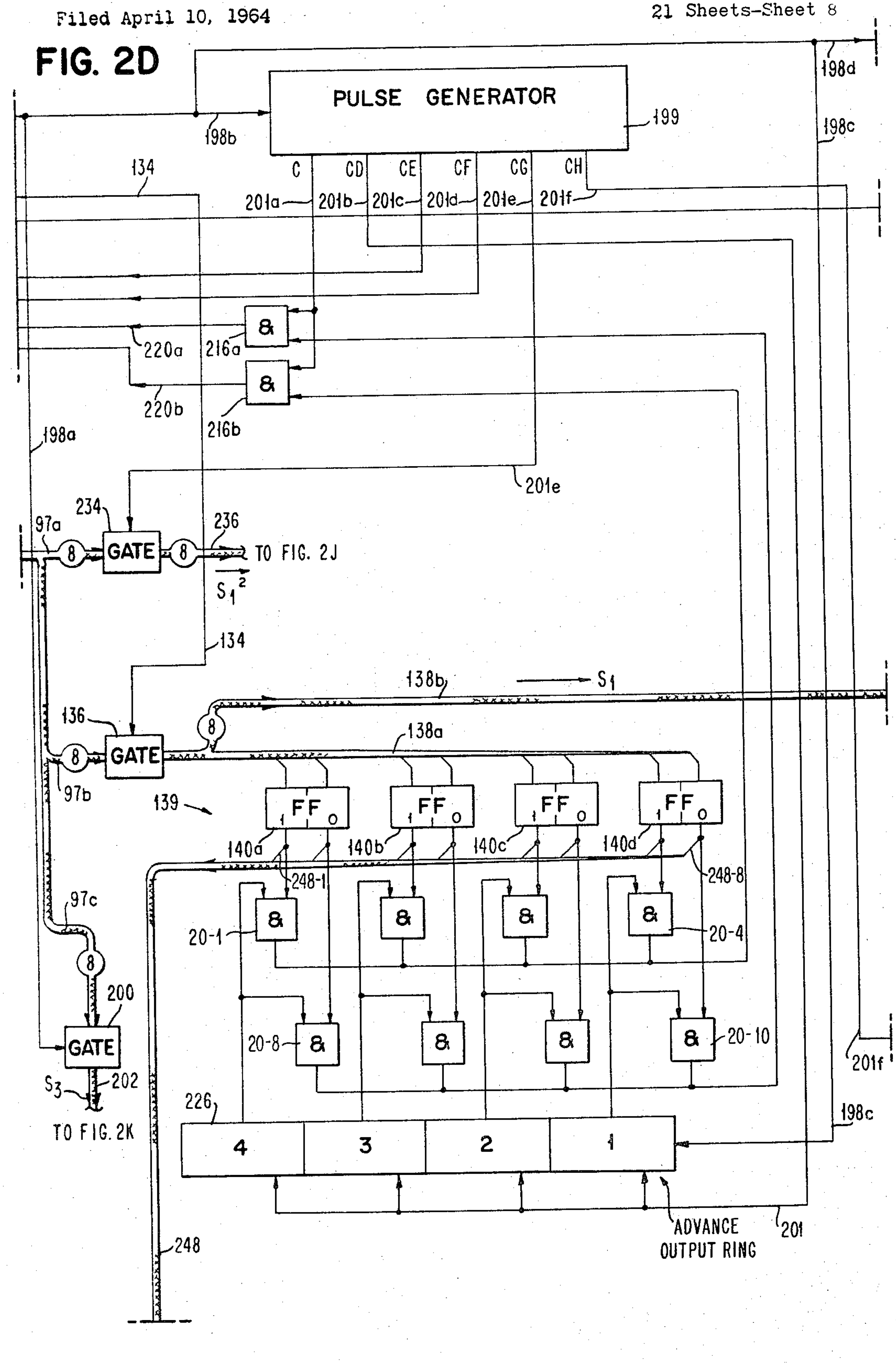
Figure 6:
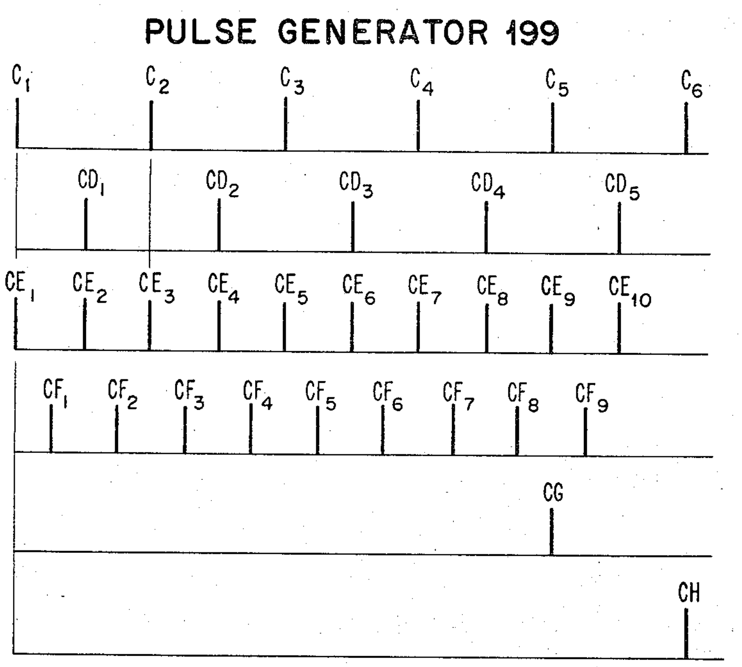

FIGURE 2D shows a buffer register for storing the power sum $S_1$ and a pulse generator, whose operation is in accordance with the timing diagram of FIGURE 6, which effects transfer of parameters from one portion of the embodiment to another.

Figure 2E:
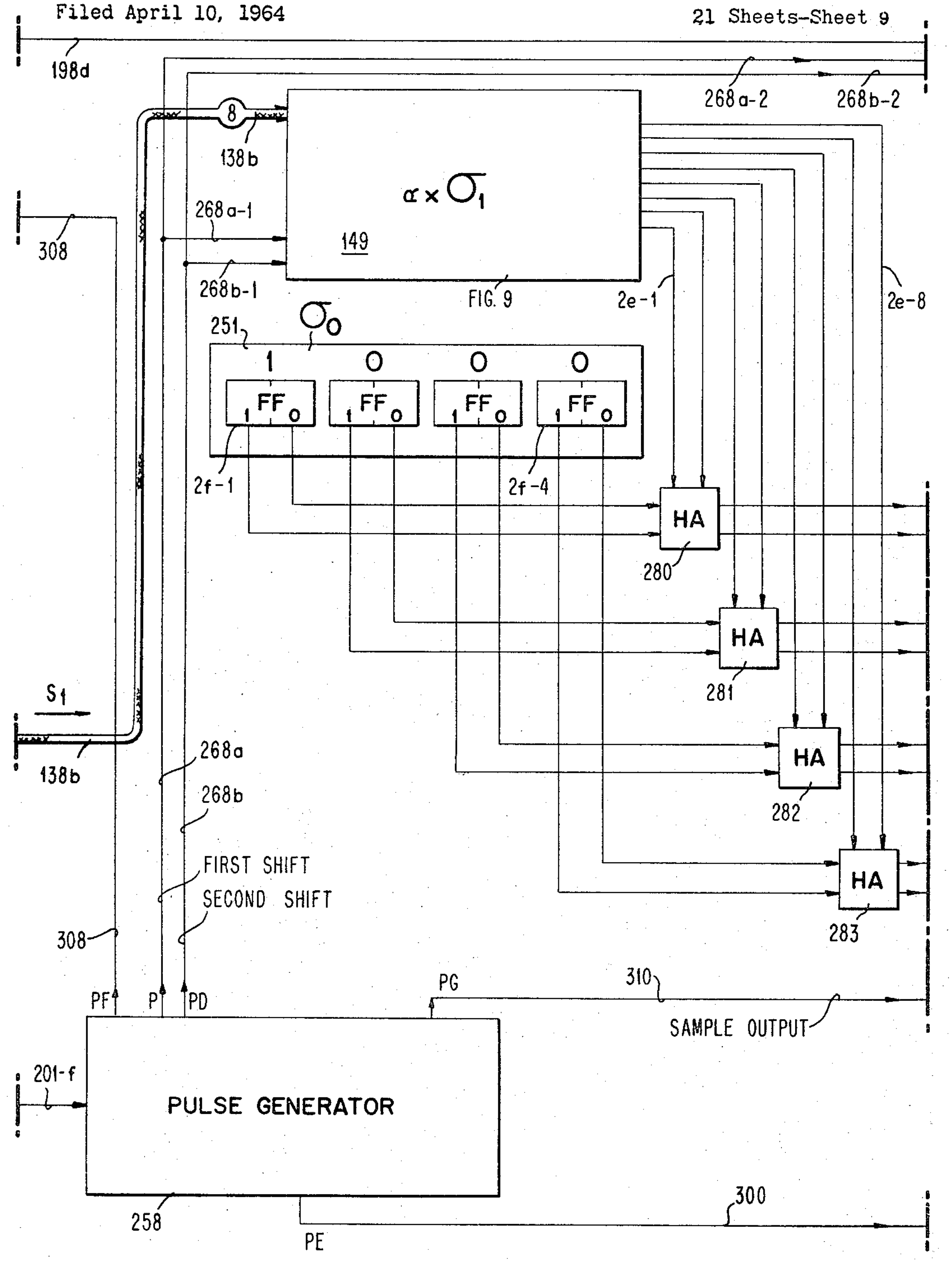
Figure 2F:
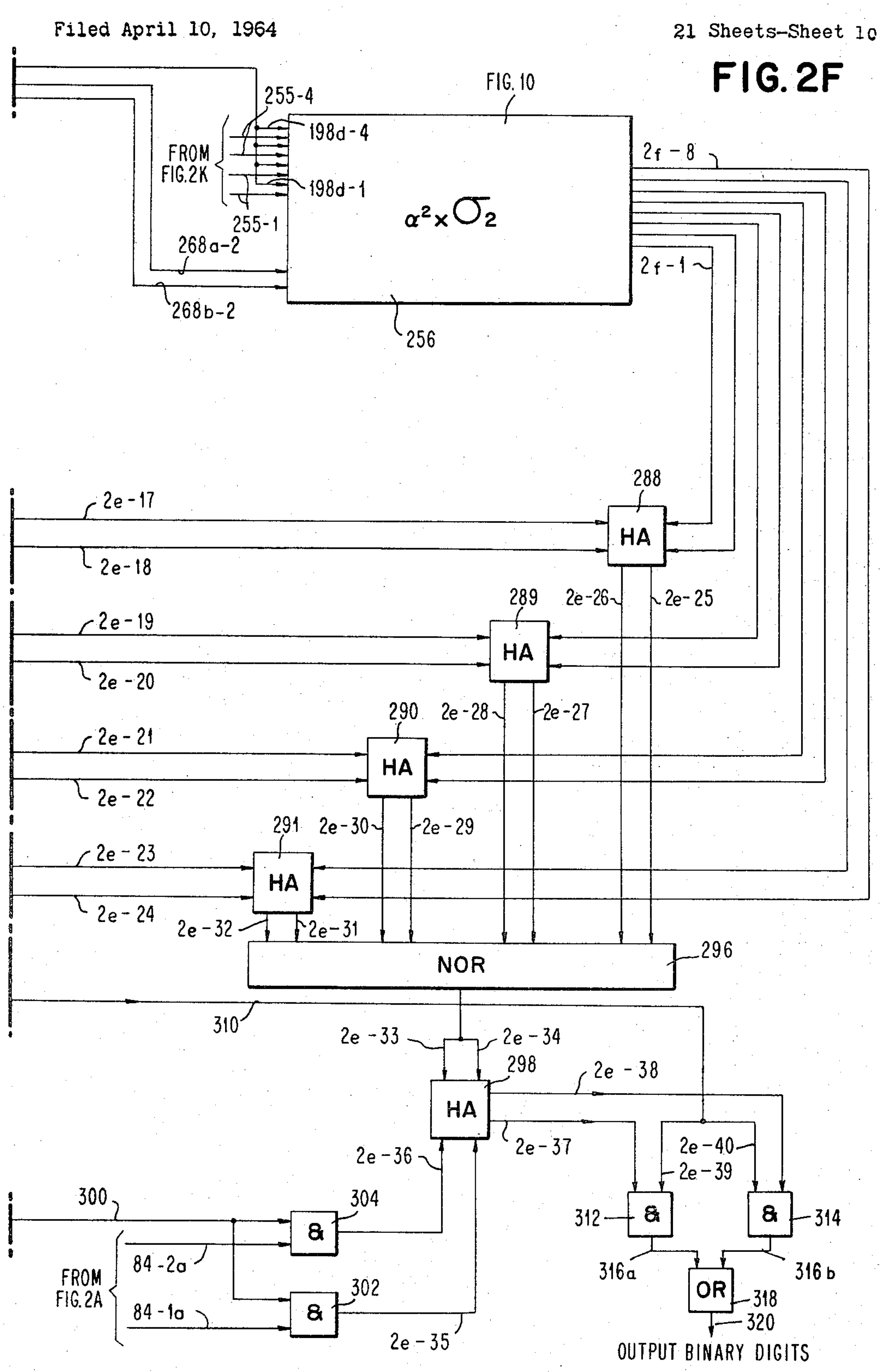
Figure 9:
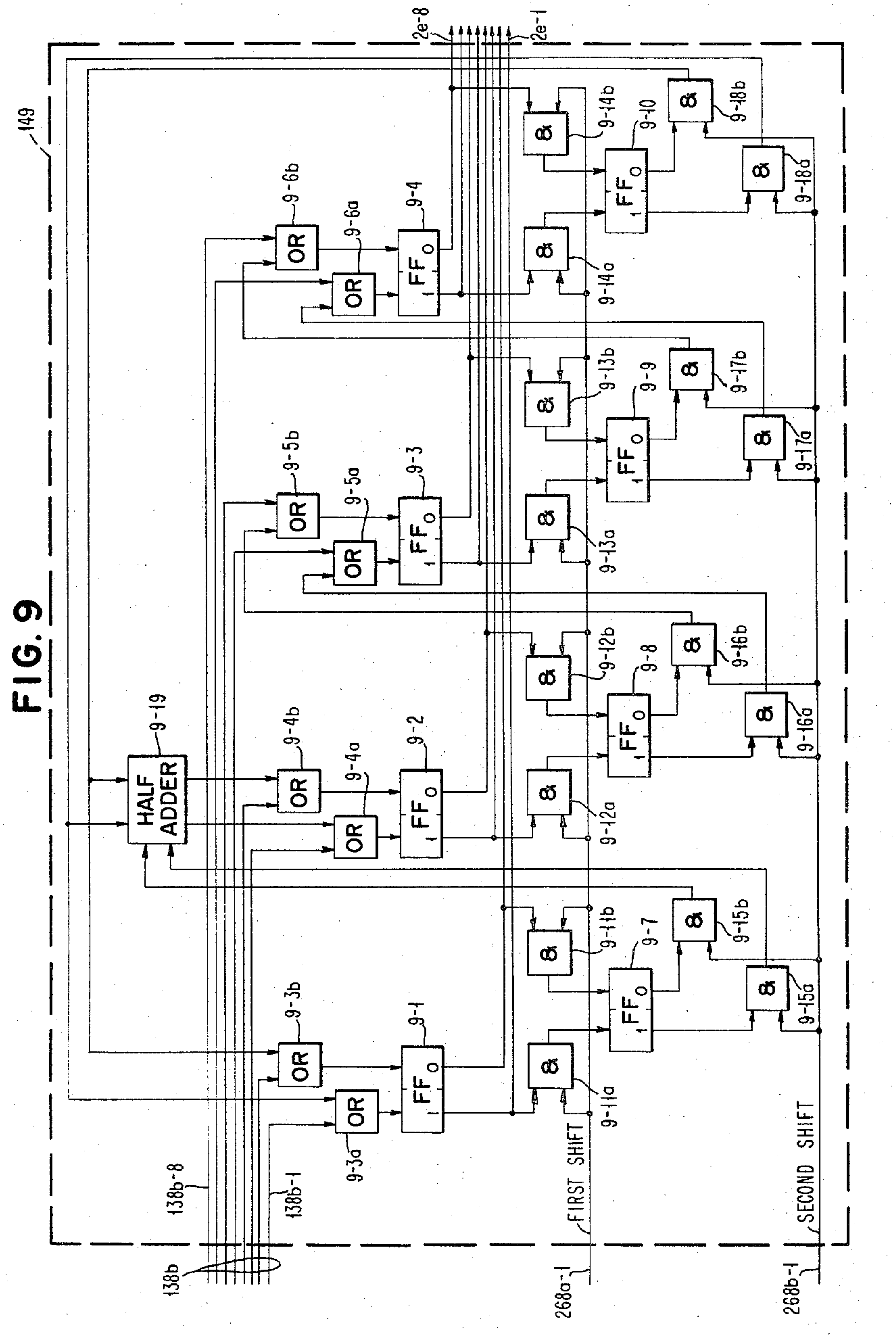
Figure 10:
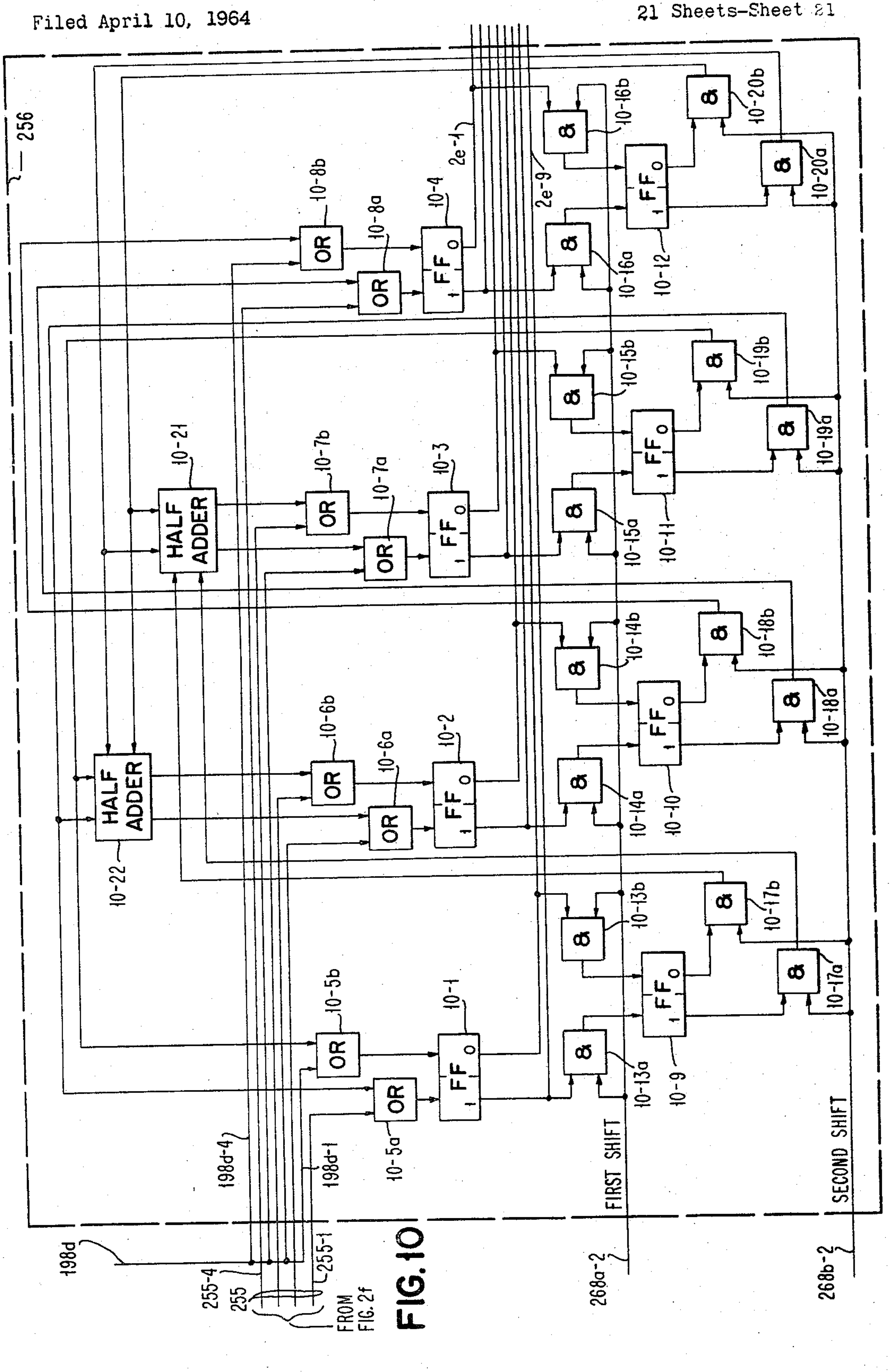

FIGURES 2E and 2F, when considered in conjunction with FIGURES 9 and 10, illustrate the manner in which elementary symmetric functions $\sigma_1$ and $\sigma_2$ are transformed to permit identification of the error locations in a received sequence through the particular sum of transformed products which equals unity.

Figure 2G:
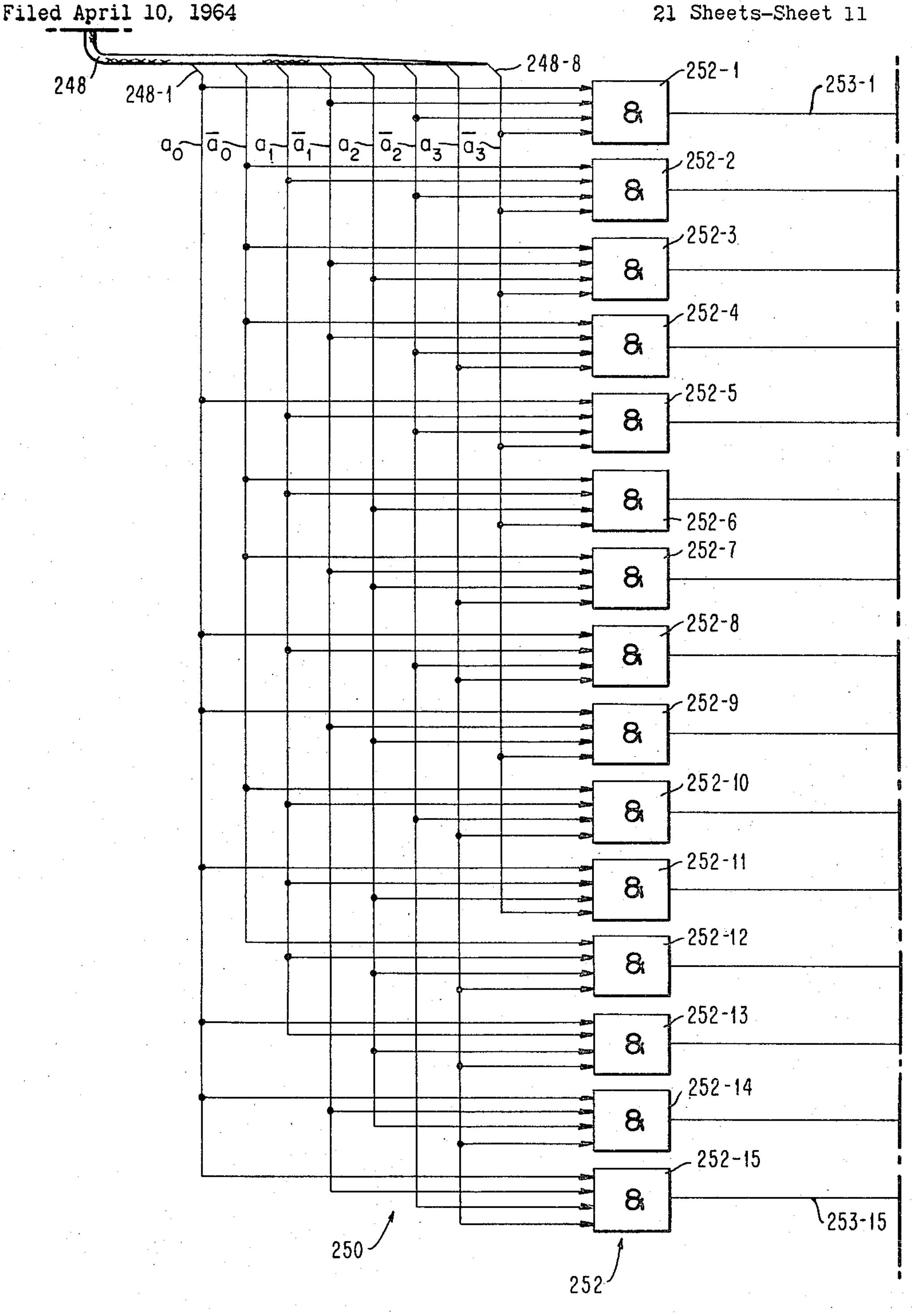
Figure 2H:
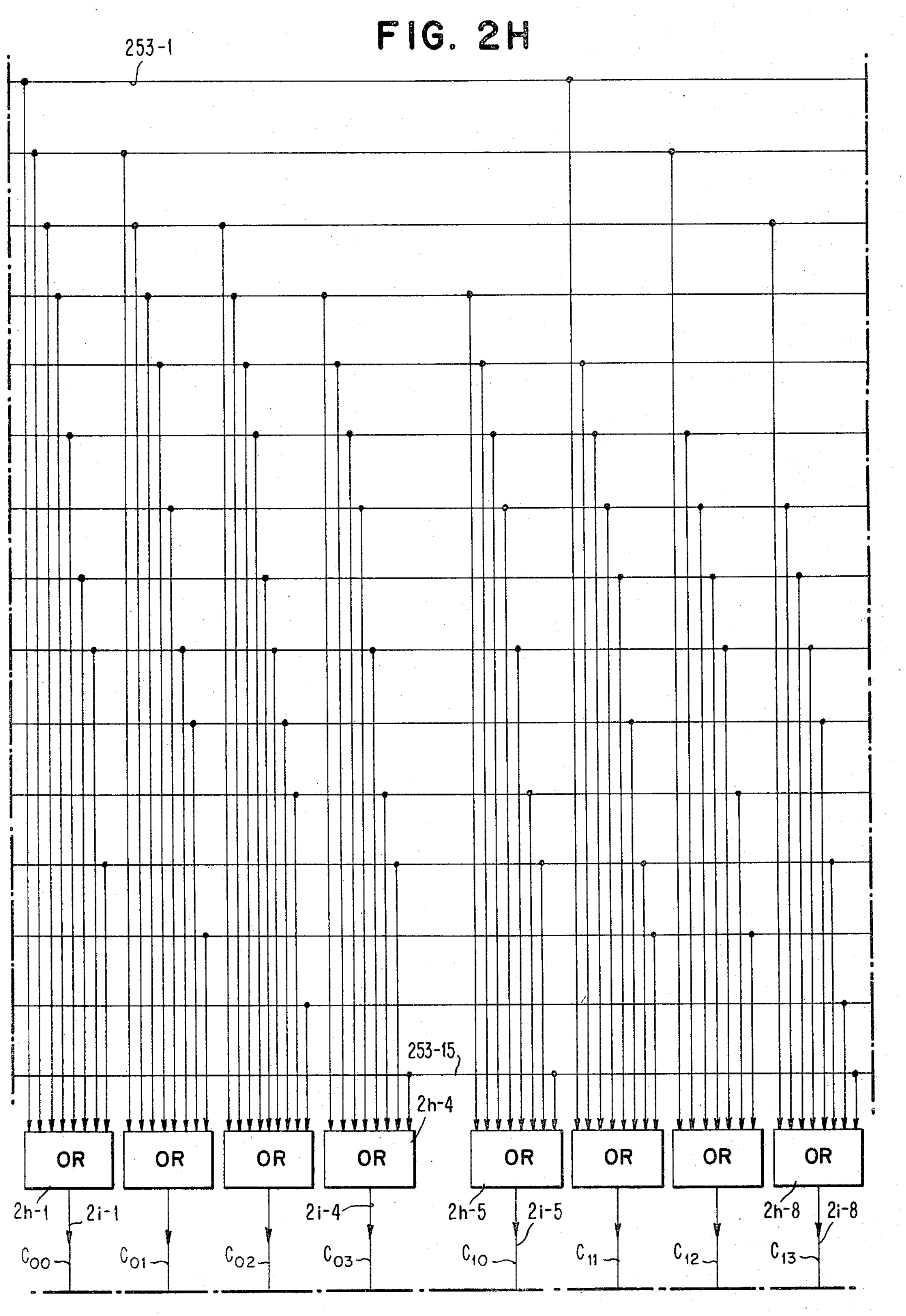
Figure 2I:
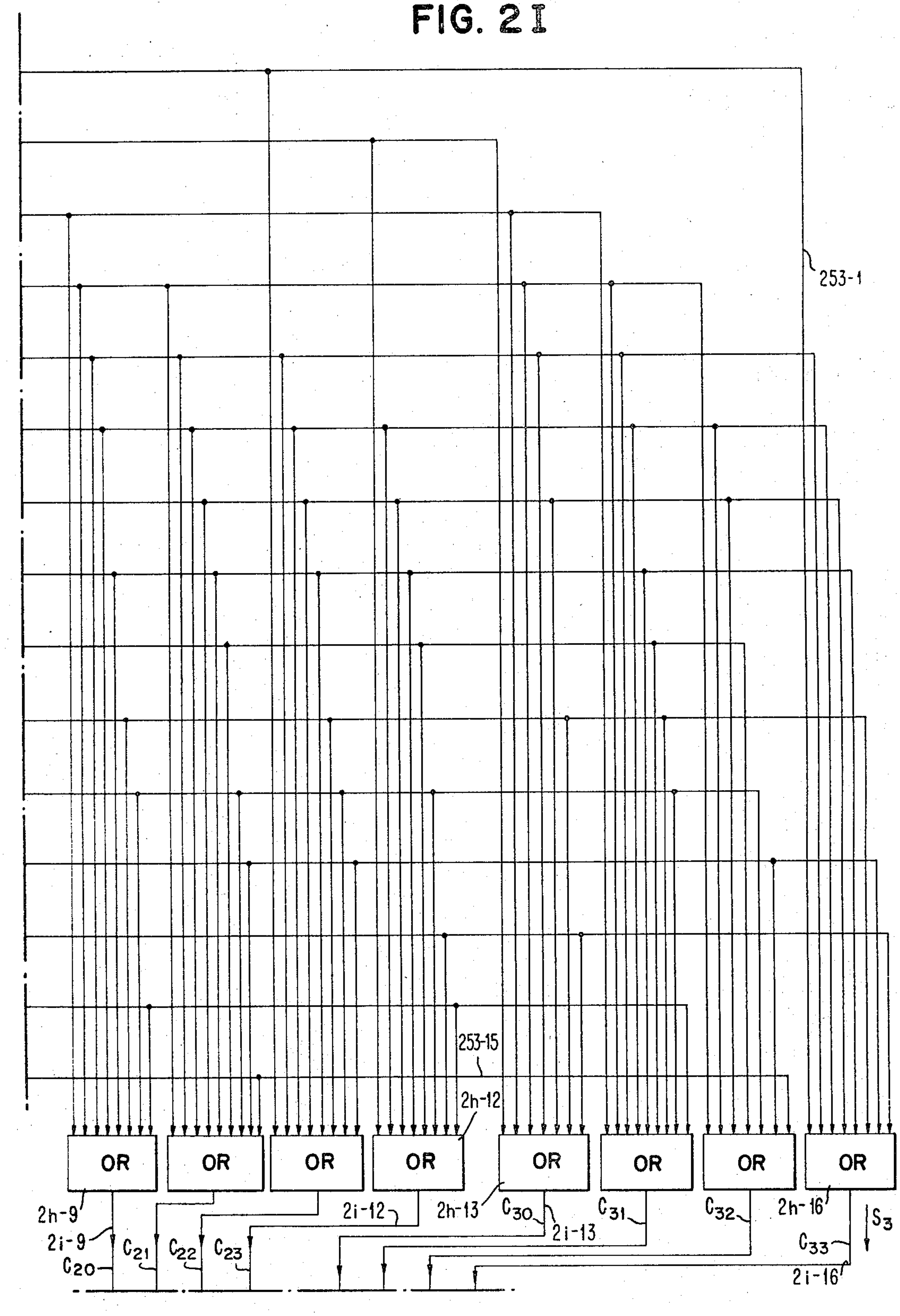

FIGURES 2G, 2H and 2I show logical circuitry for obtaining the quotient $S_3/S_1$.

Figure 2J:
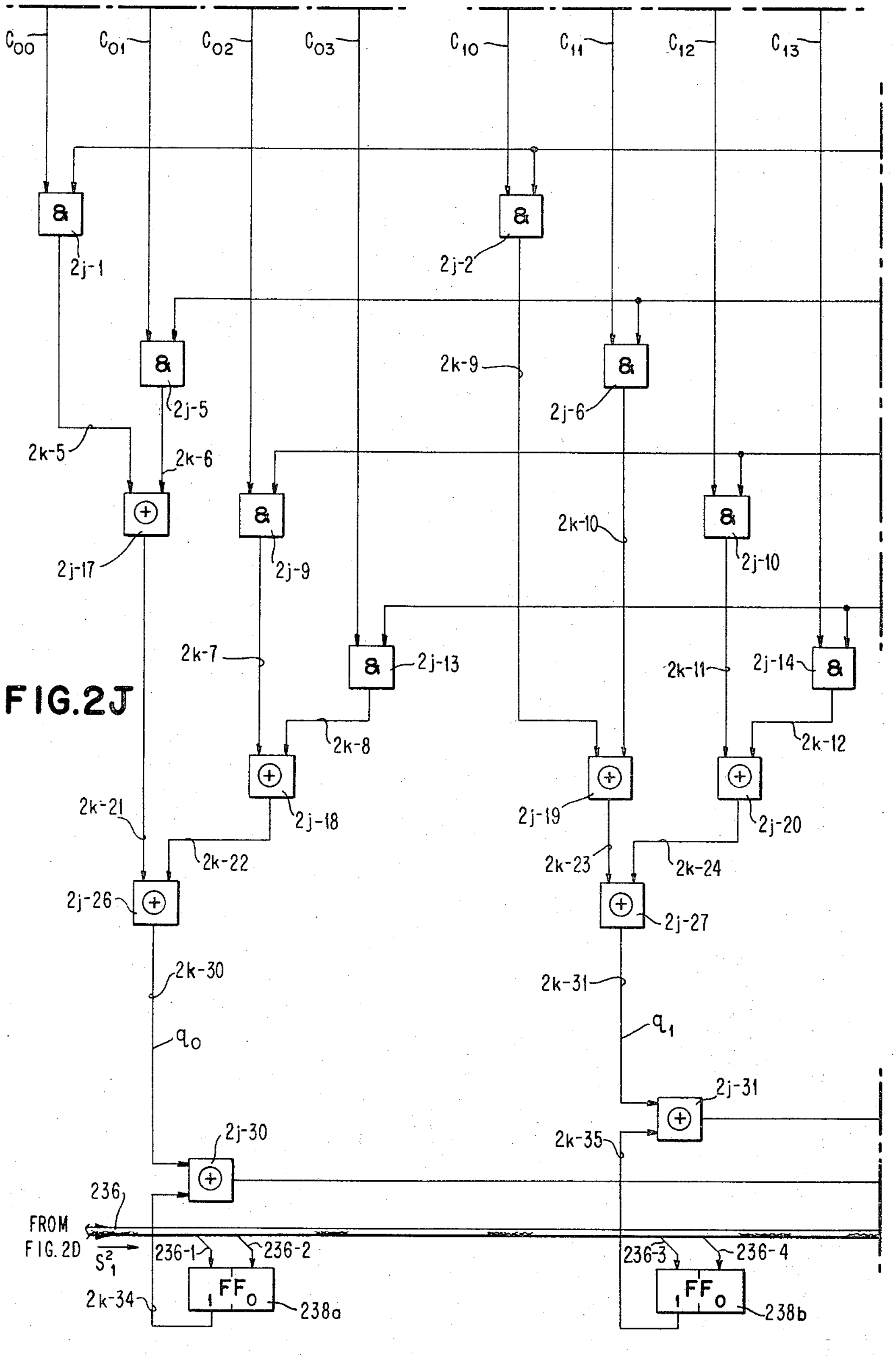
Figure 2K:
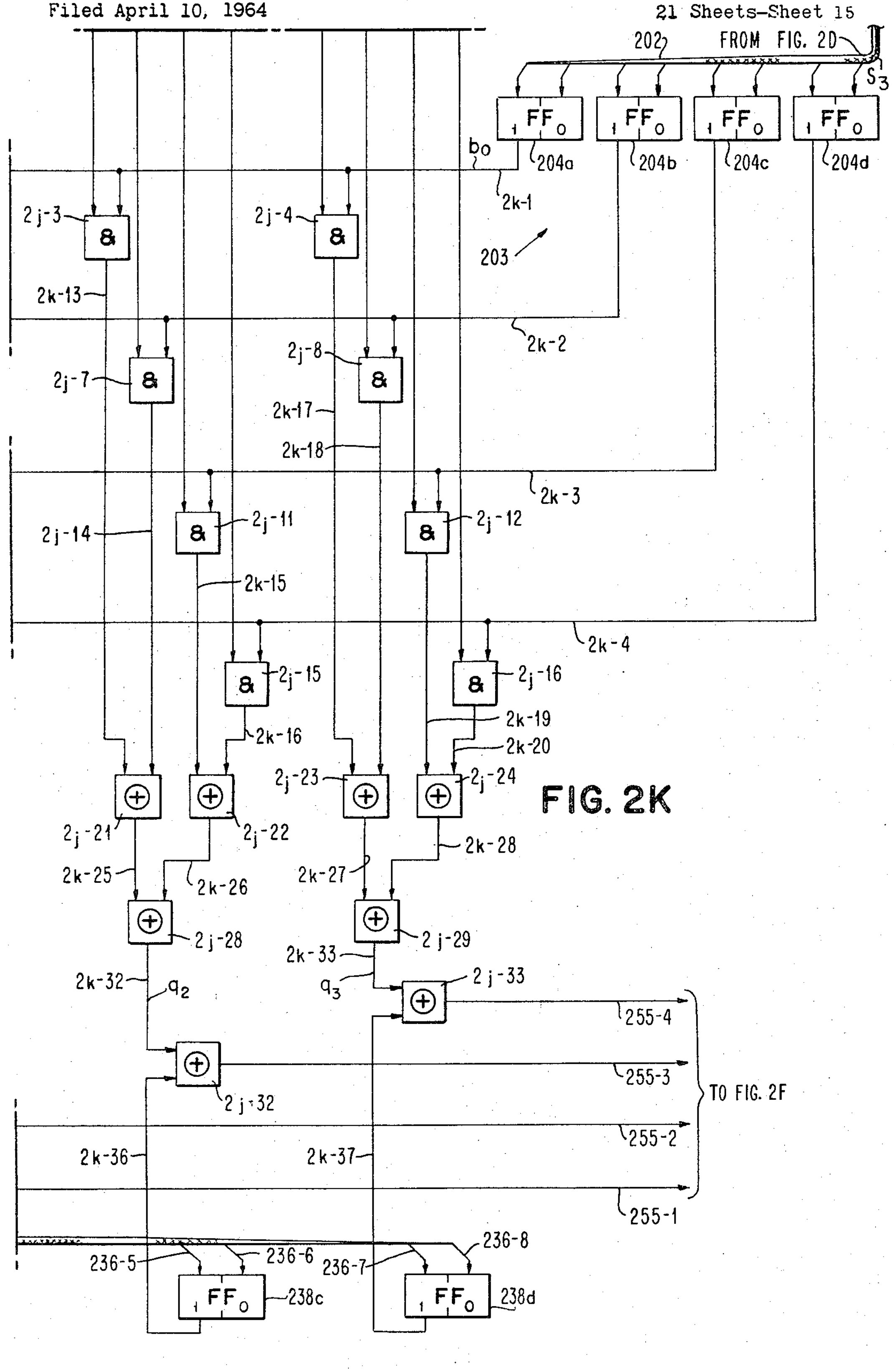

FIGURES 2J and 2K show logical circuitry for forming the sum $S_3/S_1 \oplus S_1^2 = \sigma_2$.

Figure 3:
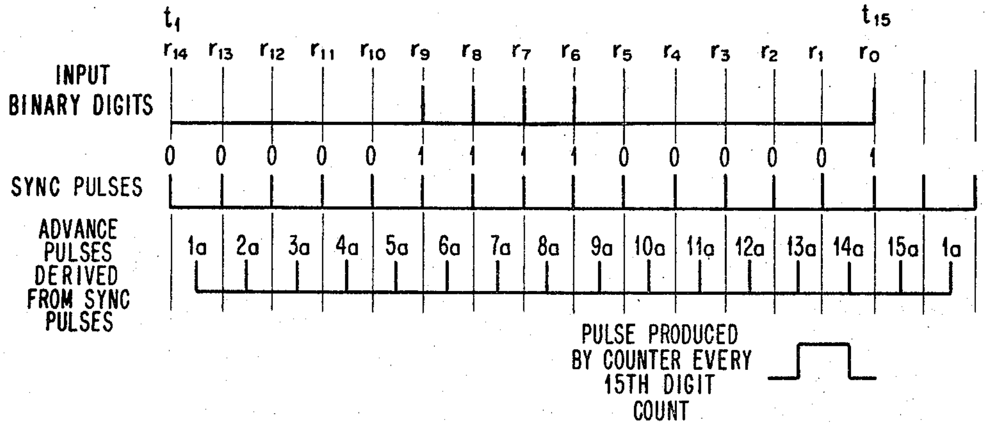

FIGURE 3 is a timing diagram which indicates the relationship of the digits in a received sequence to the timing pulses produced by the pulse generator of FIGURE 2A.

FIGURE 4 illustrates the structure of an input buffer shown in block form in FIGURE 2A.

FIGURE 5 is a timing diagram of the pulses produced by the pulse generator of FIGURE 2B.

FIGURE 6 is a timing diagram showing the pulses produced by the pulse generator of FIGURE 2D.

Figure 7:
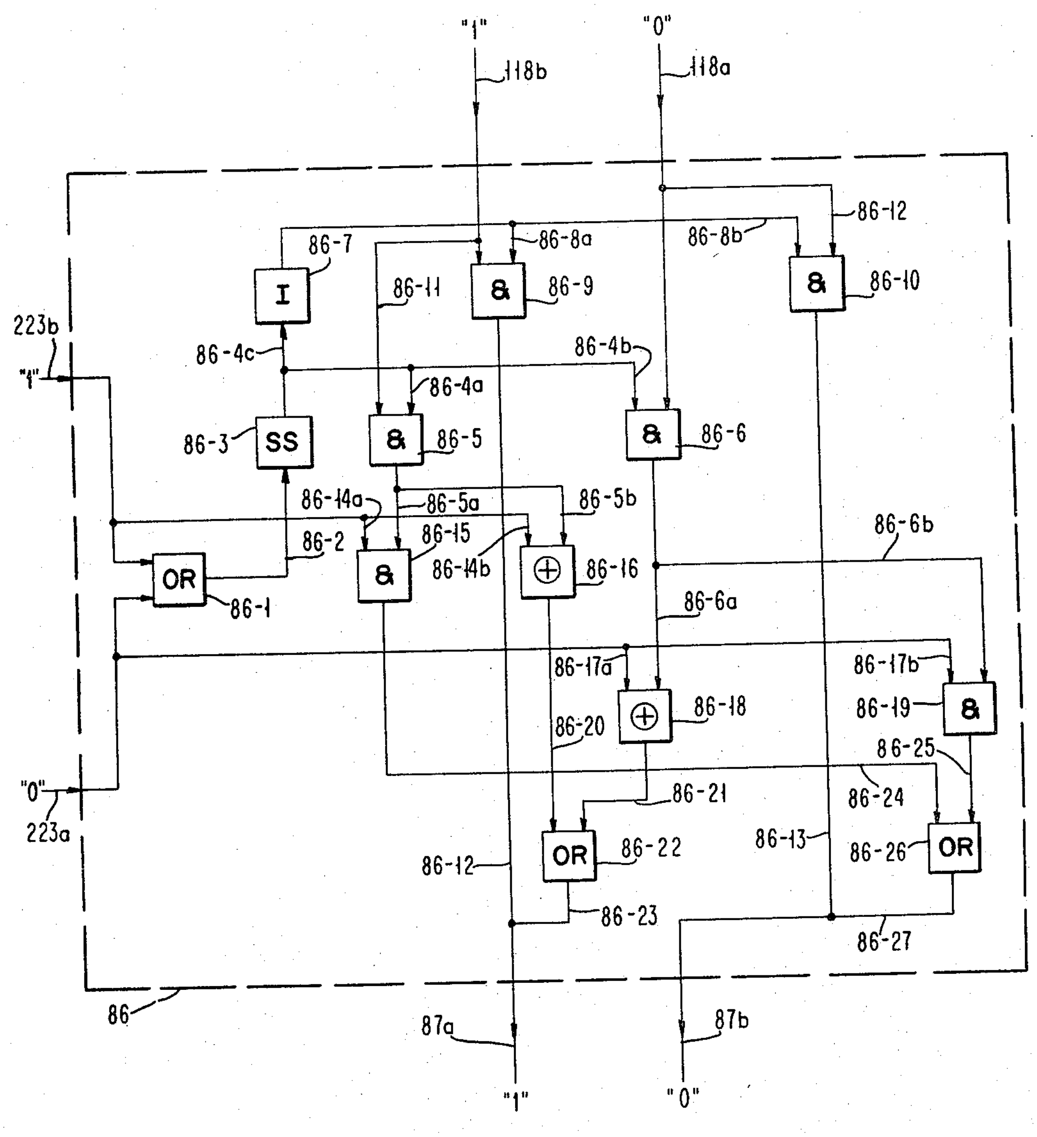

FIGURE 7 illustrates the structure of the input adder shown in block form in FIGURE 2B.

Figure 8:
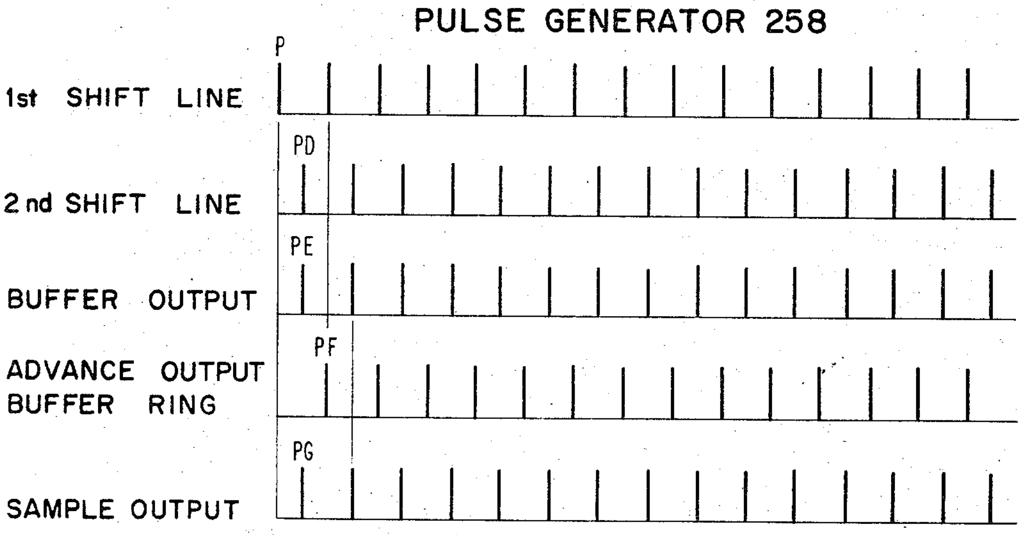

FIGURE 8 is a timing diagram showing the pulses produced by the pulse generator of FIGURE 2E.

FIGURE 9 illustrates the structure of the multiplier unit of FIGURE 2E for obtaining the sequential products of $\sigma_1$ times the finite field element $\alpha$.

FIGURE 10 shows the structure of a multiplier of FIGURE 2F for obtaining the sequential products of the finite field element $\alpha^2$ times each transformed elementary symmetric function $\sigma_2$.

THEORY OF INVENTION

Heretofore, Bose-Chaudhuri-Hocquenghem codes have been discussed for error-correction of multiple independent errors which occur during transmission or storage of an information word. Literature references which are particularly useful for background material are:

(a) "On a Class of Error Correcting Binary Group Codes," Information and Control, vol. 3, pages 68–79, 1960, by R. C. Bose and D. K. Chaudhuri.

(b) "Further Results on Error Correcting Binary Group Codes," Information and Control, vol. 3, pages 279–290, 1960, by R. C. Bose and D. K. Chaudhuri.

(c) "Codes Correcteurs d'erreurs," Chiffres, vol. 2, pages 147–156, Sept. 1959, by A. Hocquenghem.

Literature references which are particularly useful for the prior art material are:

(a) "Encoding and Error-Correction Procedures for the Bose-Chaudhuri Codes," IRE Transactions on Information Theory, vol. IT–6, pages 459–470, 1960, by W. W. Peterson.

(b) "An Electronic Decoder for Bose-Chaudhuri-Hocquenghem Codes," IRE Transactions on Information Theory, vol. IT–8, pages 517–524, Sept. 1962, by T. C. Bartee and D. I. Schneider.

(c) "Error-Correcting Codes and Their Implementation for Data Transmission Systems," IRE Transactions on Information Theory, vol. IT–7, pages 234–244, Oct. 1961, by J. E. Meggitt.

(d) "A Class of Error-Correcting Codes in $p^m$ Symbols," Journal of the Society for Industrial and Applied Mathematics, vol. 9, No. 2, pages 207–214, June 1961, by N. Zierler and D. Gorenstein. Literature references which are particularly useful for general interest material are:

(a) "Error-Correcting Codes," The M.I.T. Press and John Wiley and Sons, Inc., 1961, by W. W. Peterson.

(b) "Computation with Finite Fields," Information and Control, vol. 6, pages 79–98, 1963, by T. C. Bartee and D. I. Schneider.

Binary Bose-Chaudhuri-Hocquenghem codes have a block length or codeword length of $n=2^m-1$ digits, and no more than $m \times t$ check digits are required to correct any pattern of $t$ independent errors, where $m$ and $t$ are arbitrary positive integers. The number of information digits is identified herein by $k$ and a particular code as a $(n, k)$ code. A BCH code for correcting $t$ independent errors consists of the set of all polynomials $\{a(x)\}$ over GF(2) of degree no more than $n-1$ such that $$a(\alpha^i)=0 \text{ for } i=1, 3, 5, \ldots 2t-1 \quad (1)$$

where $\alpha$ is a primitive element of the finite field GF $(2^m)$, and where $$a(x)=a_0+a_1x+a_2x^2+ \ldots a_{n-1}x^{n-1}$$

and $$a_i=0, 1 \text{ for } i=0, 1, 2, \ldots n-1$$

The code polynomials consist of all the multiples of a generator polynomial $g(x)$ of the code with satisfy the equations $$g(\alpha^i)=0$$

for $$i=1, 3, 5, \ldots 2t-1 \quad (2)$$

Equivalently, if the coefficients of $a(x)$ are considered as a vector, the BCH code is defined as the set of all vectors of length $n$ digits orthogonal to the parity check matrix $$M=\begin{bmatrix} 1 & 1 & . & . & 1 \\ \alpha & \alpha^3 & . & . & \alpha^{2t-1} \\ \alpha^2 & \alpha^6 & . & . & a^{2(2t-1)} \\ \alpha^3 & \alpha^9 & . & . & \alpha^{3(2t-1)} \\ . & . & . & . & . \\ . & . & . & . & . \\ \alpha^{n-1} & \alpha^{3(n-1)} & . & . & \alpha^{(n-1)(2t-1)} \end{bmatrix} \quad (3)$$

i.e., as the set of all $a$'s (vectors) for which $$aM=0$$

where the vector $a$ is $$a=[a_0\ a_1\ a_2\ a_3 \ldots a_{n-1}] \quad (4)$$

Illustratively, for the finite field GF$(2^4)$ defined by the irreducible primitive polynomial $$f(x)=1+x+x^4 \quad (5)$$

the (15, 7) BCH code with $n=2^4-1=15$ digits block length, $k=7$ information digits, $m=4$, $t=2$ independent errors, and $m \times t=8$ check digits, consists of every polynomial of degree 14 or less which is a multiple of the generator polynomial $$\begin{aligned} g(x)&=(1+x+x^4)(1+x+x^2+x^3+x^4) \\ &=1+x^4+x^6+x^7+x^8 \end{aligned} \quad (6)$$

Since $g(\alpha)=g(\alpha^3)=0$, the parity check matrix for the (15, 7) BCH code is $$M=\begin{bmatrix} 1 & 0 & 0 & 0 & 1 & 0 & 0 & 0 \\ 0 & 1 & 0 & 0 & 0 & 0 & 0 & 1 \\ 0 & 0 & 1 & 0 & 0 & 0 & 1 & 1 \\ 0 & 0 & 0 & 1 & 0 & 1 & 0 & 1 \\ 1 & 1 & 0 & 0 & 1 & 1 & 1 & 1 \\ 0 & 1 & 1 & 0 & 1 & 0 & 0 & 0 \\ 0 & 0 & 1 & 1 & 0 & 0 & 0 & 1 \\ 1 & 1 & 0 & 1 & 0 & 0 & 1 & 1 \\ 1 & 0 & 1 & 0 & 0 & 1 & 0 & 1 \\ 0 & 1 & 0 & 1 & 0 & 1 & 1 & 1 \\ 1 & 1 & 1 & 0 & 1 & 0 & 0 & 0 \\ 0 & 1 & 1 & 1 & 0 & 0 & 0 & 1 \\ 1 & 1 & 1 & 1 & 0 & 0 & 1 & 1 \\ 1 & 0 & 1 & 1 & 0 & 1 & 0 & 1 \\ 1 & 0 & 0 & 1 & 1 & 1 & 1 & 1 \end{bmatrix} \quad 7)$$

If the received vector $r$ and associated polynomial $r(x)$ are $$r=[r_0\ r_1\ r_2 \ldots r_{n-1}]$$

and $$r(x)=r_0+r_1x+r_2x^2+ \ldots r_{n-1}x^{n-1} \quad (8)$$

then $$r(\alpha^i)=\sum_{j=1}^{t} \beta_j{}^i=S_i(i=1, 3, \ldots 2t-1) \quad (9)$$

where $\beta_j(j=1, 2, \ldots t)$ are the error terms, and $S_i$ are power sum functions.

Illustratively, for the (15, 7) BCH code, if the original binary digit sequence established in the format of a codeword is $$a=[100010111000000] \quad (10)$$

and if there are two errors at the fifth and tenth positions from the left, the received codeword is $$r=[100000111100000] \quad (11)$$

Therefore, $$r(\alpha^i)=\sum_{j=1}^{t} \beta_j{}^i(i=1, 3) \quad (12)$$

becomes $$\begin{aligned} r(\alpha)&=\alpha^4+\alpha^9=1+\alpha^3 \\ r(\alpha^3)&=\alpha^{12}+\alpha^{27}=\alpha^{12}+\alpha^{12}=0 \end{aligned} \quad (13)$$

as $a(\alpha)=a(\alpha^3)=0$.

Heretofore, the decoding procedure for a BCH code has included the following three steps:

(a) Parity check operations are performed on the received sequence $$r(x)=r_0+r_1(x)+r_2(x^2)+ \ldots r_{n-1}x^{n-1} \quad (14)$$

to obtain the power sums $S_i$, i.e., $$r(\alpha)=S_1,\ r(\alpha^3)=S_3, \ldots r(\alpha^{2t-1})=S_{2t-1} \quad (15)$$

(b) A set of $t$ simultaneous linear equations relating the power sums $S_i$ and the elementary symmetric functions $\sigma_k$ (for the binary case)

$$\left.\begin{aligned} &S_1+\sigma_1=0 \\ &S_2+\sigma_1S_1=0 \\ &S_3+\sigma_1S_2+\sigma_2S_1+\sigma_3=0 \\ &S_4+\sigma_1S_3+\sigma_2S_2+\sigma_3S_1=0 \\ &S_5+\sigma_1S_4+\sigma_2S_3+\sigma_3S_2+\sigma_4S_1+\sigma_5=0 \\ &\text{-------------------------} \\ &\sum_{i=0}^{n} S_i\sigma_{n-i}=0 \end{aligned}\right\} \quad (16)$$

are solved to obtain the error-location polynomial $$\begin{aligned} F(\chi)&=x^t=\sigma_1x^{t-1}+\sigma_2x^{t-2}+ \ldots \sigma_{t-1}x+\sigma_t \\ &=(x-\beta_1)(x-\beta_2) \ldots (x-\beta_t) \end{aligned} \quad (17)$$

The even power sums $S_2$, $S_4$, etc., are derivable from the odd power sums $S_1$, $S_3$, etc., as $S_{2i}=(S_i)^2$.

(c) The roots $\beta_j(j=1, 2, \ldots t)$ of $F(x)$ are calculated by a trial and error procedure.

This invention provides another procedure for obtaining the roots $\beta_j$ of the error-location polynomial $F(x)$. The transformation of the error-location polynomial $F(x)$ is effected in successive steps and at each step a determination is made whether unity is a root of the new error location polynomial and thereby identify an error location. It has been discovered for the practice of this invention that the summation of the elementary functions $$\sum_{k-1}^{t} \sigma_k=1$$

(for the binary case $-1=+1$) when an error location is at the higher order digit of a received sequence. If $\sigma_0$ is included in the summation, the condition for identification of an error location is $$\sum_{k=0}^{t} \sigma_k=0$$

In general, i.e., if binary digit sequences, ternary digit sequences, etc., in which the information is characterized are considered, the summation condition is $$\sum_{k=1}^{t} \sigma_k = -1$$

The theory of the invention will now be discussed with reference to FIG. 1B which is a line diagram illustrating the manner in which an error-location polynomial $F(x)$ with the elementary symmetric functions as coefficients is transformed to effect identification of $t$ error locations in a received sequence $$r(x) = r_0 + r_1 x + r_2 x^2 + \dots r_{n-1} x^{n-1}$$

Illustratively, for a (15, 7) BCH code with error positions at $r_9$ and $r_4$, the error-location polynomial is originally $$F(x) = x^2 + \sigma_1 x + \sigma_2$$

which may be written as $$\begin{aligned} F(x) &= x^2 + \alpha^{14} x + \alpha^{13} \\ &= (x+\alpha^4)(x+\alpha^9) \end{aligned} \qquad (18)$$

since $$\sigma_1 = 1 + \alpha^3 = \alpha^{14}$$

$$\sigma_2 = 1 + \alpha^2 + \alpha^3 = \alpha^{13}$$

Figure 1A:
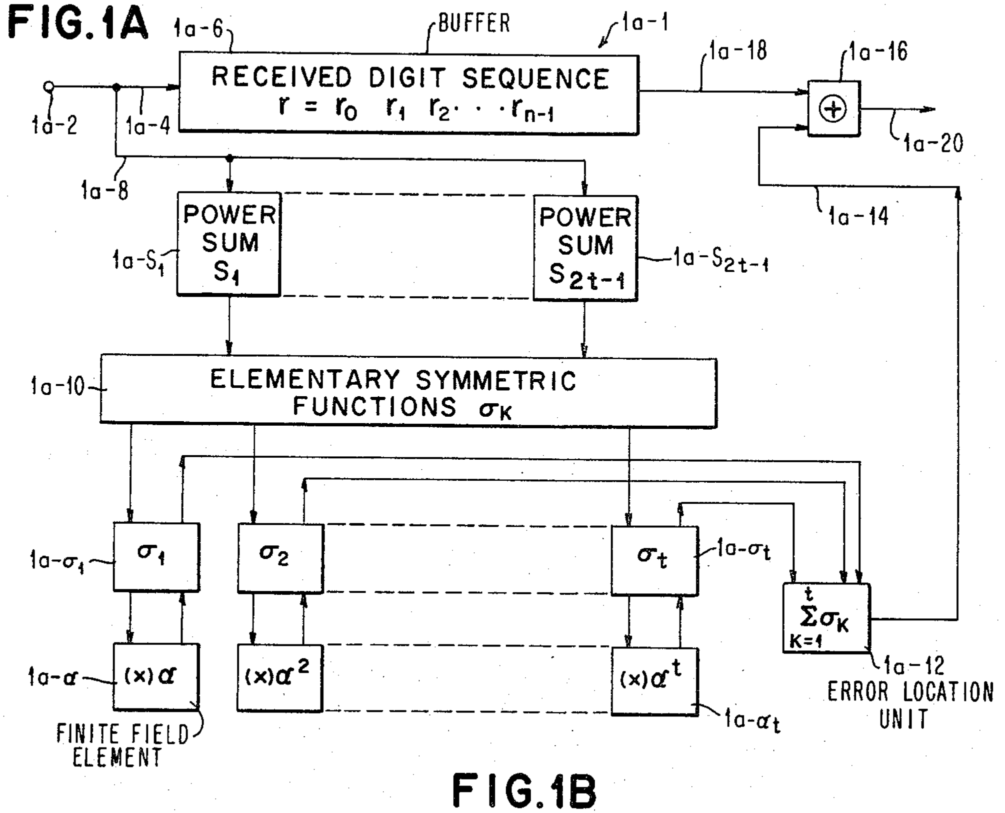
Figure 1B:
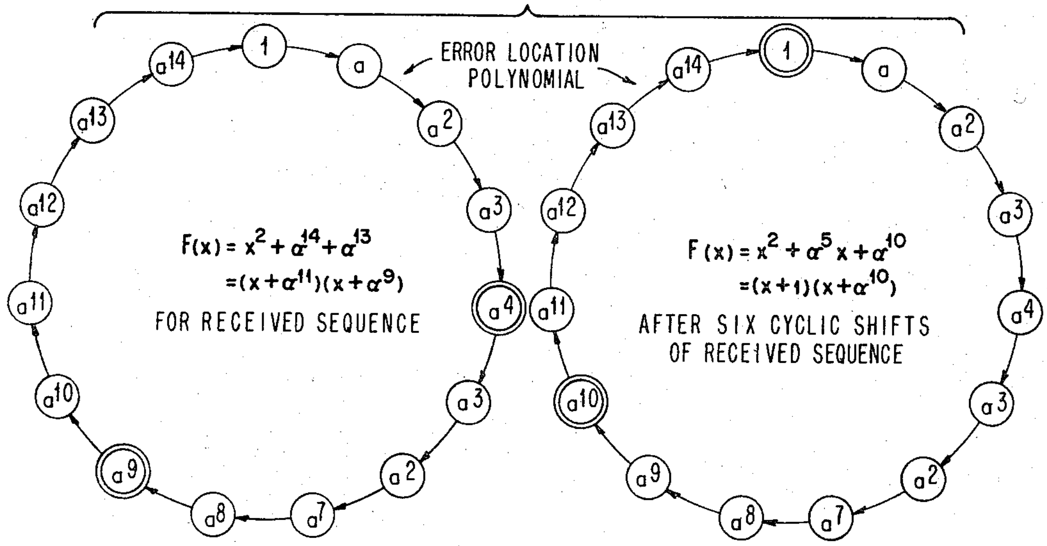

The roots of the polynomial $F(x)$ of Expression 18 are shown on the left position of FIG. 1B with each error location being indicated by a double circle. After six transformations of the polynomial $F(x)$ of Expression 18, it becomes $$\left.\begin{aligned} F(x) &= x^2 + \alpha^5 x + \alpha^{10} \\ &= (x+1)(x+\alpha^{10}) \end{aligned}\right\} \qquad (19)$$

where each error location is indicated by the double circles on the right portion of FIG. 1B. Since $$\sum_{k=1}^{t} \sigma_k = 1$$

the dgit which was $r_9$ of the received sequence, is now the digit $r_{15}$ of the transformed sequence and may readily be corrected by modulo-2 addition. Similarly, after eleven transformations the digit which was $r_4$ of the received sequence is now the digit $r_{15}$ of another transformed sequence.

The theory of the invention as it relates to the practice of the first aspect thereof will now be presented. Consider $$\bar{\beta}_j = \alpha \beta_j (j = 1, 2 \dots t)' \qquad (20)$$

where $\alpha$ is a primitive root of the finite field which defines the BCH code being used. The error-location polynomial for which the $\bar{\beta}_j$'s are the roots is $$\begin{aligned} F(x) &= x^t + \bar{\alpha}_1 x^{t-2} + \dots \bar{\alpha}_t \\ &= (x-\bar{\beta}_1)(x-\bar{\beta}_2) \dots (x-\bar{\beta}_t) \end{aligned} \qquad (21)$$

The elementary functions $\alpha_k$'s are homogeneous function of the roots $\bar{\beta}_j$'s. Therefore, after the transformation has been applied $\tau$ times, there are obtained $$\left.\begin{aligned} \tilde{\beta}_j &= \alpha^{\tau} \beta_j \qquad (j = 1, 2, \dots t) \\ \tilde{\sigma}_k &= \alpha^{\tau k} \sigma^k \qquad (k = 0, 1, 2, \dots t) \end{aligned}\right\} \qquad (22)$$

Since $\alpha^n = \alpha^{2^m - 1} = 1$ in the finite field GF($2^m$), the powers of $\alpha$ never exceed $n = 2^m - 1$. Thus, by effecting the transformation of the polynomial $F(x)$ successively, each root $\beta_j$ thereof may be made equal to 1. In the practice of the first aspect of the invention, the elementary symmetric functions $\sigma_k$ are obtained from the power sums $S_i$ and the summation thereof $$\sum_{k=1}^{t} \sigma_k$$

is obtained. If $$\sum_{k=1}^{t} \sigma_k = 1$$

an error location at the high order position of the received sequence is detected. In the binary case, the correction is obtained by adding a binary 1 modulo-2 to the error digit.

The theory of the invention as it relates to the practice of the second aspect thereof will now be presented. The set of $t$ simultaneous linear equations shown hereinbefore as Expressions 16 which relate the elementary symmetric functions $\sigma_1, \sigma_2 \dots \sigma_t$ to the power sums $S_1, S_3 \dots S_{2t-1}$ are solved for the $\sigma_k$'s in terms of the $S_i$'s and the summation $$\sum_{k=1}^{t} \sigma_k (S_1, \dots S_{2t-1})$$

is obtained. Consider where $$A = \begin{bmatrix} 1 & 0 & 0 & \dots & 0 \\ S_2 & S_1 & 1 & \dots & 0 \\ S_4 & S_3 & S_2 & \dots & 0 \\ \dots & \dots & \dots & \dots & \dots \\ S_{2t-2} & S_{2t-3} & S_{2t-4} & \dots & S_{t-1} \end{bmatrix} \qquad (24)$$

and $$B = \begin{bmatrix} S_1 \\ S_3 \\ S_5 \\ \dots \\ S_{2t-1} \end{bmatrix} \qquad (25)$$

If the determinant $|A|$ is not zero, the $\sigma_k$'s may be expressed as $$\sigma_k = \frac{1}{|A|} \sum_{i=1}^{t} S_{2i-1} A_{i,k} \qquad k = 1, 2, \dots t \qquad (26)$$

where $A_{i,k} (k = 1, 2 \dots t)$ are cofactors of the determinant $|A|$.

Assume unity is a root of the error-location polynomial $F(x)$. Then, $$\sum_{k=1}^{t} \sigma_k = 1$$

By substituting for each $\sigma_k$ the expressions shown in Expression 26 for each $k$, respectively, the following expression is obtained $$\sum_{k=1}^{t} \left\{ \frac{1}{|A|} \sum_{i=1}^{t} S_{2i-1} A_{i,k} \right\} = 1 \qquad (27)$$

As $|A|$ is independent of $k$, Expression 27 may be written as $$\sum_{k=1}^{t} \sum_{i=1}^{t} S_{2i-1} A_{i,k} - |A| = 0 \qquad (28)$$

For the finite field GF($2^m$) it may be shown that the Expression 28 is equivalent to setting the determinant $\Delta$ to zero, where $$\Delta = \begin{bmatrix} 1 & 1 & 1 & \dots & 1 \\ S_1 & 1 & 0 & \dots & 0 \\ S_3 & S_2 & 1 & \dots & 0 \\ S_5 & S_4 & S_2 & \dots & 0 \\ \dots & \dots & \dots & \dots & \dots \\ S_{2t-1} & S_{2t-2} & S_{2t-3} & \dots & S_{t-1} \end{bmatrix} \qquad (29)$$

$$= \begin{bmatrix} 1 & 1 \cdot \cdot & 1 \\ B & A & \end{bmatrix}$$

It may be shown that the determinant $|A| \neq 0$ if the $S_i$'s are power sums of $t$ or $t-1$ distinct roots of an error-location polynomial $$F(x) = x^t + \sigma_1 x^{t-1} + \sigma_2 x^{t-2} + \dots \sigma_t$$

and $|A| = 0$ if the $S_i$'s are power sums of $t-2$ or less distinct roots. If $|A| = 0$, the last two of the Expressions 16 may be eliminated with the result that there are $t-2$ equations and $t-2$ unknowns. The result is a different determinant $\Delta'$. The decoder for the practice of the second aspect of the invention operates in different modes dependent on the nature of the largest non-vanishing determinant.

For the case of $t=2$, $$\Delta=\begin{bmatrix} 1 & 1 & 1 \\ S_1 & 1 & 0 \\ S_3 & S_2 & S_1 \end{bmatrix}=S_1(1+S_1+S_1^2)+S_3=0 \quad (30)$$

which is valid for any finite field $GF(2^m)$.

For a (15, 7) BCH code capable of correcting $t=3$ independent errors, the determinant $\Delta$ is $$\Delta=\begin{bmatrix} 1 & 1 & 1 & 1 \\ S_1 & 1 & 0 & 0 \\ S_3 & S_2 & S_1 & 1 \\ S_5 & S_4 & S_3 & S_2 \end{bmatrix}$$
$$=S_1^3(1+S_1+S_1^3)+S_3(1+S_1+S_1^2+S_1^3+S_3)+S_5(1+S_1)=0$$

If two or three errors occur, the determinant $$|A|=\begin{bmatrix} 1 & 0 & 0 \\ S_2 & S_1 & 1 \\ S_4 & S_3 & S_2 \end{bmatrix}=S_1^3+S_3 \quad (32)$$

is non-zero. However, $|A|=0$ if only one error occurs in a received sequence since $S_3=S_1^3$.

PRINCIPLES OF INVENTION

*First aspect of invention*

With reference to FIG. 1A which is a functional block diagram illustrating the practice of the first aspect of the invention, a received binary digit sequence $$r=[r_0 r_1 r_2 \ldots r_{n-1}]$$

is applied to terminal 1*a*–2 and is established therefrom via connection 1*a*–4 in buffer 1*a*–6. The received sequence was originally established in the format of a codeword of a $t$ error-correcting Bose-Chaudhuri-Hocquenghem $(n,k)$ code. The received digit sequence is also applied via connections 1*a*–8 to units 1*a*–$S_1$ to 1*a*–$S_{2t-1}$ which develop the power sums $S_1, S_3 \ldots S_{2t-1}$ from the received sequence characterized as a polynomial $$r(x)=r_0+r_1x+r_2x^2 \ldots r_{n-1}x^{n-1}$$

Units 1*a*–$S_1$ to 1*a*–$S_{2t-1}$ provide the power sums as elements of the finite field $GF(2^m)$ where $m\times t$ is the maximum number of check digits required for a binary BCH code whose codeword length is $n=2m-1$ with $k$ information digits. Any $t$ independent error pattern which is present in the received sequence is completely defined by the power sums $S_1, S_3, \ldots S_{2t-1}$. The power sums are syndromes of the error pattern in the received sequence and when operated on collectively provide an indication specifically of which positions of the received sequence are error locations.

The power sums developed in units 1*a*–$S_1$ to 1*a*–$S_{2t-1}$ are transferred via respective connections to unit 1*a*–10. A set of $t$ simultaneous linear equations which relate the power sums $S_1, \ldots S_{2t-1}$ and the elementary symmetric functions $\sigma_1, \sigma_2, \ldots \sigma_t$ are solved in unit 1*a*–10 for each $\sigma_k$, i.e., (for the binary case)

$$S_1+\sigma_1=0$$
$$S_2+\sigma_1S_1=0$$
$$S_3+\sigma_1S_2+\sigma_2S_1+\sigma_3=0$$
$$S_4+\sigma_1S_3+\sigma_2S_2+\sigma_3S_1=0$$
$$S_5+\sigma_1S_4+\sigma_2S_3+\sigma_3S_2+\sigma_4S_1+\sigma_5=0$$

---

$$\sum_{i=0}^{n}S_i\delta_{n-i}=0$$

The even power sums $S_2, S_4$, etc. are derivable from the odd power sums $S_1, S_3$, etc. The elementary symmetric functions $\sigma_1, \sigma_2 \ldots \sigma_t$ developed in unit 1*a*–10 are transferred via respective connections to units 1*a*–$\sigma_1$ to 1*a*–$\sigma_t$.

An error-location polynomial $$F(x)=x^t+\sigma_1x^{t-1}+\sigma_2x^{t-2}+\ldots\sigma_2$$
$$=(x-\beta_1)(x-\beta_2)\ldots(x-\beta_t)$$

is defined for the $\sigma_k$'s. The power sums may be expressed in terms of the error terms $\beta_j$ as $$S_i=\sum_{j=1}^{t}\beta_j{}^i(i=1, 2, 3, \ldots 2t-1)$$

Elements $\alpha^1, \alpha^2, \ldots \alpha^t$ of the finite field GF $(2^4)$ are established in multiplier units 1*a*–$\alpha$ to 1*a*–$\alpha^t$, respectively. For each digit of the received sequence, each $\sigma_k$ is multiplied by the corresponding $\alpha^k$. This effects the transformation $$\sigma_k\equiv\alpha^k\sigma_k$$

where $\bar{\sigma}$ is the elementary symmetric function for the binary digit sequence obtained by one cyclic shift of the received sequence. The transformed elementary symmetric functions $\bar{\sigma}_k$'s are transformed to different elementary symmetric functions $\bar{\bar{\sigma}}_k$'s, etc. The transformed products at each multiplication operation on the elementary symmetric functions are presented from units 1*a*–$\sigma_1$ to 1*a*–$\sigma_t$ to error-location unit 1*a*–12 which provides the sum $$\sum_{k=1}^{t}\bar{\sigma}_k$$

on connection 1*a*–14 to modulo-2 adder unit 1*a*–16. The other input to modulo-2 adder unit 1*a*–16 is from buffer 1*a*–6 via connection 1*a*–18. When the sum $$\sum_{k=1}^{t}\bar{\sigma}_k=1$$

the position at the corresponding digit of the received sequence is an error location. Since in modulo-2 addition, for binary digits 1 and 0, $$1\oplus1=0$$
$$0\oplus1=1$$
$$1\oplus0=1$$
$$0\oplus0=0$$

only the error locations in the received sequence will be corrected by modulo-2 adder unit 1*a*–16. Thus, any $t$ independent error pattern in the received sequence applied to terminal 1*a*–2 is corrected by the apparatus 1*a*–1 of FIG. 1, and the original binary digit sequence prior to transmission or storage is presented to output connection 1*a*–20.

The operation of the apparatus 1*a*–1 of FIG. 1 will be further described with reference to FIG. 1B. On the left of FIG. 1B there is illustrated the polynomial $$F(x)=x^2+\sigma_1x+\sigma_2$$
$$=x^2+\alpha^{14}+\alpha^{13}$$
$$=(x+\alpha^4)\ (x+\alpha^9)$$

for a (15,7) BCH code, i.e., $$r(x)=r_0+r_1x+\ldots r_{14}x^{14}$$

with error locations at the fifth and tenth positions from the left. The roots are shown in the initial position with double circles. After six cyclic shifts, as illustrated on the right of FIG. 1B, the roots are $$F(x)=x^2+\alpha^5x+\alpha^{10}$$
$$=(x+1)\ (x+\alpha^{10})$$

As the double circle is at the unit element of the finite field $GF(2^4)$ an error location has been identified thereat in the received sequence. Thus, the six cyclic shifts of the received sequence out of buffer 1*a*–6 has presented an error digit to modulo-2 added 1*a*–16. Further, five more cyclic shifts bring the second error location to the unit element to identify it.

Figure 1C:
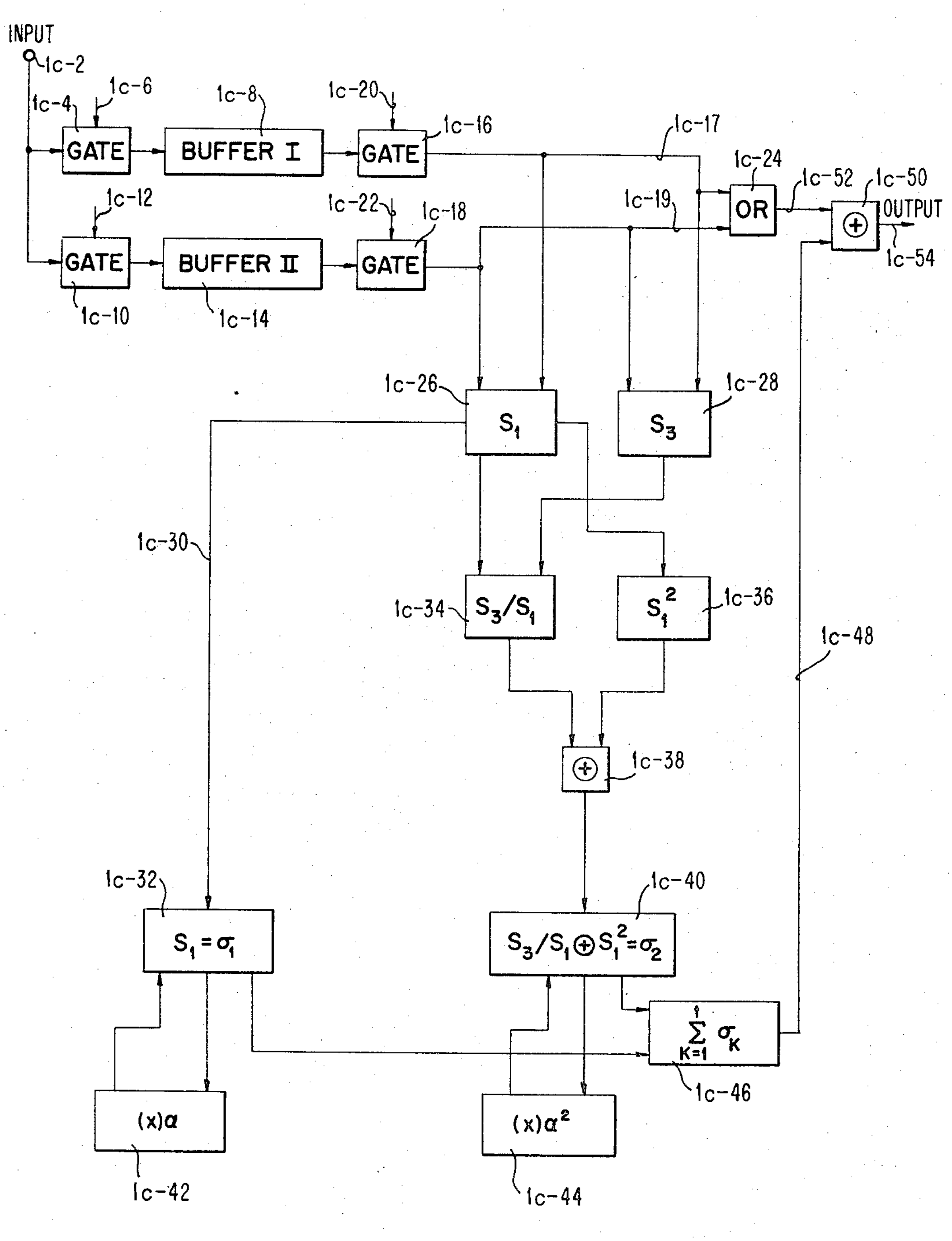

The nature of implementation for practice of the invention with a (15,7) BCH code will now be described with reference to FIG. 1C which is functional block diagram 1*c*–1 representative of the first preferred embodiment of the invention for which FIG. 2 is a schematic diagram. A received binary digit sequence $$r(x)=r_0+r_1x+r_1x^2+ \ . \ . \ . \ r_{14}x^{14}$$

is applied, high order first, i.e., $r_{14}$, to terminal 1c–2 of FIG. 1C which corresponds to terminal 12 of FIG. 2. Alternate received sequences are established via gate unit 1c–4 under timing control provided on line 1c–6 in buffer unit 1c–8; and via gate 1c–10 under timing control provided on line 1c–12 in buffer unit 1c–14. Buffer units 1c–8 and 1c–14 of FIG. 1C correspond to buffer units 28a and 28b of FIG. 2A. The timing control provided on lines 1c–6 and 1c–12 of FIG. 1C corresponds to the timing effected by pulse generator 16 of FIG. 2A.

The contents of buffers 1c–8 and 1c–14 are applied via gates 1c–16 and 1c–18 under timing control provided on lines 1c–20 and 1c–22 to OR unit 1c–24 via lines 1c–17 and 1c–19 and to power sum units 1c–26 and 1c–28. Power sum units 1c–26 and 1c–28 provide the power sums $S_1$ and $S_3$, respectively, as elements in the finite field GF($2^4$). Generally, shift register structure 89 of FIGS. 2B and 2C under timing control of pulse generator 68 (FIG. 2B) corresponds to power sum units 1c–26 and 1c–28.

The elementary symmetric functions $\sigma_1$ and $\sigma_2$ as elements in the finite field GF($2^4$) are obtained from the power sums $S_1$ and $S_3$. Since $\sigma_1$ is equal to $S_1$, it is transferred from power sum unit 1c–26 via line 1c–30 to elementary symmetric function unit 1c–32. The quotient $S_3/S_1$ of the division operation of power sum $S_3$ by power sum $S_1$ is obtained by unit 1c–34. Generally, $S_3/S_1$ is obtained in FIG. 2 by the operation of the circuitry of FIGS. 2H, 2I, 2J and 2K. The product $S_1^2$ is obtained by unit 1c–36 which corresponds to the shift register structure of FIGS. 2B and 2C under the timing control of pulse generator 68 (FIG. 2B) and pulse generator 199 (FIG. 2D).

Elementary symmetric function $\sigma_2$ is the modulo-2 sum of $S_3/S_1$ and $S_1^2$ and is obtained through modulo-2 adder unit 1c–38 and is established in unit 1c–40. Generally, $S_3/S_1 \oplus S_1^2$ is obtained by the circuitry in FIGS. 2J and 2K.

Elementary symmetric functions $\sigma_1$ and $\sigma_2$ are multiplied by the finite field GF($2^4$) elements $\alpha$ and $\alpha^2$ through units 1c–42 and 1c–44, respectively, to obtain transformed elementary symmetric functions $\bar{\sigma}_1$ and $\bar{\sigma}_2$. The sum $$\sum_{k=1}^{t} \bar{\sigma}_k$$

is obtained by unit 1c–46 whose output is communicated via line 1c–48 to an input of modulo-2 adder unit 1c–50 whose other input is from OR unit 1c–24 on line 1c–52. The output from apparatus 1c–1 of FIG. 1C is obtained from modulo-2 adder unit 1c–50 on line 1c–54. Generally, units 1c–42 and 1c–44 of FIG. 1C correspond to multiplier units 149 and 256 of FIGS. 2E and 2F, respectively. Further, unit 1c–46 corresponds to FIGS. 2E and 2F.

The $$\sum_{k=1}^{t} \bar{\sigma}_k$$

equals 1 only if the digit from a buffer unit 1c–8 or 1c–14 applied to OR unit is an error location. Hence, the modulo-2 sum from unit 1c–50 provides the digit at the error location corrected and leaves unchanged the correct digits of a received sequence originally applied to terminal 1c–2.

*Second aspect of invention*

Figure 1D:
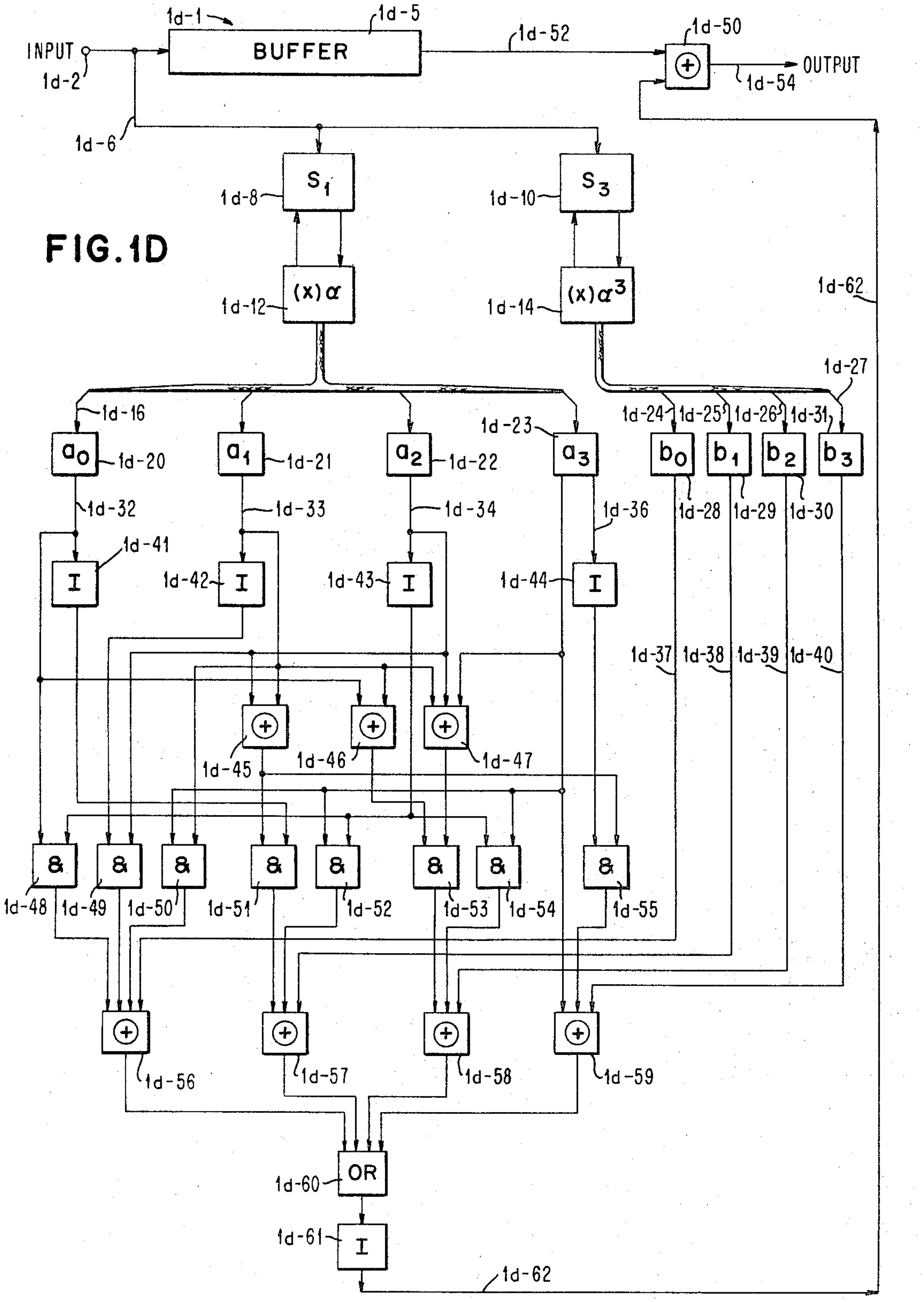

The principles of the practice of the second aspect of the invention wil be described with reference to: FIG. 1D which is a schematic diagram of an embodiment for a (15, 7) BCH code for $t=2$ independent errors; and to FIG. 1E which is a functional block diagram 1d–1 for an $(n, k)$ BCH code for $t=3$ independent errors.

In the case of a (15, 7) BCH code for correcting $t=2$ independent errors in a received sequence, the finite field GF($2^4$) is defined by the irreducible polynomial $$1+x+x^4=0$$

The power sums $S_1$ and $S_3$ may be written $$\left.\begin{aligned} S_1&=a_0+a_1\alpha+a_2\alpha^2+a_3\alpha^3 \\ S_3&=b_0+b_1\alpha+b_2\alpha^2+b_3\alpha^3 \end{aligned}\right\} \quad (33)$$

where $\alpha$ is the primitive element of GF($2^4$). When these expressions for the power sums $S_1$ and $S_3$ are substituted in Expression 32 of Theory of Invention presented hereinbefore, there are obtained the following binary relations:

$$\left.\begin{aligned} &a_0\bar{a}_2\oplus a_2\bar{a}_1\oplus a_1a_3\oplus b_0=0 \\ &(a_1\oplus a_2)\bar{a}_0+a_3\bar{a}_2+b_1=0 \\ &(a_0\oplus a_1)(a_1+a_2\oplus a_3)\oplus a_3\bar{a}_2\oplus b_2=0 \\ &(a_1\oplus a_2)\bar{a}_3\oplus a_3\oplus b_3=0 \end{aligned}\right\} \quad (34)$$

The embodiment 1d–1 of FIG. 1D effectively obtains the results of Expression 30. A modulo-2 adder unit provides a sum, e.g., $a_1 \oplus a_2$. An AND unit provides a product, e.g., $a_0a_2$.

FIG. 1D illustrates an embodiment for the practice of the second aspect of the invention which is partly a functional block diagram and partly a schematic diagram. It provides correction of $t=2$ independent errors in a received binary digit sequence originally established in the format of a codeword of a (15, 7) BCH code. A received sequence $$r(x)=r_0+r_1x+r_2x^2+ \ . \ . \ . \ r_{14}x^{14}$$

is applied to terminal 1d–2 and established therefrom via line 1d–4 in buffer 1d–5 and via line 1d–6 in power sum units 1d–8 and 1d–10. Power sum units 1d–8 and 1d–10 obtain the power sums $S_1$ and $S_3$, respectively. Units 1d–12 and 1d–14 are multipliers which obtain the products of the finite field GF($2^4$) elements $\alpha^1$ and $\alpha^3$ times $S_1$ and $S_3$, respectively, to obtain $$\bar{S}_1=\alpha^1 \times S_1$$
$$\bar{S}_3=\alpha^3 \times S_3$$

New products are obtained sequentially for each digit of the received sequence, e.g., the $\bar{S}_1$ and $\bar{S}_3$ are transformed to $$\bar{\bar{S}}_1=\alpha^1 \times \bar{S}_1$$
$$\bar{\bar{S}}_3=\alpha^2 \times \bar{S}_3$$

Effectively, the transformed power sums $\bar{S}_1$ and $\bar{S}_3$ are the power sums for another binary digit sequence obtained by one cyclic shift of the received binary sequence.

The components $a_0$, $a_1$, $a_2$ and $a_3$; and $b_0$, $b_1$, $b_2$ and $b_3$ of the transformed power sums are applied from units 1d–12 and 1d–14 to storage units 1d–14 to 1d–23; and 1d–28 to 1d–31, respectively. The components $a_0$, $a_1$, $a_2$ and $a_3$ of power sum $S_1$ are established via lines 1d–16 to 1d–21 in storage units 1d–20 to 1d–23, respectively; and the components $b_0$, $b_1$, $b_2$ and $b_3$ of power sum $S_3$ are established via lines 1d–24 to 1d–27 in storage units 1d–28 to 1d–31, respectively. The components and circuit connections following the storage units effect the solution of Expression 28. Storage unit 1d–20 to 1d–23 are connected via lines 1d–32, 1d–33, 1d–34 and 1d–36 to inverted units 1d–40 to 1d–44. Inverter units 1d–41 to 1d–44 provide the inverted components of the power sum $S_1$, i.e., $\bar{a}_0$, $\bar{a}_1$, $\bar{a}_2$ and $\bar{a}_3$, respectively. The inputs of modulo-2 adder units 1d–45 are from storage units 1d–21 and 1d–22 and provides $a_1 \oplus a_2$ as output. The inputs to modulo-2 adder unit 1d–46 are from storage unit 1d–20 and provides $a_0 \oplus a_1$ as output. The inputs to modulo-2 adder unit 1_d_–47 are from storage units 1_d_–21, 1_d_–22 and 1_d_–23 and provides as output $a_1 \oplus a_2 \oplus a_3$. AND unit 1_d_–48 has inputs from storage unit 1_d_–20 and inverter unit 1_d_–43 and provides $a_0\bar{a}_2$ as output. AND unit 1_d_–49 has inputs from inverter unit 1_d_–41 and storage unit 1_d_–22 and provides $\bar{a}_1 a_2$ as output. AND unit 1_d_–50 has inputs from storage units 1_d_–23 and 1_d_–21 and provides $a_1a_3$ as output. The outputs of AND units 1_d_–48 to 1_d_–50 storage unit 1_d_–14 are communicated to modulo-2 adder unit 1_d_–56 whose output is $$a_0\bar{a}_2 \oplus a_2\bar{a}_1 \oplus a_1a_3 \oplus b_0$$

This output is communicated to OR unit 1_d_–60.

AND unit 1_d_–47 has inputs from inverter unit 1_d_–41 and modulo-2 adder unit 1_d_–45 and provides $\bar{a}_0(a_1+a_2)$ as output. AND unit 1_d_–38 has inputs from inverter unit 1_d_–43 and storage unit 1_d_–23 and provides $\bar{a}_2a_3$ as output. Modulo-2 adder unit 1_d_–57 has inputs from AND units 1_d_–51 and 1_d_–52 and storage unit 1_d_–29 and provides $(a_1 \oplus a_2)\bar{a}_0 \oplus a_3\bar{a}_2 \oplus b_1$ as output. This output is communicated to OR unit 1_d_–60.

AND unit 1_d_–53 has inputs from modulo-2 adder units 1_d_–46 and 1_d_–47 and provides $(a_0 \oplus a_1)(a_1 \oplus a_2 \oplus a_3)$ as output. AND unit 1_d_–54 has inputs from inverter unit 1_d_–43 and storage unit 1_d_–23 and provides $\bar{a}_2a_3$ as output. Modulo-2 adder unit 1_d_–57 has inputs from AND units 1_d_–53 and 1_d_–54 and storage unit 1_d_–30 and provides $(a_0 \oplus a_1)(a_1 \oplus a_2 \oplus a_3) \oplus a_3\bar{a}_2 \oplus b_2$ as output to OR unit 1_d_–60.

AND unit 1_d_–55 has inputs from modulo-2 adder unit 1_c_–45 and inverter unit 1_d_–44 and provides $(a_1 \oplus a_2)\bar{a}_3$ as output. Modulo-2 adder unit 1_c_–59 has inputs from storage unit 1_d_–23, AND unit 1_d_–55 and storage unit 1_d_–31 and provides $(a_1 \oplus a_2)\bar{a}_3 \oplus a_3 \oplus b_3$ to OR unit 1_d_–60.

OR unit is connected to inverter unit 1_d_–61 which presents the output of embodiment 1_d_–1 of FIG. 1D to output line 1_d_–62. This output will be 1 if the corresponding digit of the received sequence is an error location.

The output from inverter unit 1_d_–61 on line 1_d_–62 is applied to input of modulo-2 adder unit 1_d_–64. Since the other input on line 1_d_–66 to modulo-2 adder unit 1_d_–64 is the next digit of the received sequence, the output of modulo-2 adder unit 1_d_–64 on line 1_d_–68 is the correct binary digit sequence.

Figure 1E:
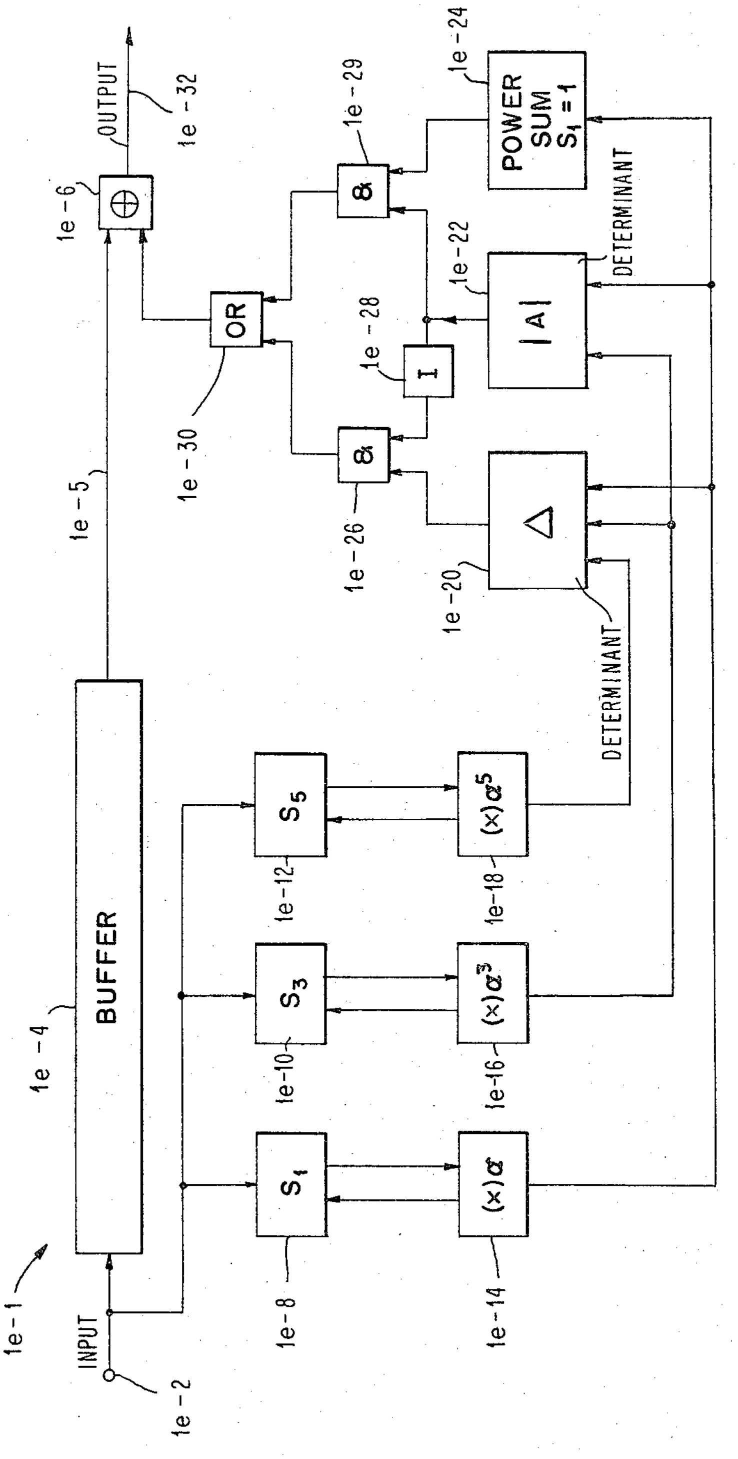

Another embodiment for the practice of the second aspect of the invention is shown in the functional block diagram of FIG. 1E for an $(n,k)$ BCH code which is capable of correcting $t=3$ errors in a received sequence. A received sequence $$r(x)=r_0+r_1x+r_2x^2+ \ldots r_{n-1}x^{n-1}$$

is applied to terminal 1_d_–2 and established therefrom in buffer unit 1_e_–4. The received sequence is applied from buffer 1_e_–4 to an input of modulo-2 adder unit 1_e_–6.

The received sequence is also applied to power sum units 1_e_–8, 1_e_–10 and 1_e_–12 which obtain power sums $S_1$, $S_3$, and $S_5$. The power sums $S_1$, $S_3$, and $S_5$ are applied to multiplier units 1_e_–14, 1_e_–16 and 1_e_–18, respectively, which obtain the products of finite field $GF(2^4)$ elements $\alpha^1$, $\alpha^3$ and $\alpha^5$ times $S_1$, $S_3$ and $S_5$, respectively. These products $$\bar{S}_1=\alpha^1 \times S_1$$

$$\bar{S}_3=\alpha^3 \times S_3$$

$$\bar{S}_5=\alpha^5 \times S_5$$

are the power sums for a binary digit sequence obtained by one cyclic shift of the received binary digit sequence. After the new power sums $\bar{S}_1$, $\bar{S}_3$ and $\bar{S}_5$ are obtained by multiplier units 1_e_–14, 1_e_–16 and 1_e_–18, they are established therefrom in units 1_e_–8, 1_e_–10 and 1_e_–12 and remain there until the next digit of the received binary digit sequence in buffer unit 1_d_–4 is to be determined as correct or erroneous by operation of apparatus 1_e_–1 of FIG. 1E.

Multiplier unit 1_e_–14 is connected to units 1_e_–20, 1_e_–22 and 1_e_–24. Multiplier unit 1_e_–16 is connected to units 1_e_–20 and 1_e_–22. Multiplier unit 1_e_–18 is connected to unit 1_e_–24. Unit 1_e_–20 obtains the evaluation of the determinant $$\Delta=\begin{bmatrix} 1 & 1 & 1 & 1 \\ S_1 & 1 & 0 & 0 \\ S_3 & S_2 & S_1 & 1 \\ S_5 & S_4 & S_3 & S_2 \end{bmatrix} =S_1^3(1+S_1+S_1^3)+S_3(1+S_1+S_1^2+S_1^3+S_3)+ +S_5(1+S_1)=0$$

when $t=3$ errors are present in the received sequence, i.e., the power sums $\bar{S}_1$, $\bar{S}_3$ and $\bar{S}_5$ are each non-zero. Unit 1_e_–22 obtains the evaluation of determinant $|A|$ $$|A|=\begin{vmatrix} 1 & 0 & 0 \\ S_2 & S_1 & 1 \\ S_4 & S_3 & S_2 \end{vmatrix}=S_1^3+S_3$$

which is non-zero if two or three errors are present in the received sequence. Unit 1_e_–20 will have an output binary 1, when the determinant Δ is zero, to indicate the presence of three error locations in the received sequence; and unit 1_e_–22 will have binary 0 output if there are two or three error locations in the received sequence. Hence, AND unit has a 1 input from unit 1_e_–20 and a 1 input from unit 1_e_–22 as inverter unit 1_e_–28 changes the 0 from unit 1_e_–22 to a 1. AND unit 1_e_–26 provides a 1 to OR unit 1_e_–30 which transfers it to an input of modulo-2 adder unit 1_d_–6. The next received digit in buffer unit 1_e_–4 is applied via line 1_e_–5 to the other input of modulo-2 adder unit 1_d_–6. The corrected received digit received digit sequence is obtained from modulo-2 adder unit on line 1_e_–32.

For only one error present in the received digit sequence, the unit 1_e_–22 provides a binary 1 output which together with the 1 output from unit 1_e_–24 activates AND unit 1_e_–29. The output 1 of AND unit 1_e_–29 is passed via OR unit 1_e_–30 to an input of modulo-2 adder unit 1_e_–6. As the other input to modulo-2 adder unit 1_d_–6 is the next digit from buffer unit 1_e_–4, the correct digit sequence is applied to output line 1_e_–32.

The manner in which the embodiment 10 in FIG. 2 for the practice of the first aspect of the invention may be modified for the practice of the second aspect of the invention as exemplified in FIGS. 1D and 1E will now be described. In FIG. 2, the components of power sums $S_1$ and $S_3$ are obtained (FIG. 2D) from the gate units 136 and 200 on cable 138 and 202, respectively. In FIGS. 2E and 2F the elementary symmetric functions $\sigma_1$ and $\sigma_2$ are applied to multiplier units 149 and 256 on cable 138_b_ and 255, respectively. Although $\alpha^1 \times \sigma_1 \equiv \alpha^1 \times S_1$, different multipliers are required to obtain $\alpha^3 \times S_3$ and $\alpha^5 \times S_5$. However, the design of finite field $GF(2^4)$ multiplier units is conventional.

GENERAL DESCRIPTION OF EMBODIMENT OF FIG. 2

The operation of the first preferred embodiment 10 of the invention will first be explained generally with reference to FIG. 2, which is a composite of FIGS. 2A to 2I, and to the timing diagrams of FIGS. 3, 5, 6 and 8. FIG. 2 is an implementation for the practice of the first aspects of the invention and corrects two independent errors in a received binary digit sequence which was originally established in the format of a codeword of a (15,7) Bose-Chaudhuri-Hocquenghem error-correcting code.

With reference to FIG. 2A, the incoming signals representing the received binary digit sequences $$r(x)=r_0+r_1x+r_2x^2+ \ldots r_{n-1}x^{n-1}$$

are applied to terminal 12 and appear on line 14. Illustratively, the original sequence in the format of a codeword of the (15,7) BCH code is $$a(x)=a_0+a_1x+\ldots a_{n-1}x^{n-1}$$

$$a=[100010111000000]$$

With an error at the fifth and tenth position from the left, the received sequence is $$r=[100000111100000]$$

The received digits are applied via line 14a to pulse generator unit 16 which generates synchronizing pulses, advance pulses, and a count to 15 pulse for every 15th incoming digit. The synchronizing pulses are applied to line 18, the advance pulses are applied to line 20 and the count to 15 pulse is applied to line 22. The incoming signals are also applied via line 14b to AND unit 24. Two input buffer units 28a and 28b store temporarily alternate received sequences and are shown in detail in FIG. 4.

With reference to FIG. 4, there are 15 flip-flops in an input buffer 28, flip-flops 4a–1 to 4a–15. The input digits are commutated in the flip-flops by the input ring 4b and are commutated out of the flip-flops by the output ring 4d. The input ring 4b is reset to its first position by a pulse on line 64 and the output ring 4d is reset to its first position by a pulse on line 127. Pulses applied to line 61 advance the input ring 4b and pulses applied to line 126 advance the output ring 4d. Flip-flops 4a–1 to 4a–15 are reset to their 0 states by a pulse on line 64b. Digits of the input sequence enter the buffer 28 on line 52 serially. A binary 1 is a pulse and binary 0 is the absence of a pulse. Therefore, after flip-flops 4a–1 to 4a–15 are initially set to their 0 states, only 1's are applied physically. Illustratively, if input ring 4b is in its first position, line 22 from generator 16 is energized. If a 1 is applied to line 14, it passes through the AND unit 24 and sets the flip-flop 4a to its 1 state. If a 0 is applied to line 14, line 20 is not energized and no pulse is transmitted through the AND unit 24. Thus, flip-flop 4a–1 remains in its 0 state.

A digit of the input sequence is applied from one of the flip-flops 4a–1 to 4a–15 on the output lines 80–1 and 80–2 according to the position of the output ring 4d. Illustratively, if the output ring 4d is in its first position and flip-flop 4a–1 is in the 1 state, AND unit 4e–1 is enabled and the 1 is applied to line 80–1. If flip-flop 4a–1 is in the 0 state, AND unit 4f–1 is enabled and the 0 is applied to line 80–2.

Flip-flop 42 whose state is set by a count to 15 pulse 42 controls the entry of the digits of the received sequence into buffer 28a or buffer 28b. If flip-flop 42 is in its 0 state, line 44 is energized and AND unit 48 is enabled to pass the received sequence to input buffer 28a. If flip-flop 42 is in its 1 state, line 45 is energized and AND unit 66 is enabled to pass the received sequence to input buffer 28b. The advance pulses from generator unit 16 applied to line 20 advance the input ring of buffer 28a via line 64a and the input ring of buffer 28b via line 64b. Line 22 from generator unit 16 has a count to 15 pulse on it for only a short time after every 15th digit of a received sequence. Hence, line 22 is inactive during the time that the 15 incoming digits are stored in either buffer 28a or buffer 28b.

Before a received sequence is applied to terminal 12, a reset pulse is applied to the input buffers 28a and 28b on line 64. Illustratively, after the 15th digit of a received sequence is stored in buffer 28a, the count to 15 pulse on line 22 is effective to cause the AND unit 62 to pass the next advance pulse to the reset line 64b to reset the input and output rings 4b and 4d to their first positions and to reset the flip-flops of buffer 28b to their 0 states. Flip-flop 42 changes its state on the fall of the count to 15 pulse. Therefore, after buffer 28b is reset, the first received digit of the next received sequence of 15 digits is applied to buffer 28b because AND unit 66 is enabled instead of AND unit 48. During the time that the 15 digits go into buffer 28b, buffer A is read out at high speed by pulses generated by pulse generator 68 (FIG. 2B), which is started by the count to 15 pulse on line 22d.

With reference to FIG. 2A, the pulses A, AB, AC, AD, AE and AF generated by pulse generator 68 are shown in FIG. 5 and are applied to lines 69a to 69f, respectively. The count to 15 pulse on line 22e sets flip-flop 70 to its 1 state which enables AND units 72 and 74. The A pulse is effective to enable AND units 76 and 78 via lines 69a–1 and 69a–2, respectively, and to gate the output of buffer 28a or 28b. The count to 15 pulse from generator unit 16 (FIG. 2A) is applied to line 22f to reset flip-flops 94a to 94d (FIGS. 2A and 2B) to their 0 states.

The A pulse is applied through AND unit 72 and OR unit 90c via line 112 to enable AND units 114a to 114d and 116a to 116d. The output of flip-flop 104d is transmitted via line 118a and 118b to input adder unit 86, shown in greater detail in FIG. 7, which functions as a modulo-2 adder unit. Lines 118a and 118b are also connected to the half-adder unit 120 whose other input are the lines 122a and 122b from flip-flop 104a. The state of flip-flop 104b is transferred to flip-flop 94c, and the state of the flip-flop 104c is transferred to the flip-flop 94d. A main shift of the shift register structure 89 of FIGS. 2B and 2C is effected in the foregoing manner.

The AB pulse is applied via OR unit 264 and lines 126a and 126b to advance the output ring 4d (FIG. 4) of input buffer 28a or 28b to the next position. The AB pulse also effects an intermediate shift of the shift register structure 89 of FIGS. 2B and 2C by being applied via OR unit 90b to gate the contents of flip-flop 94a to flip-flop 104a, the contents of flip-flop 94b to flip-flop 104b, the contents of flip-flop 94c and the contents of flip-flop 94d to flip-flop 104d. Thus, the A and AB pulses commutate the 15 digits of a received sequence from an input buffer 28a or 28b to the shift register structure 89.

The foregoing operation generates the four components of the power sum $S_1$ in flip-flops 94a to 94d. During the operation both the internal and external clocking of the shift register structure 89 of FIGS. 2B and 2C are the same, i.e., the A pulses and the AB pulses are applied for all shifts of the shift register structure because flip-flop 70 is in its 1 state.

Near the end of the first cycle of the operation of pulse generator 68, an AE pulse is produced which is applied to line 69e through AND circuit 132, which is enabled because flip-flop 70 is still in its 1 state, and is transmitted via line 134 to enable gate unit 136 (FIG. 2D). This results in the transfer of the states of flip-flops 94a to 94d to flip-flops 140a to 140d of buffer register 139 (FIG. 2D). The flip-flops 140a to 140d provide a buffer to store the value $S_1$ while the quantity $S_1^2$ is being generated in shift register structure 89. Further, the components of $S_1$ are transferred in the flip-flops 9–1 to 9–4 (FIG. 9) via gate unit 136 and cable 138b. Flip-flops 9–1 to 9–4 are the storage units for the $\alpha^1$ multiplier.

With reference to FIG. 2B, the AE pulse extends through AND unit 162, line 158, OR circuit 164 and line 165 to recycle pulse generator 68. The pulse AF is applied on line 160 to set flip-flop 70 to its 0 state. The pulse AF is also applied via line 69f–3 through the OR unit 90a to reset flip-flops 94a to 94b of shift register structure 89.

After first cycle of operation within the embodiment 10 under control of generator 68, the value $S_1$ has been computed and stored in register 139 having flip-flops 140a to 140d (FIG. 2D) and in register 9 having flip-flops 9–1 to 9–4 (FIGS. 2E and 9). Next, pulse generator 68 begins its second cycle and produces the AC and AD pulses in addition to the A and AB pulses. During the second cycle, flip-flop 70 (FIG. 2B) is in its 0 state and enables AND units 166 and 168 which apply the AC and AD pulses for the main shift and intermediate shift of the shift register structure 89 instead of the AND units 72 and 74 which were used when flip-flop 70 was in its 1 state. The frequency of the AC and AD pulses is three times the frequency of the A and B pulses. Use of the pulses AC and AD effects the generation of the components of the power sum $S_3$. During the second cycle of the pulse generator 68, the 15 digits of the alternate received sequence in input buffer 28*a* or 28*b* are commutated to the shift register structure 89. Under this condition of operation the internal shift of the shift register structure 89 is three times the speed at which digits are commutated into it from an input buffer 28*a* or 28*b*.

Operation of input adder circuit unit 86 will now be described with reference to FIG. 7. During the first cycle of operation of pulse generator 68, input adder unit 86 functioned as a modulo-2 adder unit. In effecting the generation of the power sum $S_3$, generator 68 functions differently. Input leads 223*a* and 223*b* to input adder unit 86 apply digits from the input buffer 28*a* or 28*b* to start the single-shot unit 86–3 whose output is energized for a length of time slightly greater than the time that either line 223*a* or 223*b* is active. Illustratively, if a 0 is applied to line 223*a* or a 1 is applied to line 223*b*, the OR unit 86–1 has an output which trips single-shot 86–3 to enable AND units 86–5 and 86–6. Hence, an input 0 on line 118*a* or an input 1 on line 118*b* fed back from the high order flip-flop 104*d* of FIG. 2C to the input is passed through either AND unit 86–6 or 86–9 and input adder 86 functions as a modulo-2 adder unit.

However, if either line 223*a* or line 223*b* is not energized at the time that line 118*a* or line 118*b* is active, the single-shot 86–3 does not have an output. However, inverter unit 86–7 has an output to enable AND units 86–9 and 86–10 to cause an input on either line 118*a* or 118*b* to pass directly to the output line 87*a* or 87*b* of input added 86.

At the end of the second cycle of operation of generator 68, the AE pulse is effective through AND unit 196 to condition gate 200 (FIG. 2D) to transfer the states of flip-flops 94*a* and 94*d* of shift register structure 89 via cable 202 to flip-flops 204*a* to 204*d* of buffer register 203 (FIG. 2K), to establish therein the components of power sum $S_3$.

The AE pulse on line 198 is also applied via line 198*b* to start the pulse generator 199 (FIG. 2D). The same pulse is applied via line 198*c* to reset the output ring 266 of the shift register structure 139 of FIG. 2D and it is applied via line 198*d* to FIG. 2F where it effects the reset of the flip-flops 10–1 to 10–4 of shift register structure 256 to their 0 states. Shift register structure 256 effects the multiplication of the elementary symmetric function $\sigma_2$ by the finite field GF($2^4$) element $\alpha^2$. At the end of the second cycle of the pulse generator 68, the AF pulse effects the reset of the flip-flops 94*a* to 94*d* and 104*a* to 104*d* (FIGS. 2B and 2C) to their 0 states.

With reference to FIG. 6, the pulses generated by the second pulse generator 199 are C, CD, CE and CF. The C and CD pulses are used for commutating the output ring 226 (FIG. 2D) to effect the transfer of the states of flip-flops 140*a* to 140*d* to input adder unit 86. The CE and CF pulses are used for main shift and intermediate shift of the shift register structure 89 of FIGS. 2B and 2C at two times the rate the input is applied to input adder 86 from flip-flops 140*a* to 140*d*. This operation produces the components of $S_1^2$ in flip-flops 94*a* to 94*d*.

At the end of its cycle, pulse generator 199 applies pulse CG via line 201*e* to enable gate 234 and thereby apply the states flip-flops 94*a* to 94*d* via cable 236 to flip-flops 238*a* to 238*d* (FIGS. 2J and 2K). Thus the components of $S_1^2$ are established in flip-flops 238*a* to 238*d*.

With reference to FIGS. 2H and 2I, the components of the power sum $S_1$ in flip-flops 140*a* to 140*d* are applied to cable 248 and thereby to selected inputs of AND units 252–1 to 252–15 via lines 250. The outputs from AND units 252 are connected to inputs of OR units 2*h*–1 to 2*h*–16 a pattern of selection determined by the requirement to effect the division operation $S_3/S_1$ in the finite field GF($2^4$). Through the interaction of OR units 2*h*–1 to 2*h*–16 and AND units 252–1 to 252–15: the factors $c_{00}$ to $c_{03}$ are provided by OR units 2*h*–1 to 2*h*–4, respectively; factors $c_{10}$ to $c_{13}$ are provided by OR units 2*h*–5 to 2*h*–8, respectively; factors $c_{20}$ to $c_{23}$ are provided by OR units 2*h*–9 to 2*h*–12, respectively; and factors $c_{30}$ to $c_{33}$ are provided by OR units 2*h*–13 to 2*h*–16, respectively. The factors $c_{ij}$ are combined with the components of $S_3$ in flip-flops 204*a* to 204*b* in the circuitry of FIGS. 2J and 2K to provide the components of $S_3/S_1$ as the factors $q_0$ to $q_4$ from modulo-2 adder units 2*j*–26 to 2*j*–29, respectively. The components of $S_3/S_1$ are combined with the components of $S_1^2$ in flip-flops 238*a* to 238*d* in modulo-2 adder units 2*j*–30 to 2*j*–33 to provide the components of $S_3/S_1 \oplus S_1^2$ on lines 255–1 to 255–4.

The components of $S_3/S_1 \oplus S_1^2$ on lines 255–1 to 255–5 are established in flip-flops 10–1 to 10–4 of the shift register structure 256 of FIG. 10 which is shown as block 256 of FIG. 2F.

The last pulse CH produced by the pulse generator 199 is applied on line 201–*f* to initiate the operation of the pulse generator 258 (FIG. 2E). Previously, the components of $\sigma_1$ were established in flip-flops 9–1 to 9–4 of the multipler shift register structure 149 of FIG. 9; and the components of $\sigma_2$ were established in the flip-flops 10–1 to 10–4 of FIG. 10. Pulse generator 258 controls the production of the successive values of the elementary symmetric functions $\sigma_1$ as they are obtained by multiplication $\sigma_1$ by $\alpha^1$. Since $\sigma_0$ is a constant value 1000, its components are stored permanently as states 1, 0, 0 and 0 of flip-flops 2*f*–1 to 2*f*–4, respectively.

In the operation of the multiplier 149 of FIG. 9, the pulses P from pulse generator 258 are applied to line 268*a*–1 to effect the first shift out of the states of flip-flops 9–1 to 9–4 of multiplier shift register structure 49; and the pulse PD therefrom applied to line 268*b*–1 effect the second shift out of the states of flip-flops 9–7 to 9–10. Through the feedback operation of the multiplier unit of FIG. 9, the components of the product of the finite field GF($2^4$) element $\alpha^1$ times the elementary symmetric function $\sigma_1$, i.e., $\alpha^1 \times \sigma_1$, are applied to inputs of half-adder units 280 to 281.

The pulses P and PD effect the operation of the multiplier unit of FIG. 10 to provide the components of the finite field GF($2^4$) element $\alpha^2$ times the elementary symmetric function $\sigma^2$, $\alpha^2 \times \sigma_2$, to inputs of half-adder units 288 to 291. The outputs of flip-flops 2*f*–1 to 2*f*–4 are connected to the other inputs of half-adder units 280 to 283 whose outputs are connected to the other inputs of half adder units 288 to 281. Hence, the components of the sum of the elementary symmetric functions $\sigma_0 \oplus \alpha_1\sigma_1 \oplus \alpha_2\sigma_2$ are provided to NOR unit 296 via lines 2*e*–25 to 2*e*–32. The output of NOR unit 296 which consists of $$\sum_{k=1}^{t} \sigma_k$$

is communicated to half adder unit 298. The other input to the half adder unit 298 is the next output digit of the buffer 28*a* or 28*b* from lines 841*a* and 842*a*. In the operation of the circuitry of FIGS. 2E and 2F, the PE pulses are used to gate the output of buffer 28*a* or 28*b* via line 30 into the half adder unit 298. The PF pulses are applied to line 308 to effect the advance of the output ring 4*d* of the input buffer 28*a* or 28*b*. The PG pulses are applied to line 310 and are effective to sample the output of the half adder 298 by enabling AND units 312 and 314. As each digit of the received sequence is commutated out of buffer 28a or 28b, it enters the bottom half of the half-adder 298 shown on FIG. 2F and if a particular digit is in error, the output of the NOR unit 296 is 1. Thus, if the digit is a 0 and should be a 1, the output of AND units 316a and 316b is a 1; and if the digit is a 1 and should be 0, the output of AND units 316a and 316b is a 0. The foregoing result follows from the rules of modulo-2 addition, i.e., $0\oplus0=0$, $1\oplus0=1$, $0\oplus1=1$, and $1\oplus1=0$. As the 15 digits of the received codeword are commutated out of the input buffer 28a or 28b, if there are no more than two errors therein, the errors are corrected unequivocally as the digits pass through the half adder unit 298. The original binary digit sequence before transmission or storage is presented from OR unit to output line 320.

SPECIFIC DESCRIPTION OF EMBODIMENT OF FIG. 2

The nature and operation of the embodiment of the invention presented in FIG. 2 will now be presented. A received sequence of binary digits $$r(x)=r_0+r_1(x)+ \ . \ . \ . \ r_{14}X^{14}$$

is applied to terminal 12, high order first. Illustratively, the received sequence is $$r=[100000111100000]$$

with errors at the fifth and tenth positions from the left, i.e., $r_4$ and $r_9$ are error locations. Alternate received sequences are stored in the first and second input buffers 28a and 28b, respectively. This is accomplished in the following manner.

*Description of FIG. 2A*

With reference to the timing diagram of FIG. 3, the input binary digits are in the form of a positive going level for a 1 and a negative going level for a 0. The time $t_1$ indicates when the high order digit of a received sequence is established in the embodiment 10 and the time $t_{15}$ indicates when the low order digit is established therein. The input binary digits are applied via line 14a to generator 16 to retime the synchronization pulses provided thereby simultaneously with the occurrence of the binary digits. Generator 16 provides advance pulses derived from the sync pulses, which occur between the sync pulses. Within generator 16 is a conventional counter that produces a pulse upon the occurrence of every fifteenth binary digit. The function of the sync pulses is to establish a basic timing for the embodiment 10. The function of the advance pulses is to cause an input buffer 28a or 28b to advance the digits stored therein one position.

With reference to FIG. 4, which is a schematic diagram for an input buffer 28a or 28b, the components and connections presented in FIG. 2A will now be described together with their relationship to other portions of the embodiment 10. The sync pulses are applied to line 18, the advance pulses are applied to line 20, and the count to 15 is applied to line 22 by pulse generator 16. AND unit 24 is enabled by each sync pulse on line 18 to pass each input binary digit applied thereto via line 14b. The output of AND unit 24 enables AND units 48 and 66 via lines 25a and 25b, respectively. Flip-flop 42 is set in either the 1 state or the 0 state via line 22a as result of the application of a count to 15 pulse applied to line 22 by generator 16. The 0 state section of flip-flop 42 is connected via line 44a to an input of AND gate 48 to enable it; and the 1 state is connected via line 45a to an input of AND unit 66 to enable it. Thus, the input binary digits of odd received sequences are applied via line 52a to input buffer 28a; and the digits of the even received sequences are applied via line 52b from AND unit 66 to input buffer 28b. The advance pulses applied by generator 16 to line 20 are established on lines 61a and 61b to advance the digits stored in the first and second input buffers 28a and 28b one position and to permit introduction thereto of the next digit of the appropriate received sequence.

The advance pulses are established on line 61a and 61b in the following manner. AND unit 61a is enabled via line 44b from the 0 state of flip-flop 42; and AND unit 56b is enabled via line 45b from the 1 state of flip-flop 42. The advance pulses are transmitted from AND unit 56a and 56b to AND unit 60a and 60b via lines 57a and 57b, respectively. Each count of 15 pulse applied to line 22 by generator 16 is applied to inverter 58 via line 22c which is connected via line 59a to AND unit 60a and to AND unit 60b via line 59b. Thus, line 59 is active only when no count to 15 pulse has been applied to line 22. Since this is the interval during which binary digits $r_0$ through $r_{14}$ are being established in input buffer 28a or 28b, AND units 60a and 60b are enabled during that time interval and the first 14 pulses are advanced to make storage space available for the entire 15 digits of each received sequence.

After the received sequence of binary digits has been established in either input buffer 28a or input buffer 28b, it is necessary to reset the input ring 4b of FIG. 4 to the first position. This is accomplished by a pulse on line 64a or 64b for input buffers 28a or 28b, respectively. The reset pulse is obtained in the following manner. Each count to 15 pulse applied to line 22 by generator 16 is communicated via line 23a to AND unit 62a and via 23b to AND unit 62b. Since AND unit 56a is connected to AND unit 62a via line 63a and AND unit 56b is connected to AND unit 62b via line 23b, the input ring 4b is reset to the first position by the 15th advance pulse of each series.

When the emerging digit from input buffer 28a or 28b is a 1, it is applied to line 80–1a or 80–1b, respectively. When the emerging digit from input buffer 28a or 28b is a 0, it is applied to line 80–2a or 80–2b, respectively.

The connections to and from gates 82a and 82b relating to FIG. 2A will now be described. Lines 80–1a and 80–2a which carry 1 and 0, respectively, dependent upon the nature of the emerging digit from input buffer 28a, are connected to gate 82a and are transmitted thereby on lines 84–1 and 84–2, respectively. Lines 84–1 and 84–2 are connected via lines 85–1a and 85–2a to the circuitry presented in FIG. 2F; and are connected via lines 84–1b and 84–2b to an input of AND units 76 and 78, respectively, of FIG. 2B.

Line 69f–1 is connected via gate 82a and line 127a to input buffer 28a to reset the output ring thereof. Line 124 is connected from FIG. 2B via gate 82a and line 126a to advance the output ring of input buffer 28a. Similarly, lines 69f–1 and 124 are connected via lines 60f–2 and 124b to gate 82b and therefrom via lines 127b and 126b to reset the output ring and advance the output ring, respectively of input buffer 28b.

With reference to FIG. 4, an input buffer 28 will now be described in detail. The 15 digits of the received sequence are established in flip-flops 4a–1 to 4a–15. They are introduced to buffer 28 via line 52. The 15 position input ring 4b is advanced by advance pulses applied via line 61. When a particular position of the input ring is activated, the respective AND unit 4c–1 to 4c–15 is enabled. Before an input sequence is established in buffer 28, the input ring 4b, the storage flip-flop 4a, and the output ring 4d are reset by a count 15 pulse produced by pulse generator 16. Since the storage flip-flops 4a–1 to 4a–15 are initially reset to the 0 position, only the 1 position needs to be activated by the AND units 4c–1 to 4c–15. Thus, if a 1 is present in the received sequence, in the appropriate position of the input ring the respective flip-flop 40 is set to a 1. However, if the digit is a 0, the flip-flop is maintained in the 0 state. The 1 positions of flip-flops 4a–1 to 4a–15 are connected to AND units 40–15, and the 0 states thereof are connected to AND units 4f–1 to 4f–15. For the readout phase for the received sequence stored in input buffer 28, the output ring 4*d* is advanced by a pulse on line 126 which enables AND units 40–1 to 40–15 and 4*f*–1 to 4*f*–15. Accordingly, the 1 digits of the received sequence are produced as outputs of input buffer 28 on line 80–1, and the 0 digits are produced as outputs of input buffer 28 on line 80–2. Output ring 4*d* is either reset to the first position by a pulse on line 64 which also resets the input ring to its first position or by a pulse on line 127 via OR unit 4*g*.

*Description of FIGS. 2B and 2C*

The input received sequence binary digits are transferred from input buffer 28*a* or 28*b* to AND units 76 and 78 of FIG. 2B which are enabled by pulses A1 to A15 from pulse generator 68 applied via lines 69*a*–1 and 69*a*–2, respectively. The 0 and 1 digits are transferred from AND units 76 and 78 via OR units 222*a* and 222*b* on lines 223*a* and 223*b* to input adder 86. Input adder 86 provides the modulo-2 sum of the respective input digit from the buffer of FIG. 2A and the output digit from flip-flop 104*d* of FIG. 2C. Thus, the 0 state of flip-flop 104*d* is transferred via AND unit 116*d* and line 118*a*–2 to half adder 86 to be added modulo-2 to the state of either AND units 76 or AND unit 78; and the 1 state of flip-flop 104*d* is transferred via AND unit 114*d* on line 118*b*–2 to half adder 86 to be added modulo-2 to either the 0 from AND unit 76 or the 1 from AND unit 78, whichever may be present.

The remainder of the connections of FIGS. 2B and 2C will now be presented. With reference to FIG. 2D, AND unit 132 is connected via line 134 to gate 136. AND unit 196 is connected via line 198*a* to gate 200; via line 198*b* to the pulse generator 199; via line 198*c* to output ring 226. AND unit 132 is also connected via line 198*d* to the multiplier unit 256 of FIG. 2F. OR unit 264 of FIG. 2B has as an input the PF pulse on line 308 from the pulse generator 258 of FIG. 2E. OR units 222*a* and 222*b* of FIG. 2B have as inputs the output of AND units 216*a* and 216*b* on lines 220*a* and 220*b*, respectively. The 1 and 0 states of flip-flops 94*a*, 94*b*, 94*c* and 94*d* are communicated via lines 97–1 to 97–8 to gates 234, 136 and 200 of FIG. 2D.

The pulse generator 68 (FIG. 2B) provides pulses A, AB, AC, AD, AE, and AF on lines 69*a*, 69*b*, 69*c*, 69*d*, 69*e*, and 69*f*, respectively. The count to 15 pulse from each received binary digit sequence introduced to terminal 12 of FIG. 2A is applied via OR unit 164 to initiate the operation of pulse generator 68; to set the state of flip-flop 70 via line 22*e*; to reset the primary flip-flops 94*a*, 94*b*, 94*c*, and 94*d* to their 0 states via lines 91*a*, 91*b*, 91*c*, and 91*d* and OR units 92*a*, 92*b*, 92*c*, and 92*d*, respectively; and reset the states of flip-flops 104*a*, 104*b*, 104*c*, and 104*d* to 0 via line 91*c* and OR units 102*a*, 102*b*, 102*c* and 102*d*.

The A pulses from pulse generator 68 are applied to AND unit 72 via line 69*a*–3. Since AND unit is enabled by the 1 state of flip-flop 70, the effect of each A pulse is applied via line 73 and OR unit 90*c* to AND units 114*a*, 114*b*, 114*c*, and 114*d* on line 112. Each AB pulse is applied via line 69*b* to OR unit 264 via line 69*b*–1 and via line 69*b*–2 to AND unit 74. As AND unit 74. As AND unit 74 was enabled by the 1 state of flip-flop 70, each AB pulse is transmitted via line 75 and OR unit 90*b* on line 130 to an input of AND units 103*a*–1 and 103*a*–2, 103*b*–1 and 103*b*–2, 103*c*–1 and 103*c*–2, and 103*d*–1 and 103*d*–2.

The AC pulses from pulse generator 68 are applied to AND unit 166. The 0 state of flip-flop 70 is connected via 71*b* and 71*c* to AND units 166 and 168, respectively, whose outputs are connected to an input of OR unit 90*c* and OR unit 90*d*. Thus, the AC pulses enable AND units 114*a*, 114*b*, 114*c* and 114*d* and the AD pulses enable AND units 103*a*–1, 103*a*–2, 103*b*–1, 103*b*–2, 103*c*1–1, 103*c*–2, 103*d*–1 and 103*d*–2.

Further, the AB pulses are connected via line 69*b*–1 to an input of OR unit 264 and therefrom via line 124 and gates 82*a* and 82*b* to effect the advance of output ring 4*d* of FIG. 4.

The AE pulses from pulse generator 68 are passed via line 69*c* through AND unit 162, which is enabled by the 1 state of flip-flop 70, to initiate pulse generator 68 via line 158 and OR unit 164 on line 165. The AE pulse is also applied via line 69*e*–1 to an input of AND unit 132 and via line 69*e*–3 to an input of line 196. The AND unit 132 passes the AE pulse when enabled by the 1 state of flip-flop 70 applied to line 73*a*. The AND unit 196 passes the AE pulse when enabled by the 0 state of flip-flop 70 applied via line 71*a*. The AE pulse is applied via AND units 192 and 136 on lines 134 and 198 to circuitry of FIG. 2D to effect operation thereof.

The last pulse produced by the first pulse generator 68 of FIG. 5, pulse AF, is applied via line 69*f*–1 to gates 82*a* and 82*b* of FIG. 2A to reset the output ring 4*d* of the input buffer 28*a* or 28*b* (FIG. 4) to its first position. Each AF pulse is also applied via line 69*f*–2 to set the state of flip-flop 70 to its 0 state. The AF pulse is also applied via line 69*f*–3 via OR unit 90*a* and OR units 92*a*, 92*b*, 92*c*, and 92*d* to set the state of flip-flops 94*a*, 94*b*, 94*c*, and 94*d* to the 0 state.

The remainder of the connections of the parity check circuit 89 presented in FIGS. 2B and 2C will now be described in detail. The output of half adder 86 is applied via lines 87*a* and 87*b* to the 1 state of flip flop 94*a* and via OR unit 92*a* to the 0 state of flip flop 94*a*. The primary storage flip flops 94*a*, 94*b*, 94*c*, and 94*d* of the shift register are further connected as follows. The 1 state of flip flops 94*a*, 94*b*, 94*c*, and 94*d* are connected via AND units 103*a*–1, 103*b*–1, 103*c*–1, and 103*d*–1 to the 1 states of flip flops 104*a*, 104*b*, 104*c*, and 104*d*. The 0 states of flip flops 94*a*, 94*b*, 94*c*, and 94*d* are connected via AND units 103*a*–2, 103*b*–2, 103*c*–2, and 103*d*–2 and OR units 102*a*, 102*b*, 102*c*, and 102*d* to the 0 states of flip flops 104*a*, 104*b*, 104*c*, and 104*d*.

The 1 state of flip flop 104*a* (FIG. 2D) is connected via AND unit 114*a* to an input of half adder 120, and the 0 state of flip flop 104*a* is connected via AND unit 116*a* to another input of half adder 120. The 1 state of flip flop 104*d* is connected via AND unit 114*d* to an input of half adder 120 via line 118*b*–1; and the 0 state of flip flop 104*d* is connected via line 118*a*–1 to an input of half adder 120. Half adder 120 effects the modulo-2 addition of the particular state of flip flop 104*a* with a particular state of flip flop 104*d*. Half adder 120 is connected to the 1 state of flip flop 94*b* via line 121*a* and via line 121*b* through OR unit 92*b* to the 0 state of flip flop 94*b*.

The 1 states of flip flops 94*b*, 94*c*, and 94*d* are connected via lines 95*b*–1, 95*c*–1 and 95*d*–1 through AND units 103*b*–1, 103*c*–1 and 103*d*–1 to the 1 states of flip flops 104*b*, 104*c* and 104*d*, respectively. The 0 states of flip flops 94*b*, 94*c* and 94*d* are connected via lines 95*b*–2, 95*c*–2 and 95*d*–2 through AND units 103*b*–2, 103*c*–2 and 103*d*–2 and OR units 102*b*, 102*c* and 102*d* to the 0 states of flip flops 104*b*, 104*c* and 104*d*, respectively. The 1 states of flip flops 104*b* and 104*c* are connected via AND units 114*b* and 114*c* to the 1 states of flip flops 94*c* and 94*d*, respectively; and the 0 states of flip flops 104*b* and 104*c* are connected via AND units 116*b* and 116*c* through OR units 92*c* and 92*d* to the 0 states of flip flops 94*c* and 94*d*, respectively.

Each count 15 pulse on line 22, FIG. 2B, provided by generator 16 initiates the running of pulse generator 68 via OR unit 164. As the digits from input buffer 28 (FIG. 2A) are transferred via AND units 76 and 78 to half adder 86, the first four digits are entered directly into flip flop 94*a* and are transferred therefrom successively via flip flops 104*a*, 94*b*, 104*b* to 94*c*, 94*d* to flip-flops 104*d*. The flip-flops 94*a*, 94*b*, 94*c* and 94*d* are termed the main flip-flops and flip-flops 104*a*, 104*b*, 104*c* and 104*d* are termed the intermediate flip-flops since they are the stage of transfer of a binary digit.

A count to 15 pulse from pulse generator 16 (FIG. 2A) initiates the operation of pulse generator 68 which provides pulses A, AB, AC, AD, AE and AF on lines 69*a*, 69*b*, 69*c*, 69*d*, 69*e* and 69*f*, respectively. While the alternate input received sequence of binary digits is being read into one of the input buffer 28*a* or 28*b* of FIG. 2A, the other input buffer is read out at high speed by the pulses generated by pulse generator 68. The count to 15 pulse on line 22*e* establishes flip-flop 70 in its 1 state thereby enabling AND units 72 and 74. An A pulse enables AND units 76 and 78 to gate the output of an input buffer 28*a* or 28*b* to the input of half adder 86. Gate units 82*a* and 82*b* are enabled by the 1 and 0 states, respectively, of flip-flop 42 which are set initially by a count to 15 pulse from pulse generator 16 (FIG. 2A). A count to 15 pulse is also effective via line 22*f* and OR unit 90*a* to reset the flip-flops 94*a*, 94*b*, 94*c* and 94*d* and 104*a*, 104*b*, 104*c* and 104*d* to their 0 states. Further, the A pulses are effective via AND unit 72 to enable the transfer of the contents of flip-flop 104*a* to half adder 120 and the contents of flip-flops 104*b*, 104*c* and 104*d* to flip-flop 94*c*, 94*d* and to half adder 120 and input adder 86. The A pulse accomplishes this by enabling AND units 114*a* and 116*a* for flip-flop 104*a*, AND units 114*b* and 116*b* for flip-flop 104*b*, AND units 114*c* and 116*c* for flip-flop 104*c* and AND units 114*d* and 116*d* for flip-flop 104*d*. The AB pulses transfer the contents of flip-flops 94*a*, 94*b*, 94*c*, and 94*d* to flip-flops 104*a*, 104*b*, 104*c*, and 104*d*, respectively. The AB pulses are also effective via OR unit 264 and gates 82*a* or 82*b* to advance the output ring 4*d* of input buffer 28 (FIG. 4) one position. Thus, the A and AB pulses communicate the 15 binary digits of received sequence from an input buffer 28 to the shift register structure 89 of FIGS. 2B and 2C. When the operation of the A and AB pulses has been completed, the components of the power sum $S_1$ are present in flip-flops 94*a*, 94*b*, 94*c*, and 94*d* and appear on the lines 97–1 to 97–8 connected thereto. Since flip-flops 94*a*, 94*b*, 94*c*, and 94*d* are in but one state at a time, only four of the lines 97–1 to 97–8 are active. During the development of the power sum $S_1$ both the internal and external timing of the shift register 89 are the same, i.e., the A1 to A15 pulses and the AB1 to AB15 pulses are applied for all shifts since flip-flop 70 is in the 1 state. The AE pulse from pulse generator 68 which occurs subsequent to pulse AB15 activates gate 136 via line 134 and effects the transfer of the components of the power sum $S_1$ to the flip-flops 140*a*, 140*b*, 140*c* and 140*d* of FIG. 2D.

*Description of FIG. 2D*

With reference to the timing diagram of FIG. 6, pulse generator 199 provides pulses C, CD, CE, CF, CG, CH on lines 201*a*, 201*b*, 201*c* 201*d*, 201*e* and 201*f*, respectively. The C pulses are applied to AND units 216*a* and 216*b* whose other inputs are from the 0 and 1 states of flip-flops 140*a*, 140*b*, 140*c*, and 140*d* dependent upon what state the particular flip-flop is in.

The CD pulses on line 201*b* effect the advance one position of the output ring 226 of register 139. The CE pulses on line 201*c* are communicated to OR unit 90*c* to effect the intermediate shift for the shift register 89 of FIG. 2C of the states out of flip-flops 104*a*, 104*b*, 104*c*, and 104*d*, whereas the CF pulses on line 201*d* are communicated via OR unit 90*b* to effect the main shift of the states out of flip-flops 94*a*, 94*b*, 94*c* and 94*d*. The CG pulses on line 201*e* activate gate 234 to pass the content of flip-flops 94*a*, 94*b*, 94*c* and 94*d* to circuitry of FIG. 2J on cable 236 when the components of $S_1^2$ are present in the flip-flops. CH pulses are connected via line 201*f* to the third pulse generator 258.

When the components of the power sum $S_1$ are in the flip-flops 94*a*, 94*b*, 94*c* and 94*d* they are communicated via cable 97*b* to gate 136; and when the components of $S_3$ are therein, they are communicated via cable 97*c* to gate 200. The output of gate 200, which is the power sum $S_3$, is passed via cable 202 to register 203 of FIG. 2K under the control of an AE pulse from pulse generator 68 of FIG. 2B. The output of gate 136 under the control of an AF pulse on line 134 is communicated via cable 148 to the multiplier unit 149 of FIG. 2E. Multiplier unit 149 provides the product of finite field $GF(2^4)$ element $\alpha^1$ times the elementary symmetric function $\sigma_1$.

The pulses CE and CF on lines 201*c* and 201*d* from pulse generator 199 are applied to the shift register structure 89 of FIG. 2C via OR units 90*c* and 90*b*, respectively, to effect the intermediate shift and the main shift, respectively. Pulses CG on line 201*e* from pulse generator 199 condition gate 234 to pass the contents of flip-flops 94*a*, 94*b*, 94*c*, and 94*d* shift register structure 89. Pulse CH on line 201*f* from pulse generator 199 initiates the operation of the pulse generator 258 of FIG. 2E.

*Description of FIGS. 2G, 2H, and 2I*

The 1 and 0 states of flip-flops 140*a*, 140*b*, 140*c*, and 140*d* are presented on lines 248–1 to 248–8 and are characterized as: $a_0$; $\overline{a}_0$; $a_1$, $\overline{a}_1$; $a_2$, $\overline{a}_2$; $a_3$, $\overline{a}_3$, respectively. Lines 240–1 to 240–8 are connected to AND units 252–1 through 252–15 according to the following connection pattern:

TABLE II

| AND Unit: | Cable **248** |
|---|---|
| **252–1** | $a_0; \overline{a}_1; \overline{a}_2; \overline{a}_3$ |
| **252–2** | $\overline{a}_0; a_1; \overline{a}_2; \overline{a}_3$ |
| **252–3** | $\overline{a}_0; \overline{a}_1; a_2; \overline{a}_3$ |
| **252–4** | $\overline{a}_0; \overline{a}_1; \overline{a}_2; a_3$ |
| **252–5** | $a_0; a_1; \overline{a}_2; \overline{a}_3$ |
| **252–6** | $\overline{a}_0; a_1; a_2; \overline{a}_3$ |
| **252–7** | $\overline{a}_0; \overline{a}_1; a_2; a_3$ |
| **252–8** | $a_0; a_1; \overline{a}_2; a_3$ |
| **252–9** | $a_0; \overline{a}_1; a_2; \overline{a}_3$ |
| **252–10** | $\overline{a}_0; a_1; \overline{a}_2; a_3$ |
| **252–11** | $a_0; a_1; a_2; \overline{a}_3$ |
| **252–12** | $\overline{a}_0; a_1; a_2; a_3$ |
| **252–13** | $a_0; a_1; a_2; a_3$ |
| **252–14** | $a_0; \overline{a}_1; a_2; a_3$ |
| **252–15** | $a_0; \overline{a}_1; \overline{a}_2; a_3$ |

The bar over a letter, e.g., $\overline{a}_0$, indicates the inverse. Thus, $a_0=1$ and $\overline{a}_0=0$.

The output of AND units 252–1 to 252–15 are communicated on lines 253–1 to 253–15, respectively. AND units 252–1 to 252–15 are connected via lines 253–1 to 253–15 to the OR units 2*h*–1 to 2*h*–16 in accordance with the following connection pattern:

TABLE III

| AND Units 252–1 to 252–15 | OR Units 2h–1 to 2h–16 |
|---|---|
| 1 2 3 4 6 8 9 12 | 2h–1 |
| 2 3 4 5 7 9 10 13 | 2h–2 |
| 3 4 5 6 8 9 10 11 14 | 2h–3 |
| 4 5 6 7 9 11 12 15 | 2h–4 |
| 4 5 6 7 9 11 12 15 | 2h–5 |
| 1 5 6 7 8 10 12 13 | 2h–6 |
| 2 6 7 8 9 11 13 | 2h–7 |
| 3 7 8 9 10 12 14 15 | 2h–8 |
| 3 4 5 6 8 10 11 14 | 2h–9 |
| 4 5 6 7 8 9 11 12 15 | 2h–10 |
| 1 5 6 7 8 10 11 12 | 2h–11 |
| 2 6 7 8 9 11 13 14 | 2h–12 |
| 3 4 5 7 10 13 | 2h–13 |
| 3 4 5 6 8 9 10 11 14 | 2h–14 |
| 4 6 7 9 11 12 15 | 2h–15 |
| 1 5 6 7 8 10 12 13 | 2h–16 |

The outputs of OR units 2*h*–1 to 2*h*–16 are applied to lines 2*i*–1 to 2*i*–16. The outputs are characterized, rerespectively, as $c_{00}$, $c_{01}$, $c_{02}$, $c_{03}$ for lines 2*i*–1 to 2*i*–4; $c_{10}$, $c_{11}$, $c_{12}$, $c_{13}$ for lines 2*i*–5 to 2*i*–8; $c_{20}$, $c_{21}$, $c_{22}$, $c_{23}$ for lines 2*i*–9 to 2*i*–12; and $c_{30}$, $c_{31}$, $c_{32}$, $c_{33}$ for lines 2*i*–13 to 2*i*–16.

*Description of FIG. 7*

The input adder 86 (FIG. 2B) will be described with reference to FIG. 7. Lines 232*a* and 232*b* from OR units 222*a* and 222*b*, respectively, are connected to the inputs of OR unit 86–1 whose output is connected via line 86–2 to the input of single shot unit 86–3. Single shot unit 86–3 is connected via line 86–4*a* to an input of AND unit 86–5 and via line 86–4*b* to an input of AND unit 86–6. AND unit 86–5 is connected via line 86–5*a* to input of AND unit 86–15 and via line 86–5*b* to an input of modulo-2 adder unit 86–16. AND unit 86–6 is connected via line 86–6*a* to an input of modulo-2 adder unit 86–18 and via line 86–6*b* to an input of AND unit 86–19. The outputs of AND units 86–15 and 86–19 are connected via lines 86–24 and 86–25 to the inputs of OR unit 86–26 whose output is connected via line 86–27 to line 87*b*.

Single shot unit 86–3 is also connected to an input of inverter unit 6–7 via line 86–4*c*. Inverter unit 86–7 is connected via line 86–8*a* to an input of AND unit 86–9 and via line 86–8*b* to input of AND unit 86–10. The other inputs to AND units 86–9 and 86–10 are via lines 118*b* and 118*a* from AND units 114*d* and 116*d*. Line 118*b* is connected via line 86–11 to the other input of AND unit 86–5; and line 118*a* is connected to the other input of AND unit 86–6. The outputs of AND units 86–9 and 86–10 are connected via lines 86–12 and 86–13 to lines 87*a* and 87*b*, respectively. Line 223*b* from OR unit 222*b* is also connected via line 86–14*a* to an input of AND unit 86–15 via line 86–14*b* to an input of modulo-2 adder unit 86–16. Line 223*a* from OR unit 222*a* is also connected via line 86–17*a* to an input of modulo-2 adder unit 86–18 and via line 86–17*b* to an input of AND unit 86–19. The outputs of modulo-2 adder units 86–16 and 86–18 are connected via lines 86–20 and 86–21 to the inputs of OR unit 86–22 whose output is connected via line 86–23 to line 87*a*.

*Descriptions of FIGS. 2J and 2K*

Cable 202 from gate 200 is connected to flip-flops 204*a*, 204*b*, 204*c*, and 204*d* of register 203 (FIG. 2K). The components of the power sum $S_3$ developed in shift register structure 89 which are present in flip-flops 94*a* to 94*b* are transferred via cables 202 to flip-flops 204*a* to 204*d*, respectively. The 1 state of flip-flop 204*a* is connected to line 2*k*–1; the 1 state of flip-flop 204*b* is connected to line 2*k*–2; the 1 state of flip-flop 204*c* is connected to line 2*k*–3; and the 1 state of flip-flop 204*d* is connected to line 2*k*–4 which are characterized as $b_0$, $b_1$, $b_2$ and $b_3$, respectively. Line 2*k*–1 is connected to an input of AND units 2*j*–1 to 2*j*–4; line 2*k*–2 is connected to an input of AND units 2*j*–5 to 2*j*–8. Line 2*k*–3 is connected to an input of AND units 2*j*–9 to 2*j*–12; line 2*k*–4 is connected to an input of AND units 2*j*–13 to 2*j*–16.

The outputs of OR units 2*h*–1 to 2*h*–4 are communicated on lines 2*i*–1 to 2*i*–4 to AND units 2*j*–1, 2*j*–5, 2*j*–9 and 2*j*–13, respectively. The outputs of OR units 2*h*–5 to 2*h*–8 are communicated on lines 2*i*–5 to 2*i*–8 to AND units 2*j*–2, 2*j*–6, 2*j*–10 and 2*j*–14, respectively. The outputs of OR units 2*h*–9 to 2*h*–12 are communicated on line 2*i*–9 to 2*i*–12 to inputs of AND units 2*j*–3, 2*j*–7, 2*j*–11 and 2*j*–15, respectively. The outputs of OR units 2*h*–13 to 2*h*–16 are communicated on lines 2*i*–13 to 2*i*–16 to inputs of AND units 2*j*–4, 2*j*–8, 2*j*–12 and 2*j*–16, respectively.

The outputs of AND units 2*j*–1 and 2*j*–5 are connected to the inputs of modulo-2 adder unit 2*j*–17 via lines 2*k*–5 and 2*k*–6, respectively. The following connections are made: AND units 2*j*–9 and 2*j*–13 to modulo-2 adder unit 2*j*–18 via lines 2*k*–7 and 2*k*–8, respectively; and units 2*j*–2 and 2*j*–6 to modulo-2 adder unit 2*j*–19 via lines 2*k*–9 and 2*k*–10, respectively; AND units 2*j*–10 and 2*j*–14 to modulo-2 adder unit 2*j*–20 via lines 2*k*–11 and 2*k*–12, respectively; AND units 2*j*–3 and 2*j*–7 to modulo-2 adder unit 2*j*–21 via lines 2*k*–13 and 2*k*–14, respectively; AND units 2*j*–11 and 2*j*–15 to modulo-2 adder unit 2*j*–22 via lines 2*k*–15 and 2*k*–16, respectively; AND units 2*j*–4 and 2*j*–8 to modulo-2 adder unit 2*j*–23 via lines 2*k*–17 and 2*k*–18, respectively; and AND units 2*j*–12 and 2*j*–16 to modulo-2 adder unit 2*j*–24 via lines 2*k*–19 and 2*k*–20, respectively.

The outputs of modulo-2 adder unit 2*j*–17 and 2*j*–18 are connected to modulo-2 adder unit 2*j*–26 via lines 2*k*–21 and 2*k*–22, respectively; the outputs of modulo-2 adder units 2*j*–19 and 2*j*–20 are connected to modulo-2 adder unit 2*j*–27 via lines 2*k*–23 and 2*k*–24, respectively; the outputs of modulo-2 adder units 2*j*–21 and 2*j*–22 are connected to modulo-2 adder unit 2*j*–28 via lines 2*k*–25 and 2*k*–26, respectively; the outputs of modulo-2 adder units 2*j*–23 and 2*j*–24 are connected to modulo-2 adder unit 2*j*–29 via lines 2*k*–27 and 2*k*–28, respectively. The outputs of modulo-2 adder units 2*j*–26 to 2*j*–29 are connected via lines 2*k*–30 to 2*k*–33 to modulo-2 adder units 2*j*–30 to 2*j*–33, respectively. The signals on lines 2*k*–30 to 2*k*–33 are characterized as $q_0$ to $q_3$, respectively. The terms $q_0$ to $q_3$ are the components of the quotient $S_3/S_1$ of the division operation of power sum $S_3$ by power sum $S_1$.

As noted hereinbefore, cable 236 from gate 234 of FIG. 2D is connected to flip-flops 238*a*, 238*b*, 238*c* and 238*d* according to the following connections: lines 236–1 and 236–2 to the 1 and 0 states, respectively; of flip-flop 238*a*; lines 236–3 and 236–4 to the 1 and 0 states, respectively, of flip-flop 238*b*; lines 236–5 and 236–6 to the 1 and 0 states, respectively, of flip-flop 238*c*; and lines 236–7 and 236–8 to the 1 and 0 states, respectively, of flip-flop 238*d*. The components of $S_1^2$ developed in the shift register structure 89 of FIGS. 2B and 2C are the states established in flip-flops 238*a* to 238*d*. The states of flip-flops 238*a* to 238*d* are connected via lines 2*k*–34 to 2*k*–37 to the inputs of modulo-2 adder units 2*j*–30 to 2*j*–33. The outputs of modulo-2 adder units 2*j*–30 to 2*j*–33 are communicated on lines 255–1 to 255–4, respectively, to the multiplier unit 256 of FIG. 2F. The outputs are the components of $\sigma_2 \equiv S_1^2 \oplus S_3/S_1$.

*Description of FIG. 9*

FIG. 9 presents the multiplier unit 149 which is a shift register structure. Multiplier unit 149 effects the product of the finite field GF($2^4$) element $\alpha^1$ times the elementary symmetric function $\sigma_1$. The AB pulse from pulse generator 68 conditions gate 136 via line 134 to pass the contents of flip-flops 94*a*, 94*b*, 94*c* and 94*d* of FIG. 2C, i.e., the components of the power sum $S_1 \equiv \sigma_1$ to unit 149 via cable 138*b*. The states from flip-flops 94*a*, 94*b*, 94*c* and 94*d* are established in flip-flops 9–1 to 9–4 via OR pairs 9–3*a* and 9–3*b*, 9–4*a* and 9–4*b*, 9–5*a* and 9–5*b*, and 9–6*a* and 9–6*b*, respectively. Pulses P and PD on lines 268*a*–1 and 268*b*–1, respectively, effect the first shift and second shift unit 149. Pulse B on line 268*a*–1 effects the transfer of the state of flip-flops 9–1 to 9–4 to flip-flops 9–7 to 9–10 via AND unit pairs 9–11*a* and 9–11*b*, 9–12*a* and 9–12*b*, 9–13*a* and 9–13*b*, and 9–14*a* and 9–14*b*, respectively.

The pulse PD on line 268*b*–1 effects the transfer of the state of flip-flops 9–7 to 9–10 via AND unit pairs 9–15*a* and 9–15*b*, 9–16*a* and 9–16*b*, 9–17*a* and 9–17*b*, and 9–18*a* and 9–18*b*, respectively. The state of flip-flop 9–7 is transferred to a half adder unit 9–19 where it is added modulo-2 to the state of flip-flop 10 which is transferred thereto via AND unit 9–18*a* and 9–18*b*. The state of flip-flop 9–8 is transferred via OR unit pair 9–5*a* and 9–5*b* to flip-flop 9–3. The state of flip-flop 9–9 is transferred via OR unit pair 9–6*a* and 9–6*b* to flip-flop 9–4. Further, the state of flip-flop 9–10 is also transferred via OR unit pair 9–3*a* and 9–3*b* to flip-flop 9–1. The states of flip-flops 9–1 and 9–4 are presented to lines 2*e*–1 to 2*e*–8 according to the following pattern: the state of flip-flop 9–1 via line 2*e*–1 or 2*e*–2, the state of flip-flop 9–2 via line 2*e*–3 or 2*e*–4, the state of flip-flop 9–3 via line 2*e*–5 or 2*e*–6, and the state of flip-flop 9–4 via line 2*e*–7 or 2*e*–8. Line pairs 2*e*–1 and 2*e*–2, 2*e*–3 and 2*e*–4, 2*e*–5 and 2*e*–6, 2*e*–7 and 2*e*–8 are connected to half adder units 280 to 283, respectively. After both a first shift and a second shift of multiplier unit 149 have occurred, the components of the new elementary symmetric function $\bar{\sigma}_1 \equiv \alpha^1 \times \sigma_1$ are present in flip-flops 9–1 to 9–4. Thus, the P and PD pulses are applied once for each digit of a received sequence established in an input buffer 28*a* or 28*b*.

*Description of FIG. 10*

The initial states of flip-flops 10–1 to 10–4 are reset to 0 by an AE pulse from pulse generator 68 (FIG. 2B) presented on line 198*e*. The AE pulse is applied: via line 198*d*–1 and OR unit 10–5*b* to reset the flip-flop 10–1 to the 0 state; via line 198*d*–2 and OR unit 10–6*b* to reset the initial state of flip-flop 10–2 to 0; via line 198*d*–3 and OR unit 10–7*b* to reset the initial state of flip-flop 10–3 to 0; and via line 198*d*–4 and OR unit 10–8*b* to reset the initial state of flip-flop 10–4 to 0. States of the flip-flops 10–1 to 10–4 are changed by the presence of 1 pulses on lines 255–1 to 255–4 connected via OR units 10–5*a*, 10–6*a*, 10–7*a*, 10–8*a* to the 1 states of the flip-flops 10–1 to 10–4, respectively. The first shift of multiplier unit 256 is accomplished by a P pulse on line 268*a*–2 from pulse generator 258 of FIG. 2E which effects the transfer of the state of flip-flops 10–1 to 10–4 to flip-flops 10–9 to 10–12 via AND unit pairs: 10–13*a* and 10–13*b*, 10–14*a* and 10–14*b*, 10–15*a* and 10–15*b*, and 10–16*a* and 10–16*b*, respectively.

Transfer of the states of flip-flops 10–9 to 10–12 is accomplished by a pulse PD from pulse generator 258 on line 268*b*–2 via AND unit pairs: 10–17*a* and 10–17*b*, 10–18*a* and 10–18*b*, 10–19*a* and 10–19*b*, and 10–20*a* and 10–20*b*, respectively. The state of flip-flop 10–9 is transferred to half adder unit 10–21 where it is added modulo-2 to the state of flip-flop 10–21 where it is added is established in flip-flop 10–2 via OR unit pair 10–7*a* and 10–7*b*. The state of flip-flop 10–10 is transferred to flip-flop via OR unit pair 10–8*a* and 10–8*b*. The state of flip-flop 10–11 is transferred to half adder unit 10–22 where it is added modulo-2 to the state of flip-flop 10–12 and the result is established in flip-flop 10–2 via OR unit pair 10–6*a* and 10–6*b*. Further, the state of flip-flop 10–11 is transferred to flip-flop 10–1 via OR unit pair 10–5*a* and 10–5*b*.

The states of flip-flops 10–1 to 10–4 are transferred via line pairs: 2*f*–1 and 2*f*–2, 2*f*–3 and 2*f*–4, 2*f*–5 and 2*f*–6, 2*f*–7 and 27–8, to half adder units 288 to 291, respectively. After a first shift and a second shift of multiplier unit 256; the product of the finite field GF($2^4$) element $\alpha^2$ times the elementary symmetric function $$\sigma_2 \equiv S_1^2 \oplus S_3 / S_1$$

is obtained. The components of $\bar{\sigma}_2 \equiv \alpha^2 \times \sigma_2$ are established in flip-flops 10–1 to 10–4. A new $\sigma_2$ is obtained for each digit of the received sequence established in a buffer register 28*a* or 28*b* (FIG. 2A).

*Desciption of FIGS. 2E and 2F*

With reference to FIG. 8 which is the pulse pattern produced by pulse generator 258, the various units and connections of FIGS. 2E and 2F will now be described. The output of gate 136 (FIG. 2D) is communicated via cable 138*b* to the multiplier unit 149, shown in detail in FIG. 9. Multiplier unit 149 provides the product $\alpha^1 \times \sigma_1$ of the finite field GF($2^4$) element $\alpha^1$ times the elementary symmetric function $\sigma_1$. The CH pulse from the pulse generator 199 (FIG. 2D) is communicated on line 201*f* to initiate the operation of the pulse generator 258. Line 198*d* from FIG. 2D which communicates an AE pulse from the pulse generator 68 (FIG. 2B) is connected to the multiplier unit 256, shown in detail in FIG. 10. Lines 255–1 to 255–4 from modulo-2 adder units 2*j*–31 to 2*j*–33 of FIG. 2F are connected to multiplier unit 256.

Pulse generator 258 (FIG. 2E) provides pulses P, PD, PE, PF, and PG on lines 268*a*, 268*b*, 300, 308, and 310, respectively. The P and PD pulses are communicated via lines 268*a*–1 and 268*b*–1 to multiplier unit 149 and via lines 268*a*–2 and 268*b*–2 to the multiplier unit 256. Pulses P and PF effect the main shift and intermediate shift of multiplier units 149 and 256. The PF pulses are communicated on lines 308 to OR unit 264 of FIG. 2A to advance the output ring 4*d* of an input buffer 28*a* or 28*b*.

Output lines from multiplier unit 149 are connected in pairs, 2*e*–1 and 2*e*–2, 2*e*–3 and 2*e*–4, 2*e*–5 and 2*e*–6, and 2*e*–7 and 2*e*–8 to half adder units 282 to 283, respectively. The other inputs to the half adder units 280 to 283 are from flip-flops 2*f*–1 to 2*f*–4 of register 251 (FIG. 2E). The components of the elementary symmetric function $\sigma_0$ are stored permanently in flip-flops 2*f*–1 to 2*f*–4, respectively, i.e., 1, 0, 0 and 0. The 1 and 0 states of the flip-flops 2*f*–1 to 2*f*–4 are connected to half adder units 280 to 283, respectively. The output lines from the multiplier 256 are connected as follows to half adder units 288 to 291: lines 2*e*–9 and 2*e*–10 to half adder unit 288; lines 2*e*–11 and 2*e*–12 to half adder unit 289; lines 2*e*–13 and 2*e*–14 to half adder unit 290; and lines 2*e*–15 and 2*e*–16 to half adder unit 291. The outputs of half adder units 280 to 283 are connected to half adder units 288 to 291 according to the following pattern: half adder unit 280 is connected via lines 2*e*–17 and 2*e*–18 to half adder unit 288; half adder unit 281 is connected via lines 2*e*–19 and 2*e*–20 to half adder unit 289; half adder unit 282 is connected via lines 2*e*–21 and 2*e*–22 to half adder unit 290; and half adder unit 283 is connected via lines 2*e*–23 and 2*e*–24 to half adder unit 291. Half adder unit 288 is connected to NOR unit 296 via lines 2*e*–25 and 2*e*–26; half adder unit 289 is connected to NOR unit 296 via lines 2*e*–27 and 2*e*–28; half adder unit 290 is connected to NOR unit 296 via lines 2*e*–29 and 2*e*–30; and half adder unit 291 is connected to NOR unit 296 via lines 2*e*–31 and 2*e*–32. The input to NOR unit 296 are the components of $\sigma_0 \oplus \sigma_1 \oplus \sigma_2$, i.e., the modulo-2 sum of the elementary symmetric functions $\sigma_0$, $\sigma_1$, and $\sigma_2$. NOR unit 296 will provide an output 1 on lines 2*e*–33 and 2*e*–34 if the sum is 0. The sum will be 0 if there is a corresponding error location in the received sequence being processed by the embodiment 10 of FIG. 2.

The output of NOR unit 296 is communicated to half adder unit 298 via lines 2*e*–33 to 2*e*–34. The other inputs to half adder unit 298 are via lines 2*e*–35 and 2*e*–36 from AND units 302 and 304, respectively. The inputs to AND units 302 and 304 are the 1 or 0 of the received sequence emerging from the input buffer 28*a* or 28*b* of FIG. 2A on lines 84–1*a* or 84–2*a* and line 300 from pulse generator 258 which communicates the PE pulse. Thus, the PE pulse enables AND units 302 and 304 to pass the digit of the received sequence to half adder unit 298. Since lines 2*e*–33 and 2*e*–34 are activated only when an error location at this digit in the received sequence has been determined by the operation of embodiment 10, the modulo-2 sum provided by half adder unit 298 effects correction of the erroneous digit. The outputs of half adder unit 298 communicated on lines 2*e*–37 and 2*e*–38 to AND units 312 and 314, respectively. The other inputs to the AND units 312 and 314 are on lines 2*e*–39 and 2*e*–40, respectively, which are connected to lines 310 from pulse generator 258 (FIG. 2E). Pulse PG from pulse generator 258 is communicated on line 310. Thus, the PG pulse enables AND units 312 and 314 when the pertinent digit of the received sequence is to be provided as the output from embodiment 10. The output from embodiment 10 is provided on lines 316*a* and 316*b* from AND units 312 and 314.

Thus, a received binary digit sequence $$r = r_0, r_1, \ldots r_{14}$$

which was originally established in the format of a codeword of a Bose-Chaudhuri-Hocquenghem code, is processed by embodiment 10 of FIG. 2. If there are no more than two error locations in the received sequence, they are corrected unequivocally and the digits of the original binary digit sequence are presented on output lines **316*a* and 316*b*, i.e., 1 and 0 respectively, and reconstructed via OR unit 318 as the output digit sequence on line 320**.

PRACTICE OF INVENTION

*Universal parity check circuit*

The shift register structure 89 of FIGS. 2A and 2B and timing control therefor, whose structure and operation have been described in detail hereinbefore, may properly be termed a universal parity check circuit for obtaining the syndromes or parity checks for a received digit sequence which was originally established in the format of a Bose-Chaudhuri-Hocquenghem code. Although theoretical considerations relating to the parity check circuit have been presented hereinbefore, they will now be emphasized for clarity at this point. In the embodiment shown in FIGS. 2B and 2C for a (15,7) BCH code for correcting $t=2$ independent errors, the parity check circuit obtains the syndromes of a received sequence $$r(x) = r_0 + r_1x + r_2x^2 + \ldots r_{14}x^{14}$$

in the form of power sums $S_1$ and $S_3$. Generally, consider a received sequence $$r(x) = r_0 + r_1x + r_2x^2 + \ldots r_{n-1}x^{n-1}$$

for an $(n, k)$ BCH code capable of correcting any pattern of $t$ independent errors where $n=2^m-1$ and $m \times t$ is the maximum number of check digits required for $k$ information digits. The power sums are $$S_i = r(\alpha^i) \sum_{j=1}^{t} \beta_j{}^i \,(i=1, 2, \ldots 2t-1)$$

where the $\alpha^i$ are elements of the finite field $GF(2^m)$ and the $\beta_j$ are error terms. The error terms $\beta_j$ are the roots of the error location polynomial $$F(x) = \sigma^t + \sigma_1 x + \sigma_2 x^{t-2} + \ldots \sigma_t$$
$$= (x-\beta_1)(x-\beta_2) \ldots (x-\beta_t)$$

where the $\sigma_k$ are elementary symmetric functions related to the power sums $S_i$ by Newton's identities $$S_1 + \sigma_1 = 0$$
$$S_2 + \sigma_1 S_1 = 0$$
$$S_3 + \sigma_1 S_2 + \sigma_2 S_1 + \sigma_3 = 0$$

$$\sum_{i=0}^{n} S_i \sigma_{n-i}$$

and are homogeneous sums of square-free products of order $k$ of the roots $\beta_j$. The parity check matrix M for a $(n, k)$ BCH code is:

$$M = \begin{bmatrix} 1 & 1 & \cdot & \cdot & 1 \\ \alpha & \alpha^3 & \cdot & \cdot & \alpha^{2t-1} \\ \alpha^2 & \alpha^6 & \cdot & \cdot & \alpha^{2(2t-1)} \\ \alpha^3 & \alpha^9 & \cdot & \cdot & \alpha^{3(2t-1)} \\ \vdots & \vdots & \vdots & \vdots & \vdots \\ \alpha^{n-1} & \alpha^{3(n-1)} & \cdot & \cdot & \alpha^{(n-1)(2-t1)} \end{bmatrix} \quad (3)$$

The finite field $GF(2^4)$ is defined with the irreducible primitive polynomial $1+x+x^4$. The polynomials of the (15, 7) BCH code $$(m=4,\ t=2,\ n=2^4-1-15,\ m \times 1 = 4 \times 2 = 8)$$

are all the polynomials of degree 14 or less which are a multiple of the generator polynomial $$g(x) = 1x^4 + x^6 + x^7 + x^8$$
$$= (1+x+x^4)(1+x+x^2+x^3+x^4)$$

It may be shown that $g(\alpha) = g(\alpha^3) = 0$. For the (15, 7) BCH code with $t=2$ the parity check matrix is $$M = \begin{bmatrix} 1 & 0 & 0 & 0 & & 1 & 0 & 0 & 0 \\ 0 & 1 & 0 & 0 & & 0 & 0 & 0 & 1 \\ 0 & 0 & 1 & 0 & & 0 & 0 & 1 & 1 \\ 0 & 0 & 0 & 1 & & 0 & 1 & 0 & 1 \\ 1 & 1 & 0 & 0 & & 1 & 1 & 1 & 1 \\ 0 & 1 & 1 & 0 & & 1 & 0 & 0 & 0 \\ 0 & 0 & 1 & 1 & & 0 & 0 & 0 & 1 \\ 1 & 1 & 0 & 1 & & 0 & 0 & 1 & 1 \\ 1 & 0 & 1 & 0 & & 0 & 1 & 0 & 1 \\ 0 & 1 & 0 & 1 & & 1 & 1 & 1 & 1 \\ 1 & 1 & 1 & 0 & & 1 & 0 & 0 & 0 \\ 0 & 1 & 1 & 1 & & 0 & 0 & 0 & 1 \\ 1 & 1 & 1 & 1 & & 0 & 0 & 1 & 1 \\ 1 & 0 & 1 & 1 & & 0 & 1 & 0 & 1 \\ 1 & 0 & 0 & 1 & & 1 & 1 & 1 & 1 \end{bmatrix}$$

The parity check circuit of FIGS. 2B and 2C provides power sum $S_1$ from the received sequence with a timing pulse pattern A and AB (FIG. 5) from pulse generator 68 such that both the main shift (line 130) and intermediate shift (line 112) of shift reigster structure 89 are at the same frequency that the digits are entered via input adder 86. The parity check circuit provides the power sum $S_3$ from the received sequence by having the main shift and intermediate shift of shift register structure under control of pulses AC and AD (Fig. 5) which are at three times the frequency the received digits are entered therein under the control of pulses A.

Hence, there is provided in FIGS. 2B and 2C a universal parity check circuit for a BCH code. The circuit uses the same physical structure for each parity check but has a different internal timing.

The shift register structure 89 of FIGS. 2B and 2C is also used to obtain $S_1^2$. This is accomplished by applying the digits of the received sequence to input adder 86 under the timing control of pulses C (FIG. 6) from pulse generator 199 (FIG. 2D) while the internal timing (main shift and intermediate shift) are under the control of pulses CE and CF (FIG. 6) which are at twice the frequency of the C pulses.

Thus, any power sum $S_i$ or square thereof $S_i^2$ may be obtained for a received digit sequence through the operation of a shift register structure and timing therefor in accordance with the invention.

*Solution of polynomial equation in finite field*

The practice of the invention has been described hereinbefore for obtaining error location in a received binary digit sequence which was originally established in the format of a codeword of a Bose-Chaudhuri-Hocquenghem code. However, the invention may be utilized more generally for solving the roots of any polynomial with coefficients in the finite field $GF(p^m)$, where $p$ is a prime number and $t$ is an integer. Consider the polynomial $$F(x) = \sigma_0 x^t + \sigma_1 x^{t-} + \ldots \sigma_t$$

It may be shown that the polynomial $F(x)$ has no more than $t$ distinct roots denoted as elements of the finite field $GF(p^m)$: $\beta_1\beta_2 \ldots \beta_t$. Therefore, the polynomial $F(x)$ may be factored as $$F(x) = \sigma_0(x-\beta_1)(x-\beta_2) \ldots (x-\beta_t)$$

It may be assumed without loss of generality that $\sigma_0 = 1$. Under this circumstance, the coefficients $\sigma_1 \ldots \sigma_t$ may be calculated in terms of the $\beta_j$'s, i.e., the $\sigma_k$'s are homogeneous sums of square free products of the roots of order $k$.

$$\sigma_1 = \sum_{j=1}^{t} \beta_j$$

$$\sigma_2 = \sum_{\substack{j,\,k=1 \\ j>k}} \beta_j \beta_k$$

$$\sigma_3 = \sum_{\substack{i,\,j,\,k=1 \\ i>j,\,j>k}}^{t} \beta_i \beta_j \beta_k$$

Consider the transformation of $\beta_j (j=1, 2, \ldots t)$ to $\bar{\beta}_j = \alpha\beta_j$ where $\alpha$ is a primitive element of the finite field $GF(p^m)$. As result of the homogeneous property of the sums of the roots, the relationship between the original and transformed elementary symmetric functions is:

$$\bar{\sigma}_k = a^k \sigma_k \quad k=1, 2, \ \ldots t$$

Thus, the $\bar{\beta}_j$'s are roots of the polynominal $$F(x) = x^t + \bar{\sigma}_1 x^{t-1} + \bar{\sigma}_2 x^{t-2} + \ \ldots \ \bar{\sigma}_t$$

After the transformation is applied $\tau$ times, there are obtained $$\tilde{\beta}_j = \alpha\tau\beta_j \quad j=1, 2, \ldots t$$

$$\tilde{\sigma}_k = \alpha^{\tau k}\sigma_k \quad k=0, 1, 2, \ldots t$$

As $\alpha^n = \alpha^{2^m-1} = 1$ in the finite field $GF(2^m)$, the powers never exceed $n=2^m-1$.

By detecting if a specific element of $GF(2^m)$ is a root of the polynominal $F(x)$, all its roots may be obtained by successive transformations. For simplicity, the element to be detected is the unit element of $GF(2^m)$. When $\alpha^0=1$ is a root of a polynomial $F(x)$, $x^k=1$ $(k=1, 2, \ldots t)$ and $$F(1) = 1 + \sigma_1 + \sigma_2 + \ \ldots \ \sigma_t = 0$$

or alternatively $$\sum_{k=1}^{t} \sigma_k = \sigma_1 + \sigma_2 + \ldots \sigma_t = 1$$

If $\Sigma\sigma_k = 1$ after $\tau_1, \tau_2, \ldots \tau_t$ transformations, the roots of the polynomial $F(x)$ are $\alpha^{n-\tau}1, \alpha^{n-\tau}2, \ldots \alpha^{n-\tau}t$.

With reference to FIG. 1, for solution of the polynomial $$F(x) = x^t + \sigma_1 x^{t-1} + \sigma_2 x^{t-2} + \ \ldots \ \sigma_t$$

for its roots, the coefficients $\sigma_k$ are established in units 1$a$–$\sigma_1$ to 1$a$–$\sigma_t$ from unit 1$a$–10. When the apparatus for FIG. 1 is being used only for solution of the polynomial $F(x)$, the portion thereof consisting of buffer 1$a$–6, OR unit 1$a$–16 and units 1$a$–$S_1$ to 1$a$–$S_{2t-1}$ is not used. By operation of units 1$a$–$\alpha$ to 1$a$–$\alpha^t$, the coefficients $\sigma_1$ to $\sigma_t$ are multiplied, respectively, by the elements $\alpha$ to $\alpha^t$ of the finite field $GF(2^m)$. The products are applied to unit 1$a$–12.

As each $$\sum_{k=1}^{t} \sigma_k$$

is provided by unit 1$a$–12, another unit, not shown, provides the elements of the finite field $GF(p^m)$ in the order of the successive powers of the primitive root $\alpha$, i.e., $$\alpha^{n-1}, \alpha^{n-2}, \alpha^{n-3}, \ldots \alpha^0$$

When $$\sum_{k=1}^{t}$$

the corresponding element of the field is a root of $F(x)$. Thus, the two circuits operate in synchronism to obtain all the roots of $F(x)$.

Illustratively, for the finite field $GF(2^4)$, the primitive polynomial is $$f(x) = 1 + x + x^4$$

whose reciprocal is $$f'(x) = x^4(1 + 1/x^4) = x^4 + x^3 + 1$$

The circuit for providing the corresponding elements of the field for $$\sum_{k=1}^{t} \sigma_k$$

from FIG. 1 is a shift register structure which is the reciprocal of the circuit 89 of FIG. 2 which provides in sequence the elements $\alpha^{n-1}, \alpha^{n-2}, \ldots \alpha^0$. The reciprocal circuit is designed to have four storage stages, a modulo-2 unity of an error-location polynomial to designate an first, second and third storage units are connected sequentially. The third storage unit is connected to an input of the modulo-2 adder unit whose output is connected to the input of the fourth storage unit. The output of the fourth storage unit is connected in feedback to the other input of the modulo-2 adder unit and to the input of the first storage unit. Initially, the element $\alpha^{n-1} = \alpha^{14}$ is established in the reciprocal circuit and for each shift thereof the next element of lower order is obtained.

*Procedure for received sequence with low order first*

The practice of this invention has been described hereinbefore for a received digit sequence which is processed high order to low order. The invention may also be practiced if the received digit sequence is processed low order to high order. However, the finite field multiplier units, e.g., 1$a$–$\sigma_1$ to 1$a$–$\sigma_t$ of FIG. 1, must be made into finite field divider units. Dividing by $\alpha^k$ is identical to multiplying by $\alpha^{n-k}$.

A shortened cyclic code is derived from a cyclic code by deleting some of the leading positions of each codeword. Assume the cyclic code being used for the practice of the invention has $k$ information digits from high order to low order and $n$–$k$ check digits. If the information digits are shortened by $\theta$, i.e., $k$–$\theta$ information digits remain the buffer storage, e.g., units 28$a$ and 28$b$ of FIG. 2H, is shortened by $\theta$ digits, and the elementary symmetric function multiplier, e.g., units 149 and 256 of FIG. 2F, are pulsed $\theta+1$ times.

*Procedure for decoding with root $\alpha^y$*

Hereinbefore, the practice of the invention has been described especially with reference to selecting the root unity of an error-location polynomial to designate an error-location in a received sequence. However, any element of the finite field which defines the Bose-Chaudhuri-Hocquenghem code may be used as the designating root.

In general, when $\alpha^y$ is a root of the error-location polynomial $$F(x) = \sigma_0 x^t + \sigma_1 x^{t-1} + \ \ldots \ \sigma_t$$

then, $$F(\alpha^y) = \sigma_0 \alpha^{ty} + \sigma_1 \alpha^{(t-1)y} + \ \ldots \ \sigma_t = 0$$

To detect this condition a circuit is utilized which corresponds to $F(\alpha^y)=0$. It sums the products $\sigma_k\alpha^{(t-k)y}$ $k=0, 1, 2, \ldots t)$ by premultiplying the content of $\sigma$-registers (FIG. 1A) by $\alpha^{(t-k)y}$. These operations may be accomplished by conventional combinational circuits. Furthermore, the initial contents of the $\sigma$-registers corresponds to the position designated by $\alpha^y$. To synchronize properly the $\sigma$-registers are pulsed $n-y+1$ times first. It is noted that the detection circuit shown in FIG. 1B corresponds to $y=0$.

*Parallel decoding procedure*

The practice of the invention has been described hereinbefore with reference to preferred embodiments which operate in a serial mode. Power sums are obtained from a received sequence and thereafter transformations are obtained in the finite field which defines the BCH code.

However, it is feasible to practice the invention in a parallel mode. A set of power sums is obtained for each possible cyclic permutation of a received sequence. An indication is obtained of the pre-selected root which designates an error location of each respective error-location polynomial. It is noted that the parallel mode of operation utilizes more hardware but is faster than the serial mode of operation.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for identifying an error pattern in a received digit sequence which was originally established in the format of a codeword of a linear code comprising:

means for obtaining a plurality of first digit sequences representative of syndromes from said received sequence;

means for obtaining a plurality of second digit sequences representative of parameters from said syndromes which are the coefficients of an error-location function, said coefficients being elements of a finite field;

means for synchronously transforming said coefficients in said finite field in correspondence with different digits of said received digit sequence; and means for identifying an error location in said received sequence when a quantity derived from said error-location function is a predetermined value.

2. Apparatus according to claim 1 in which said quantity derived from said error-location function is unity.

3. Apparatus for identifying an error pattern in a received digit sequence which was originally established in the format of a codeword of a cyclic code defined by a finite field comprising:

means for obtaining a plurality of first digit sequences representative of syndromes from said received sequence;

means for transforming said syndromes in said finite field; and means for identifying an error location in said received sequence including means for obtaining a respective digit sequence representative of a function of the corresponding elementary symmetric functions for said transformed syndromes; and means for determining when said function of the corresponding elementary symmetric functions equals a predetermined value to identify a corresponding location in a transformed digit sequence obtained by transformation from said received sequence.

4. Apparatus according to claim 3 in which said predetermined value is unity.

5. Apparatus for identifying an error pattern in a received digit sequence which was originally established in the format of a codeword of a Bose-Chaudhuri-Hocquenghem error-correcting code defined by a finite field comprising:

means for obtaining a plurality of first digit sequences representative of power sums;

means for transforming said power sums in said finite field to second digit sequences representative of first elementary symmetric functions;

means for transforming said first elementary symmetric functions in said finite field to third digit sequences representative of second elementary symmetric functions;

means for obtaining a respective fourth digit sequence representative of a function of said second elementary symmetric functions; and means to identify an erroneous digit position in said received sequence when said function equals a predetermined value.

6. Apparatus according to claim 5 in which said predetermined value is unity.

7. Apparatus for identifying a plurality of error locations in a received digit sequence which was originally established in the format of a codeword of a cyclic error-correcting code comprising:

means for providing first digit sequences representative of a corresponding error-location polynomial from said sequence whose coefficients are elements in a finite field;

means for multiplying said coefficients by second digit sequences representative of particular elements respectively from said field for a corresponding digit of said received sequence to obtain third digit sequences representative of the products;

means for providing a corresponding sum of said products; and means for determining when a said sum equals unity to identify each said error location.

8. Apparatus for identifying a plurality of error locations in a received digit sequence which was originally established in the format of a codeword of a cyclic error-correcting code comprising:

means for providing first digit sequences representative of a corresponding error-location polynomial from said received sequence whose coefficients are elements in a finite field;

means for multiplying said coefficients by second digit sequences representative of particular elements respectively from said field for a corresponding digit of said received sequence to obtain third digit sequences representative of the products;

means for obtaining a function of said products; and means for determining when said function is a preselected root of said polynomial.

9. Apparatus for identifying a plurality $t$ of error locations in a received digit sequence $$r=r_0r_1r_2 \ldots r_{n-1}$$

which was originally established in the format of a cyclic error-correcting code comprising:

means for providing first digit sequences representative of a corresponding error-location polynomial $$F(x)=\sigma_0x^t+\sigma_1x^{t-1}+\sigma_2x^{t-2}+ \ldots \sigma_t$$

from said received sequence whose coefficients are elements in the finite field GF($p^m$);

means for multiplying said coefficients by second digit sequences representative of particular elements respectively from said field for a corresponding digit of said received sequence to obtain products $$\alpha^0\times\sigma_0,\ \alpha^1\times\sigma_1,\ \alpha^2\times\sigma_2,\ \ldots\ \alpha^t\times\sigma_t$$

means for providing a corresponding sum $$\sum_{k=1}^{t}\bar{\sigma}_k \sum_{k=1}^{t}\alpha^k\sigma_k$$

of said products; and means for determining when a said sum equals unity to identify one said error location.

10. Apparatus for correcting a plurality of errors in a received digit sequence which was originally established in the format of a codeword of a cyclic error-correcting code comprising:

means for providing first digit sequences representative of a corresponding error-location polynomial from said received sequence whose coefficients are elements in a finite field GF($p^m$);

means for multiplying said coefficients by second digit sequences representative of particular elements respectively from said field to obtain third digit sequences representative of the products;

means for providing a corresponding function of said products; and means for providing the modulo-p sum of said latter function and the corresponding digit of said received digit sequence synchronously.

11. Apparatus for identifying the roots of a polynomial whose coefficients are elements of a finite field, said polynomial being represented as first digit sequences, comprising:

means for multiplying said coefficients by second digit sequences representative of particular elements of said finite field for a corresponding digit of said sequence to obtain third digit sequences representative of the products;

means for providing a corresponding fourth digit sequence representative of the sum of said products; and means for identifying each said root when a said fourth digit sequence representative of said sum equals a predetermined value.

12. Apparatus for identifying the roots $\beta_1, \beta_2, \ldots \beta_t$ of a polynomial $$F(x)=\sigma_0x^t+\sigma_1x^{t-1}+\ldots\sigma_t$$
$$=\sigma_0(x-\beta_1)(x-\beta_2)\ldots(x-\beta_t)$$

whose coefficients are elements of a finite field GF($p^m$), said polynomial being represented as first digit sequences, comprising:

means for multiplying said coefficients by second digit sequences representative of particular elements of a finite field for a corresponding digit of said first sequence to obtain third digit sequences representative of the products $$\alpha^0\times\sigma_0,\ \alpha^1\times\sigma_1,\ \alpha^2\times\sigma_2\ \ldots\ \alpha^t\times\sigma_t$$

means for providing sequential sums $$\sum_{k=1}^{t}\bar{\sigma}_k\sum_{k=1}^{t}\alpha^k\sigma_k$$

of said successive products; and means for identifying each said root when said sum equals unity.

13. Apparatus for obtaining the roots of a polynomial whose coefficients of terms are elements of a finite field, said polynomial being represented as first digit sequences, comprising;

means for multiplying said coefficients by second digit sequences representative of particular elements of said finite field in ascending powers of a primitive element according to the order of the respective term to obtain third digit sequences representative of the products;

means for providing a corresponding sum of said products;

means for identifying each said root including means to provide elements of said field in descending powers of said primitive elements in correspondence with said particular elements; and means to select said latter element as said root when said sum equals unity.

14. Apparatus for identifying a plurality of error locations in a received digit sequence which was originally established in the format of a codeword of a Bose-Chaudhuri-Hocquenghem error-correcting code comprising:

means for providing first digit sequences representative of an error-location polynomial from said received sequence whose coefficients are elements of a finite field;

means for multiplying said coefficients by second digit sequences representative of particular elements from said finite field for a corresponding digit of said sequence to obtain third digit sequences representative of the products;

means for providing a corresponding sum of said successive products; and means for identifying said error locations when a said sum equals unity.

15. Apparatus for identifying a plurality $t$ of error locations in a received digit sequence $$r=r_0r_1\ \ldots\ r_{n-1}$$

which was originally established in the format of a codeword of a Bose-Chaudhuri-Hocquenghem error-correcting code comprising:

means for providing first digit sequences representative of an error-location polynomial $$F(x)=\sigma_0x^t+\sigma_1x^{t-1}\ \ldots\ \sigma_t$$

from said received sequence whose coefficients are elements of a finite field GF($p^m$);

means for multiplying said coefficients and second digit sequences representative of particular elements respectively from said finite field for a corresponding digit of said sequence to obtain third digit sequences representative of the products $$\alpha^0\times\sigma_0,\ \alpha^1\times\sigma_1,\ \alpha^2\times\sigma_2,\ \ldots\ \alpha^t\times\sigma_t$$
$$=\sum_{k=1}^{t}\alpha^k\sigma_k$$

means for providing a sum $$\sum_{k=1}^{t}\bar{\sigma}_k$$

of said products; and means for identifying each said error location when a said sum equals unity.

16. Apparatus for correcting a plurality of errors in a received digit sequence which was originally established in the format of a codeword of a Bose-Chaudhuri-Hocquenghem error-correcting code comprising:

means for providing a first digit sequence representative of an error-location polynomial from said received sequence whose coefficients are elements of a finite field GF($p^m$);

means for multiplying said coefficients by second digit sequences representative of particular elements from said finite field to obtain third digit sequences representative of products;

means for providing a corresponding sum of said products; and means for providing the modulo-$p$ sum of said latter sum and the corresponding digit of said received sequence synchronously.

17. Apparatus for identifying independent error locations in a received digit sequence which was originally established in the format of a codeword of a Bose-Chaudhuri-Hocquenghem code comprising:

means for providing a first digit sequence representative of an error-location polynomial from said received sequence whose coefficients are elements in a finite field;

means for multiplying said coefficients by second digit sequences representative of particular elements from said finite field for a corresponding digit of said received sequence to obtain third digit sequences representative of the products;

means for providing fourth digit sequences representative of a corresponding function of said products; and means for determining when a said fourth digit sequence representative of said function equals a predetermined value to identify each said error location.

18. Apparatus according to claim 17 in which said predetermined value is unity.

19. Apparatus for identifying a plurality $t$ of independent error locations in a received digit sequence $$r=r_0r_1r_2\ \ldots\ r_{n-1}$$

which was originally established in a format of a codeword of a Bose-Chaudhuri-Hocquenghem code comprising:

means for providing first digit sequences representative of an error-location polynomial $$F(x)=\sigma_0xt+\sigma_1x^{t-1}+\ldots\ x^t$$

from said received sequence whose coefficients are elements in a finite field GF($p^m$);

means for multiplying said coefficients by second digit sequences representative of particular elements from said finite field for a corresponding digit of said sequence to obtain products $$\alpha^0\times\sigma_0,\ \alpha^1\times\sigma_1,\ \alpha^2\times\sigma_2\ \ldots\ \alpha^t\times\sigma_t$$

means for providing a corresponding sum $$\sum_{k=1}^{t}\bar{\sigma}_k=\sum_{k=1}^{t}\alpha^k\sigma_k$$

of said products; and means for determining when a said sum equals unity to identify each said error location.

20. Apparatus for identifying two independent error locations in a received binary digit sequence which was originally established in the format of a codeword of a Bose-Chaudhuri-Hocquenghem code defined by a finite field GF($2^m$) comprising;

means for providing first digit sequences representative of an error location polynomial $$F(x)=x^2+\sigma_1x+\sigma_2$$

from said sequence where said coefficients are elements in said finite field;

means for multiplying said coefficients by second digit sequences representative of respective elements from said finite field to obtain products $$\alpha^1\times\sigma_1,\ \alpha^2\times\sigma_2$$

means for providing a corresponding sum $$\bar{\sigma}_1\oplus\bar{\sigma}_2=\sum_{k=1}^{2}\alpha^k\sigma_k$$

of said products; and means for determining when a said sum equals unity to identify each said error location.

21. Apparatus for correcting a plurality of independent error locations in a received digit sequence which was originally established in the format of a codeword of a Bose-Chaudhuri-Hocquemghem code defined by a finite field GF($p^m$) comprising:

means for providing first digit sequences representative of an error-location polynomial from said received sequence whose coefficients are elements in said finite field;

means for multiplying said coefficients by second digit sequences representative of particular elements from said finite field to obtain successive products;

means for providing corresponding sums of said successive products; and means for providing the modulo-$p$ sum of said latter sum and the corresponding digit of said sequence synchronously.

22. Apparatus for correcting a plurality of errors in a received digit sequence which was originally established in the format of a codeword of a BCH error-correcting code defined by a finite field comprising:

shift register means receptive of said received sequence to store said digits thereof temporarily;

means for obtaining a plurality of first digit sequences representative of power sums from said received sequence to indicate an error pattern therein;

means for obtaining second digit sequences representative of corresponding first elementary symmetric functions from said power sums;

means for transforming said first elementary symmetric functions in said finite field to thrid digit sequences representative of second elementary functions;

means for obtaining the sum of said second elementary symmetric functions;

modulo-$p$ adder means; and means to apply said latter sum and a corresponding digit from said shift register means synchronously to said modulo-$p$ adder means to obtain as the output thereof the original digit sequence representative of said codeword.

23. Apparatus for correcting a plurality of errors in a received binary digit sequence which was originally established in the format of a codeword of a BCH error-correcting code defined by a finite comprising;

shift register means receptive of said received sequence to store said digits thereof temporarily;

means for obtaining a plurality of first binary digit sequences representative of power sums from said received sequence to indicate an error pattern therein;

means for obtaining second binary digit sequences representative of corresponding first elementary symmetric functions from said power sums;

means for transforming said first elementary symmetric functions in said finite field to third binary digit sequences representative of second elementary functions;

means for obtaining the sum of said second elementary symmetric functions;

modulo-2 adder means; and means to apply said latter sum and a corresponding digit from said shift register means synchronously to obtain as the output thereof the original binary digit sequence representative of said codeword.

24. A parity check circuit for providing a plurality of parity checks for a received digit sequence which was originally established in the format of a codeword of a Bose-Chaudhuri-Hocquenghem code defined by a finite field comprising:

a feedback shift register structure including a plurality of storage units, a modulo-$p$ adder input to said storage units, and feedback connections to effect the reduction of said received digit sequence by multiples of digit sequences representative of the primitive polynominal which defines said finite field for said code; and pulse generator means connected to said shift register structure to clock the transfer of components of a field element in said storage units at a frequency determined by the parity check to be obtained.

25. A parity check circuit for providing a plurality of parity checks, power sums $S_1$ and $S_3$, for a received digit sequence $r=r_0r_1 \ldots r_{14}$ which was originally established in the format of a codeword of a Bose-Chaudhuri-Hocquenghem code defined by a finite field GF($2^m$) comprising:

a feedback shift register including a plurality of storage units, a modulo-2 adder input to said storage units, and feedback connections to effect the reduction of said received digit sequence by multiples of digit sequences representative of the primitive polynomial which defines said finite field for said code; and pulse generator means connected to said shift register structure to clock the transfer of components of a field element in said storage units at the same frequency as said input and at three times the frequency of said input for said power sums $S_1$ and $S_3$, respectively.

26. A parity check circuit for providing a plurality of parity checks $S_1, S_3, \ldots S_{2t-1}$ for a received digit sequence $$r=r_0r_1r_2 \ldots r_{n-1},$$

where $t$ is the number of independent errors to be corrected in said sequence, which was originally established in the format of a codeword of a $(n, k)$ Bose-Chaudhuri-Hocquenghem code defined by a finite field GF($p^m$) comprising:

a feedback shift register structure including a plurality of storage units, a modulo-$p$ adder input to said storage units, and feedback connections to effect the reduction of said received digit sequence by multiples of digit sequences representative of the primitive polynomial which defines said finite field for the coefficients of said code; and pulse generator means connected to said shift register structure to clock the transfer of components of a field element in said storage units at a frequency determined by the parity check to be obtained.

27. Apparatus for identifying a plurality of independent error-locations in a received digit sequence which was originally established in the format of a codeword of Bose-Chaudhuri-Hocquenghem code defined by a finite field comprising:

means for providing a plurality of first digit sequences representative of power sums from said received sequence;

means for providing a plurality of second digit sequences representative of elementary symmetric functions from said power sums;

means for multiplying said second digit sequences representative of said elementary symmetric functions by third digit sequences representative of particular finite field elements, respectively, from said field for a corresponding digit of said sequence to obtain products;

means for providing a corresponding sum of said products; and means for determining when a said sum equals unity to identify each said error location in said received digit sequence.

28. Apparatus for identifying a plurality $t$ of independent error locations in a received digit sequence $$r=r_0r_1r_2 \ldots r_{n-1}$$

which was originally established in the format of a codeword of Bose-Chaudhuri-Hocquenghem code defined by a finite field GF($p^m$) comprising:

means for providing a plurality of first digit sequences representative of power sums $$S_1, S_3, \ldots S_{2t-1}$$

from said received sequence;

means for providing a plurality of second digit sequences representative of elementary symmetric functions $$\sigma_1, \ldots \sigma_t$$

from said power sums;

means for multiplying said second digit sequences representative of said elementary symmetric functions by third digit sequences representative of particular finite field elements from said field for a corresponding digit of said sequence to obtain products $$\alpha^1\times\sigma_1, \alpha^2\times\sigma_2, \ldots \alpha^t\times\sigma_t$$

means for providing a corresponding sum $$\sum_{k=1}^{t}\alpha^k\sigma_k$$

of said products; and means for determining when a said sum equals unity to identify each said error location in said received digit sequence.

29. Apparatus for correcting a plurality of independent error-locations in a received digit sequence which was originally established in the format of a codeword of Bose-Chaudhuri-Hocquenghem code defined by a finite field GF($p^m$) comprising:

means for providing a plurality of first digit sequences representative of power sums from said received sequence;

means for providing a plurality of second digit sequences representative of elementary symmetric functions from said power sums;

means for multiplying said second digit sequences representative of said elementary symmetric functions by third digit sequences representative of particular finite field elements, respectively, from said field to obtain successive products;

means for providing a corresponding sum of said products; and means for providing the modulo-$p$ sum of said latter sum and the corresponding digit of said sequence synchronously.

30. Apparatus for idenitfying a plurality of error locations in a received digit pattern which was originally established in the format of a codeword of a linear error-correcting code defined by a finite field comprising:

means for obtaining a plurality of first digit sequences representative of syndromes from said sequence;

means for synchronously transforming said first digit sequences representative of said syndromes to obtain second digit sequences representatives of functions thereof in said field; and means for logically identiying said error locations from said functions when a determinant related thereto equals a predetermined value.

31. Apparatus for identifying a plurality of error locations in a received digit sequence which was originally established in the format of a codeword of a cyclic error-correcting code defined by a finite field comprising:

means for obtaining a plurality of first digit sequences representative of syndromes from said sequence;

means for transforming said syndromes to obtain second digit sequences representative of functions thereof in said field; and means for logically identifying said error locations from said functions when a determinant related thereto equals a predetermined value.

32. Apparatus for identifying a plurality of error locations in a received digit sequence which was originally established n the format of a codeword of Bose-Chaudhuri-Hocquenghem error-correcting code defined by a finite field comprising:

means for providing a plurality of first digit sequences representative of power sums from said sequence;

means for providing products of said first digit sequences representative of said power sums and second digit sequences representative of particular elements, respectively, from said finite field for a corresponding digit of said sequence; and means for logically identifying said error locations from said products when a determinant related thereto equals a predetermined value.

33. Apparatus of claim 32 in which said means for logically identifying said error locations from said products includes;

means to evaluate a said determinant related to said products; and means to determine when said determinant equals said predetermined value to identify the said error location in said sequence.

34. Apparatus for identifying a plurality of error locations in a received digit sequence which was originally established in the format of a codeword of Bose-Chaudhuri-Hocquenghem error-correcting code defined by a finite field comprising:

means for providing a plurality of first digit sequences representative of power sums from said sequence;

means for providing products of said first digit sequences representative of said power sums and second digit sequences representative of said particular elements, respectively, from said finite field for a corresponding digit of said sequence; and means for logically identifying said error locations from said products including means to effect a corresponding determinant related to said products; and means to determine when said determinant equals unity to identify each error location in said sequence.

35. Apparatus for identifying a plurality $t$ of error locations in a received digit sequence $$r=r_0r_1 \ldots r_{n-1}$$

which was originally established in the format of a Bose-Chaudhuri-Hocquenghem error-correcting code defined by a finite field $GF(p^m)$ comprising:

means for providing a plurality of first digit sequences representative of power sums $$S_1, S_3 \ldots S_{2t-1}$$

from said sequence;

means for providing products $$\alpha^1 \times S_1, \alpha^3 \times S_3, \ldots \alpha^{2t-1} \times S_{2t-1}$$

of said first digit sequences representative of said power sums and second digit sequences representative of particular elements, respectively, from said finite field for a corresponding digit of said sequence, and means for logically identifying said error locations from said products.

36. Apparatus for correcting a plurality of $t$ error locations in a received digit sequence which was originally established in the format of a codeword of a Bose-Chaudhuri-Hocquenghem error correcting code defined by a finite field GF $(p^m)$ comprising:

means for providing a plurality of power sums $$S_1, S_3 \ldots S_{2t-1}$$

from said sequence;

means for providing $t$ products of said power sums and particular elements, respectively, from said finite field;

means for logically providing a determinant of said $t$ transformed power sums;

means for detecting when the said determinant has a predetermined value; and means for providing as indicated by said predetermined value of said determinant error of the corresponding digit of said sequence synchronously.

37. Apparatus for correcting two independent errors in a received binary digit sequence which was originally established in the format of a Bose-Chaudhuri-Hocquenghem error-correcting code defined by a finite field $GF(2^m)$ comprising:

first and second buffer registers to store alternate received sequences:

first and second means to generate first and second digit sequences representative of first and third power sums $S_1$ and $S_3$ from said received sequence;

third and fourth means to generate $S_3/S_1$ and $S_1^2$;

means to provide the modulo-2 sum $S_3/S_1 \oplus S_1^2$;

means to multiply said elementary symmetric functions $S_1$ and $S_3/S_1 \oplus S_1^2$ by third and fourth digit sequences representative of the respective elements from said finite field $\alpha$ and $\alpha^2$;

means to effect the modulo-2 sum of each said latter product; and means to correct each said error location in said received sequence by providing modulo-2 sum of said latter sums and said digits of said sequence in synchronism to correct an error location in said sequence when said function of said transformed power sum functions equal a predetermined value.

38. Apparatus according to claim 37 in which said predetermined value is unity.

39. Apparatus for correcting two independent errors in a received binary digit sequence originally established in the format of a codeword of a Bose-Chaudhuri-Hocquenghem error correcting code defined by a finite field $GF(2^m)$ comprising:

means for providing first binary digit sequences representative of first and third power sums from said received sequence;

means for providing products of said power sums and second binary digit sequences representative of respective elements from said finite field for each digit of said received sequence;

means for logically identifying said error locations from said products including means to effect a corresponding determinant related to said products; and means for correcting as indicated by the value of said determinant the corresponding digit of said received sequence synchronously.

40. Apparatus for correcting 3 independent errors in a binary digit sequence which was originally established in the format of a Bose-Chaudhuri-Hocquenghem error-correcting code defined by a finite field $GF(2^m)$ comprising:

means for providing first binary digit sequences representative of first, third and fifth power sums from said received sequence;

means for detecting whether the number of errors in said received sequence was a single error pattern or a multiple error pattern;

means for providing successive products of said power sums and second binary digit sequences representative of respective elements from said finite field for each digit of said sequence;

means for logically identifying error locations from said sucessive products including means for effecting a corresponding determinant related to said products; and means for correcting as indicated by the value of said determinant the corresponding digit of said sequence synchronously.

41. Apparatus for identifying an error pattern in a received digit sequence which was originally established in the format of a codeword of a linear code comprising:

means for obtaining a plurality of first digit sequences representative of syndromes from said received sequence;

means for obtaining a plurality of second digit sequences representative of parameters from said syndromes which are the coefficients of an error-location polynomial, said coeffcients being elements of a finite field;

means for synchronously transforming said coefficients in said finite field in correspondence with different digits of said received digit sequence; and means for identifying an error location in said received sequence when a function of said error-location polynomial is a predetermined value.

42. Apparatus according to claim 41 in which said function of said error-location polynomial is unity.

References Cited

UNITED STATES PATENTS

| | | | |
|---|---|---|---|
| 3,051,784 | 8/1962 | Neumann | 178—23 |
| 3,162,837 | 12/1964 | Meggitt | 340—146.1 |
| 3,278,729 | 10/1966 | Chien | 235—153 |

PAUL J. HERON, *Primary Examiner.*

R. RICHERT, *Assistant Examiner.*

U.S. Cl. X.R.

340—172.5